US012598037B2

(12) United States Patent
Yang et al.

(10) Patent No.: US 12,598,037 B2
(45) Date of Patent: Apr. 7, 2026

(54) WIRELESS TRANSMISSIONS USING DISTRIBUTED TONES

(71) Applicant: QUALCOMM Incorporated, San Diego, CA (US)

(72) Inventors: Lin Yang, San Diego, CA (US); Bin Tian, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 18/425,607

(22) Filed: Jan. 29, 2024

(65) Prior Publication Data

US 2024/0171329 A1 May 23, 2024

Related U.S. Application Data

(63) Continuation of application No. 17/196,557, filed on Mar. 9, 2021, now Pat. No. 11,888,770.

(Continued)

(51) Int. Cl.
*H04L 5/00* (2006.01)
*H04W 72/0453* (2023.01)

(52) U.S. Cl.
CPC ....... *H04L 5/0044* (2013.01); *H04W 72/0453* (2013.01); *H04L 5/0007* (2013.01)

(58) Field of Classification Search
CPC ... H04L 5/0044; H04L 5/0007; H04L 5/0041; H04L 5/0048; H04L 27/3461;

(Continued)

(56) References Cited

U.S. PATENT DOCUMENTS 8,964,618 B2 2/2015 Seok
9,131,399 B2 9/2015 Liu et al.
(Continued)

FOREIGN PATENT DOCUMENTS

CN 107925470 A 4/2018
CN 110352578 B * 5/2022 ............ H04W 72/23
(Continued)

OTHER PUBLICATIONS

Fatang C., et al., "Analysis and Design of Uplink Resource Scheduling in Narrow Band Internet of Things", Journal of Computer Applications, Nov. 10, 2018, vol. 38(11), pp. 3270-3274, 3281.
(Continued)

*Primary Examiner* — Ayaz R Sheikh
*Assistant Examiner* — Louis Samara
(74) *Attorney, Agent, or Firm* — Holland & Hart LLP

(57) ABSTRACT

This disclosure provides systems, methods, and apparatuses for wireless communication. An example apparatus selects a first resource unit (RU) of a plurality of RUs for transmitting a physical (PHY) layer convergence protocol (PLCP) protocol data unit (PPDU) over a wireless medium. The first RU may include a set of contiguous tones occupying a first frequency bandwidth. The plurality of RUs may collectively span a second frequency bandwidth greater than the first frequency bandwidth. The apparatus maps the set of contiguous tones of the first RU to a set of non-contiguous tones distributed across the second frequency bandwidth using a tone mapping vector and a tone mapping offset associated with the first RU. The apparatus transmits the PPDU over the set of non-contiguous tones distributed across the second frequency bandwidth.

30 Claims, 42 Drawing Sheets

Related U.S. Application Data

(60) Provisional application No. 63/115,021, filed on Nov. 17, 2020, provisional application No. 63/027,349, filed on May 19, 2020, provisional application No. 63/009,450, filed on Apr. 13, 2020, provisional application No. 62/989,588, filed on Mar. 13, 2020.

(58) Field of Classification Search
CPC . H04L 27/2602; H04L 1/0003; H04L 5/0053; H04L 5/0051; H04W 72/0453; H04W 84/12; H04W 72/0446
See application file for complete search history.

(56) References Cited

U.S. PATENT DOCUMENTS

| | | | |
|---|---|---|---|
| 9,462,575 B2 | 10/2016 | Vermani et al. | |
| 9,628,310 B2 | 4/2017 | Lee et al. | |
| 9,763,238 B2 | 9/2017 | Ghosh et al. | |
| 9,843,097 B1 | 12/2017 | Zhang et al. | |
| 9,844,028 B2 | 12/2017 | Yang et al. | |
| 10,129,873 B2 | 11/2018 | Yang et al. | |
| 10,165,094 B2 | 12/2018 | Sun et al. | |
| 10,187,238 B2 | 1/2019 | Chen et al. | |
| 10,211,948 B2 | 2/2019 | Liu et al. | |
| 10,334,475 B2 | 6/2019 | Xi et al. | |
| 10,523,483 B2 * | 12/2019 | Noh | H04L 27/2647 |
| 11,122,594 B2 | 9/2021 | Bhanage et al. | |
| 11,395,359 B2 | 7/2022 | Cao et al. | |
| 11,621,753 B2 | 4/2023 | Jiang et al. | |
| 2002/0159506 A1 | 10/2002 | Alamouti et al. | |
| 2007/0043982 A1 * | 2/2007 | Arivoli | H04L 1/0043 |
| | | | 714/701 |
| 2015/0365195 A1 | 12/2015 | Yang et al. | |
| 2016/0088599 A1 | 3/2016 | Yang et al. | |
| 2016/0165607 A1 | 6/2016 | Hedayat | |
| 2017/0041929 A1 | 2/2017 | Noh et al. | |
| 2017/0054542 A1 | 2/2017 | Vermani et al. | |
| 2017/0064718 A1 * | 3/2017 | Bharadwaj | H04B 7/0452 |
| 2017/0181034 A1 | 6/2017 | Lee et al. | |
| 2017/0195890 A1 * | 7/2017 | Chen | H04W 72/0446 |
| 2017/0303275 A1 | 10/2017 | Banerjea et al. | |
| 2018/0007179 A1 | 1/2018 | Chen et al. | |
| 2018/0103487 A1 | 4/2018 | Asterjadhi et al. | |
| 2018/0115972 A1 * | 4/2018 | Huang | H04L 5/0048 |
| 2018/0205519 A1 * | 7/2018 | Vermani | H04L 27/3461 |
| 2018/0242355 A1 | 8/2018 | Lou et al. | |
| 2019/0159207 A1 * | 5/2019 | Chen | H04L 5/0053 |
| 2019/0199499 A1 * | 6/2019 | Da Silva | H04L 27/2602 |
| 2019/0238288 A1 | 8/2019 | Liu et al. | |
| 2019/0281614 A1 | 9/2019 | Chen et al. | |
| 2019/0312710 A1 * | 10/2019 | Noh | H04L 5/0053 |
| 2020/0007265 A1 * | 1/2020 | Min | H04L 1/0003 |
| 2020/0008185 A1 * | 1/2020 | Chen | H04L 69/18 |
| 2020/0014509 A1 * | 1/2020 | Asterjadhi | H04L 5/0041 |
| 2020/0014576 A1 | 1/2020 | Cherian et al. | |
| 2020/0045656 A1 | 2/2020 | Verma et al. | |
| 2020/0322199 A1 * | 10/2020 | Matsumura | H04L 5/0051 |
| 2020/0382173 A1 | 12/2020 | Park et al. | |
| 2021/0105667 A1 | 4/2021 | Li et al. | |
| 2021/0135789 A1 * | 5/2021 | Wu | H04L 5/0051 |
| 2021/0144752 A1 | 5/2021 | Chen et al. | |
| 2021/0204299 A1 | 7/2021 | Yun et al. | |
| 2021/0243586 A1 * | 8/2021 | Osawa | H04W 84/18 |
| 2021/0258115 A1 | 8/2021 | Liu et al. | |
| 2021/0288768 A1 | 9/2021 | Yang et al. | |
| 2021/0288769 A1 | 9/2021 | Yang et al. | |
| 2021/0289500 A1 | 9/2021 | Yang et al. | |
| 2022/0053465 A1 | 2/2022 | Redlich et al. | |
| 2022/0053482 A1 | 2/2022 | Yang et al. | |
| 2022/0060286 A1 * | 2/2022 | Yoshioka | H04L 1/1854 |
| 2022/0150014 A1 * | 5/2022 | Wong | H04L 5/0048 |
| 2022/0294558 A1 | 9/2022 | Park et al. | |
| 2022/0377603 A1 | 11/2022 | Kim et al. | |

FOREIGN PATENT DOCUMENTS

| | | | | |
|---|---|---|---|---|
| JP | 6278319 B2 * | 2/2018 | ........ | H04L 27/2613 |
| TW | 201935878 A | 9/2019 | | |
| WO | WO-2016025817 A1 | 2/2016 | | |
| WO | WO-2016164621 | 10/2016 | | |
| WO | 2017031451 A1 | 2/2017 | | |

OTHER PUBLICATIONS

Taiwan Search Report—TW110108532—TIPO—Apr. 16, 2024.
Taiwan Search Report—TW110108500—TIPO—Sep. 6, 2024.
International Preliminary Report on Patentability—PCT/US2021/021645 The International Bureau of WIPO—Geneva, Switzerland, Sep. 22, 2022.
International Preliminary Report on Patentability—PCT/US2021/021660 The International Bureau of WIPO—Geneva, Switzerland, Sep. 22, 2022.
International Preliminary Report on Patentability—PCT/US2021/021678 The International Bureau of WIPO—Geneva, Switzerland, Sep. 22, 2022.
International Search Report and Written Opinion—PCT/US2021/021645—ISA/EPO—Jun. 25, 2021.
International Search Report and Written Opinion—PCT/US2021/021660—ISA/EPO—Aug. 30, 2021.
International Search Report and Written Opinion—PCT/US2021/021678—ISA/EPO—Jul. 2, 2021.
Kim (Apple) J., et al., "RU Restriction of 20MHz Operating Devices in OFDMA", IEEE 802.11-16/0906r0, IEEE, 11-16-0906-00-00AX-RU-Restriction-on-20mhz-Operating-Stas, IEEE-SA Mentor, Piscataway, NJ USA, vol. 802.11ax, Jul. 25, 2016, 33 Pages, XP068107223, p. 18-p. 21. 11-16-0906-00-OOAX-Ru-Restriction-on-20mhz.
Partial International Search Report—PCT/US2021/021660—ISA/EPO—Jul. 6, 2021.
European Search Report—EP24203835—Search Authority—The Hague—Jan. 13, 2025.
Taiwan Search Report—TW113147434—TIPO—Apr. 29, 2025.

* cited by examiner

1100

1102

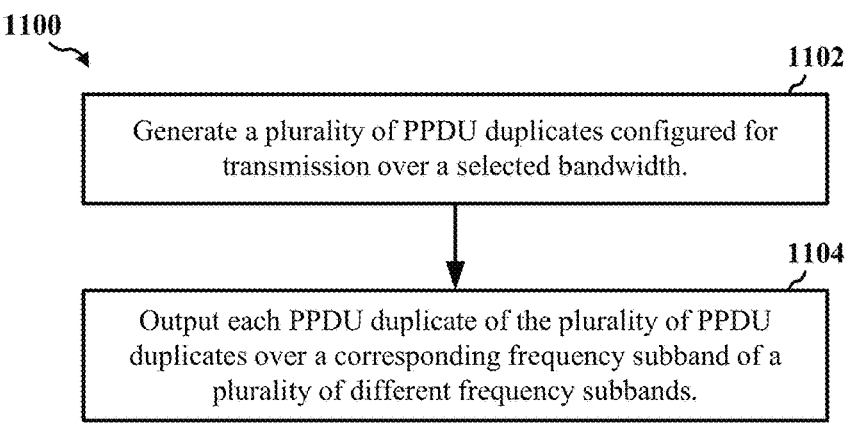

Generate a plurality of PPDU duplicates configured for transmission over a selected bandwidth.

1104

Output each PPDU duplicate of the plurality of PPDU duplicates over a corresponding frequency subband of a plurality of different frequency subbands.

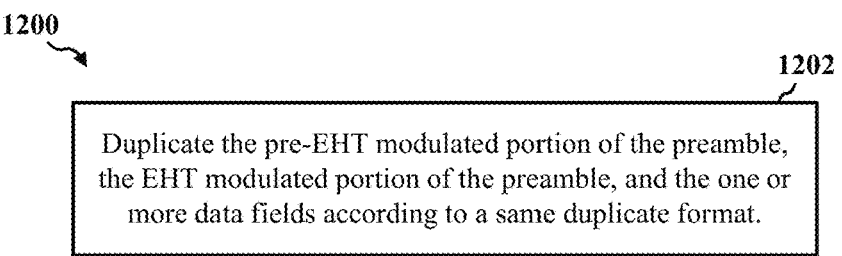

Duplicate the pre-EHT modulated portion of the preamble, the EHT modulated portion of the preamble, and the one or more data fields according to a same duplicate format.

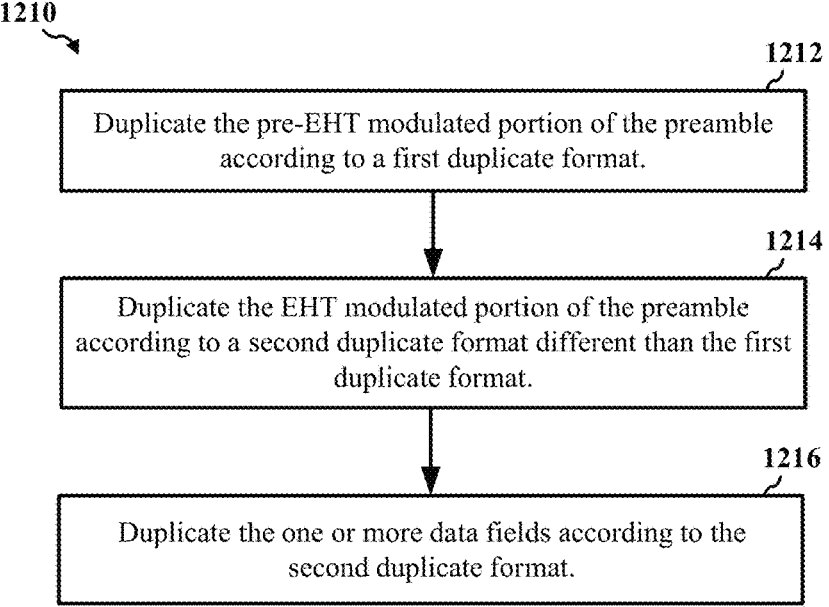

Duplicate the pre-EHT modulated portion of the preamble according to a first duplicate format.

1214

Duplicate the EHT modulated portion of the preamble according to a second duplicate format different than the first duplicate format.

1216

Duplicate the one or more data fields according to the second duplicate format.

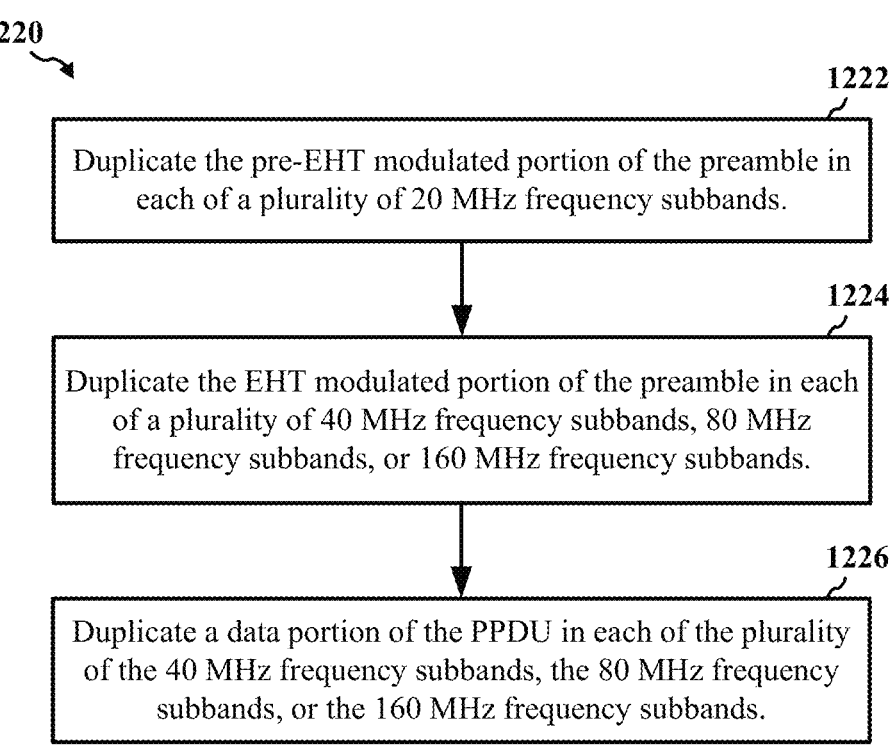

Duplicate the pre-EHT modulated portion of the preamble in each of a plurality of 20 MHz frequency subbands.

1224

Duplicate the EHT modulated portion of the preamble in each of a plurality of 40 MHz frequency subbands, 80 MHz frequency subbands, or 160 MHz frequency subbands.

1226

Duplicate a data portion of the PPDU in each of the plurality of the 40 MHz frequency subbands, the 80 MHz frequency subbands, or the 160 MHz frequency subbands.

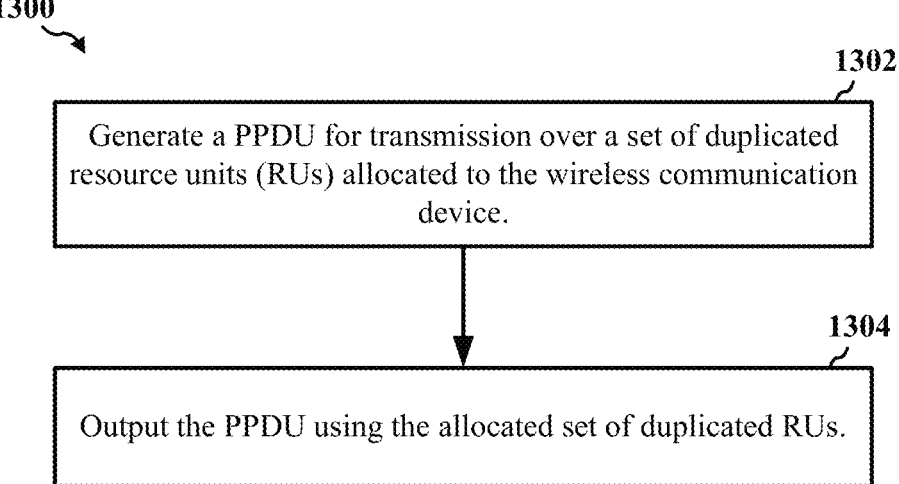

Generate a PPDU for transmission over a set of duplicated resource units (RUs) allocated to the wireless communication device.

1304

Output the PPDU using the allocated set of duplicated RUs.

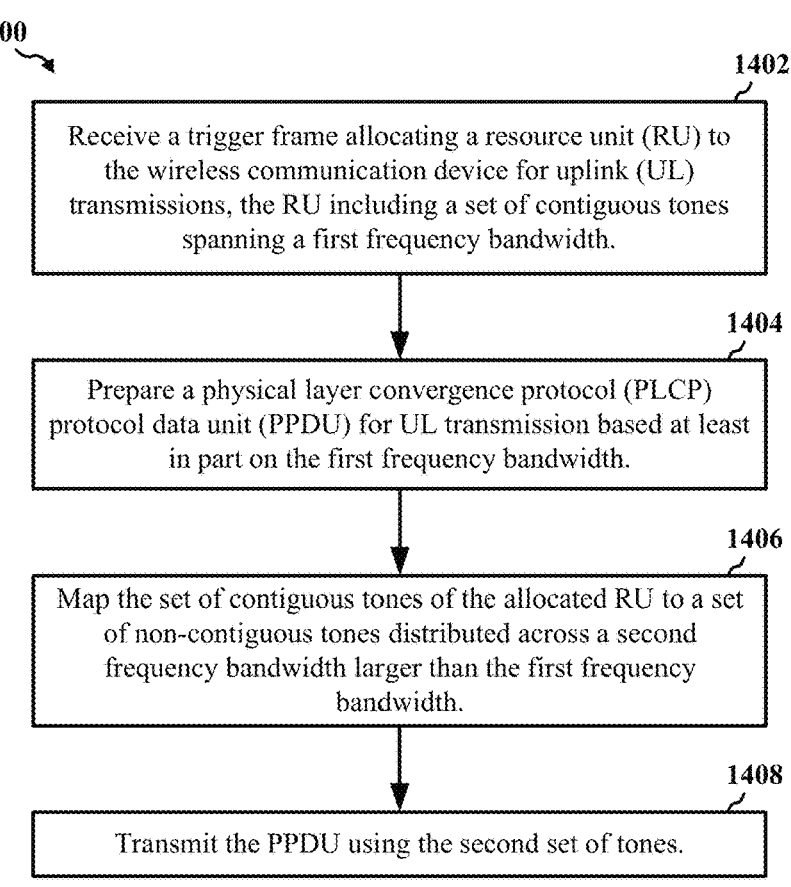

Receive a trigger frame allocating a resource unit (RU) to the wireless communication device for uplink (UL) transmissions, the RU including a set of contiguous tones spanning a first frequency bandwidth.

1404

Prepare a physical layer convergence protocol (PLCP) protocol data unit (PPDU) for UL transmission based at least in part on the first frequency bandwidth.

1406

Map the set of contiguous tones of the allocated RU to a set of non-contiguous tones distributed across a second frequency bandwidth larger than the first frequency bandwidth.

1408

Transmit the PPDU using the second set of tones.

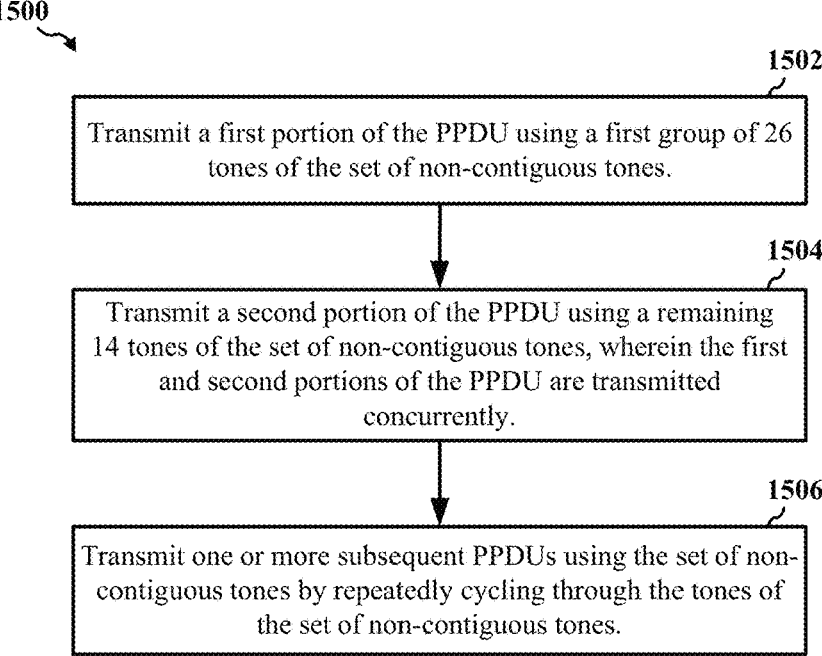

Transmit a first portion of the PPDU using a first group of 26 tones of the set of non-contiguous tones.

1504

Transmit a second portion of the PPDU using a remaining 14 tones of the set of non-contiguous tones, wherein the first and second portions of the PPDU are transmitted concurrently.

1506

Transmit one or more subsequent PPDUs using the set of non-contiguous tones by repeatedly cycling through the tones of the set of non-contiguous tones.

Transmit a first portion of the PPDU using a first group of 26 tones of the set of non-contiguous tones.

1514

Transmit a second portion of the PPDU using a second group of 26 tones of the set of non-contiguous tones.

1516

Transmit a third portion of the PPDU using a third group of 26 tones of the set of non-contiguous tones.

1518

Transmit a fourth portion of the PPDU using a remaining 2 tones of the set of non-contiguous tones, where the first, second, third, and fourth portions of the PPDU are transmitted concurrently.

1520

Transmit one or more subsequent PPDUs using the set of non-contiguous tones by repeatedly cycling through the tones of the set of non-contiguous tones.

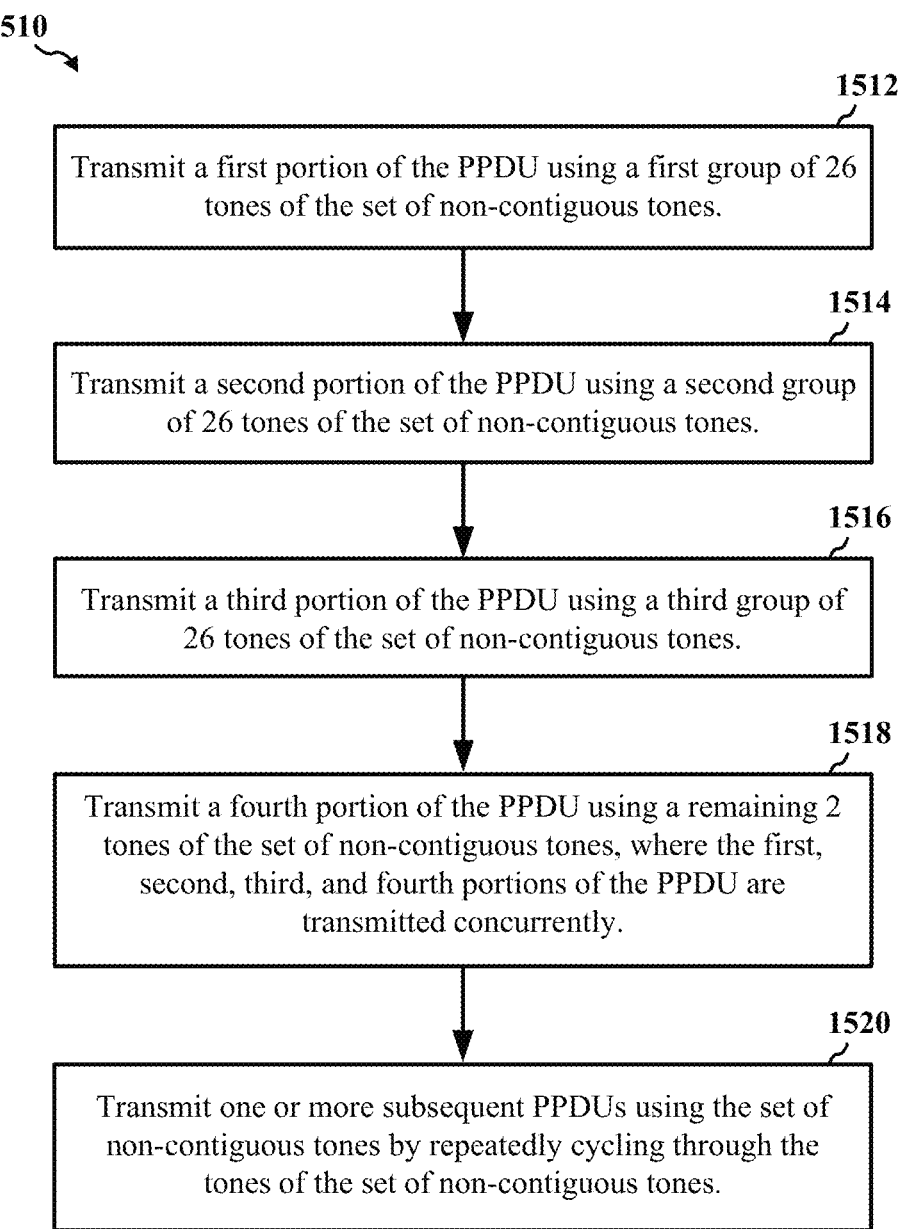

Receive a trigger frame allocating a resource unit (RU) to the wireless communication device for uplink (UL) transmissions, the allocated RU including a set of contiguous tones spanning an RU bandwidth.

2004

Spread the tones of the set of contiguous tones of the allocated RU across a first frequency bandwidth larger than the RU bandwidth.

2006

Prepare a physical (PHY) layer convergence protocol (PLCP) protocol data unit (PPDU) for UL transmission based at least in part on the first frequency bandwidth.

2008

Map the set of contiguous tones in the allocated RU to a set of non-contiguous tones distributed across a second frequency bandwidth based on a tone mapping scheme.

2010

Transmit the PPDU using the mapped set of non-contiguous tones distributed across the second frequency bandwidth.

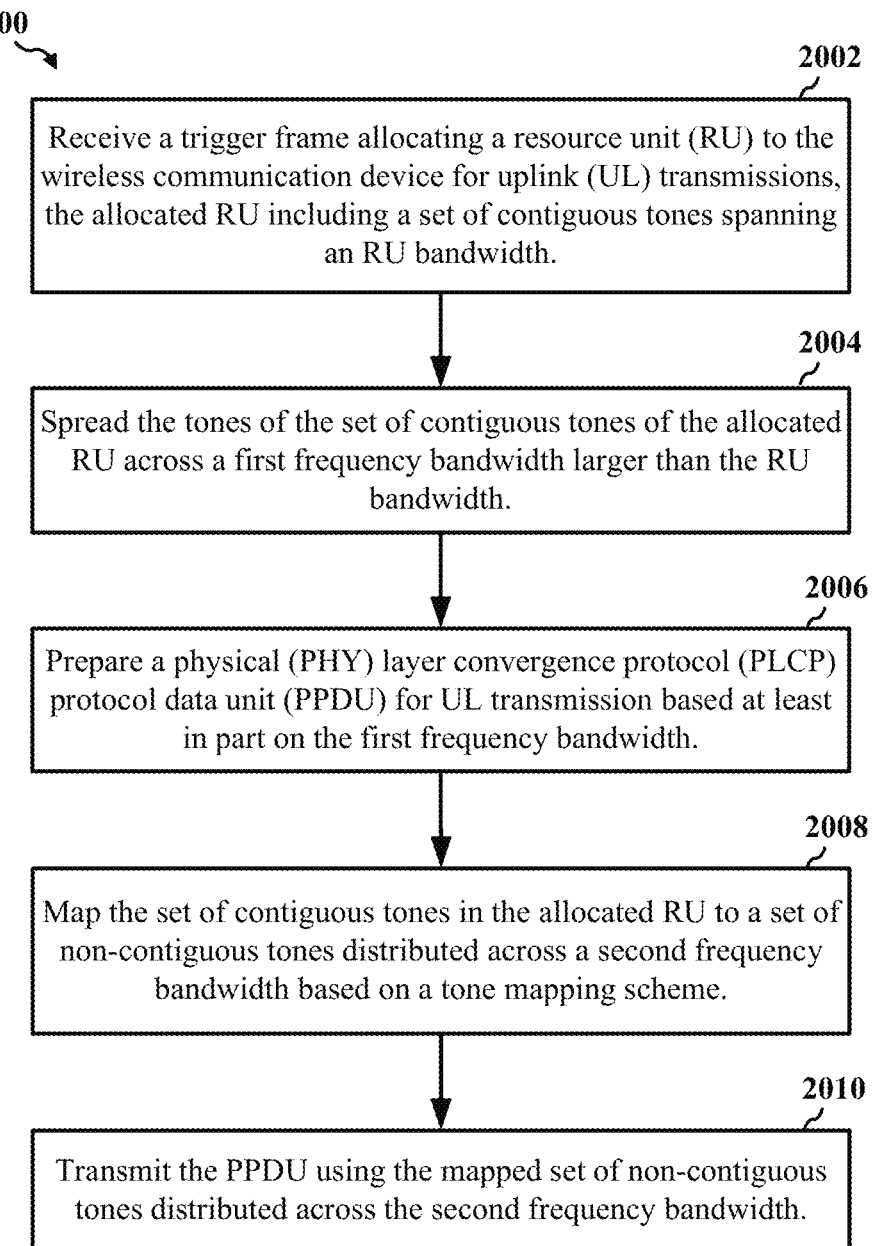

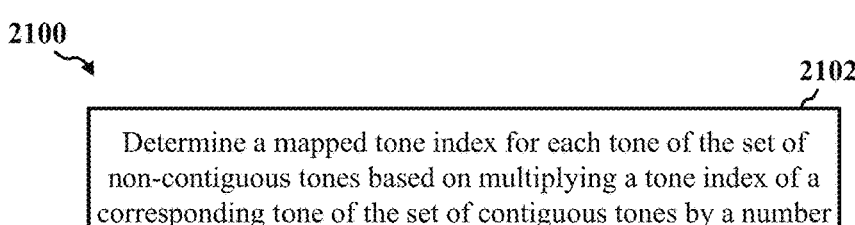

Determine a mapped tone index for each tone of the set of non-contiguous tones based on multiplying a tone index of a corresponding tone of the set of contiguous tones by a number *M*, wherein *M* is an integer greater than one.

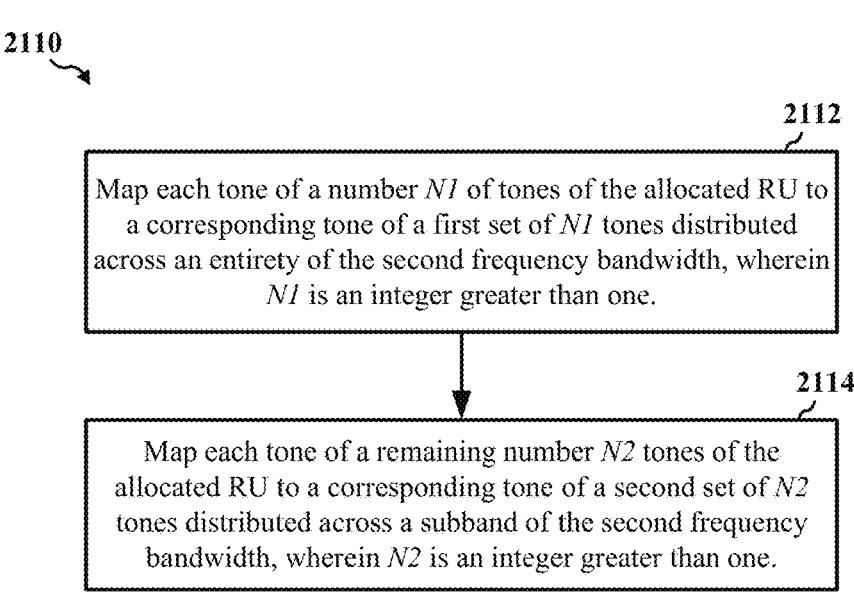

Map each tone of a number *N1* of tones of the allocated RU to a corresponding tone of a first set of *N1* tones distributed across an entirety of the second frequency bandwidth, wherein *N1* is an integer greater than one.

2114

Map each tone of a remaining number *N2* tones of the allocated RU to a corresponding tone of a second set of *N2* tones distributed across a subband of the second frequency bandwidth, wherein *N2* is an integer greater than one.

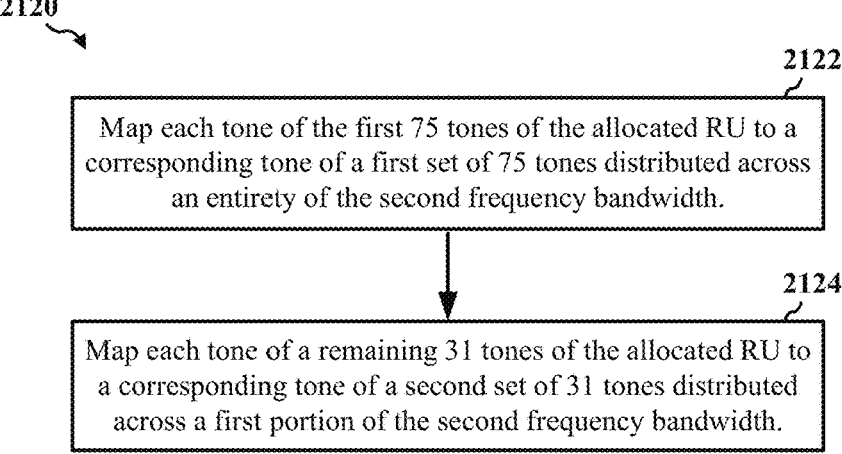

Map each tone of the first 75 tones of the allocated RU to a corresponding tone of a first set of 75 tones distributed across an entirety of the second frequency bandwidth.

2124

Map each tone of a remaining 31 tones of the allocated RU to a corresponding tone of a second set of 31 tones distributed across a first portion of the second frequency bandwidth.

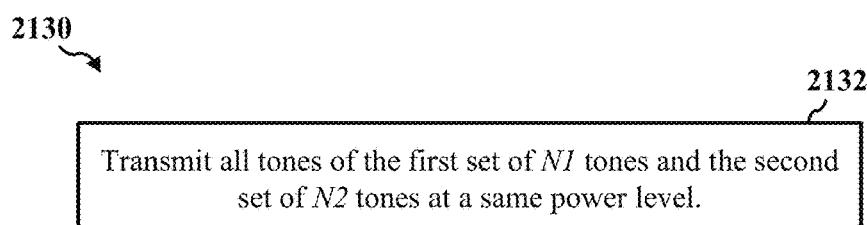

Transmit all tones of the first set of *N1* tones and the second set of *N2* tones at a same power level.

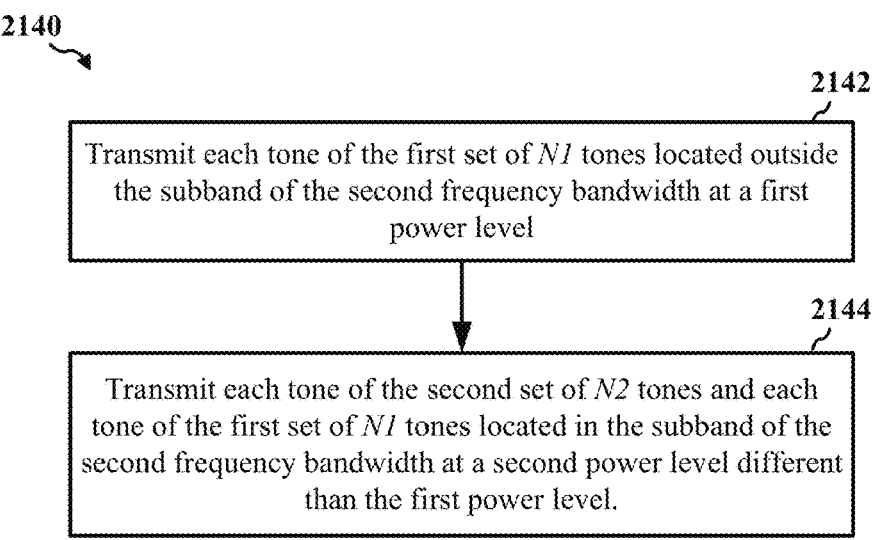

Transmit each tone of the first set of *N1* tones located outside the subband of the second frequency bandwidth at a first power level

2144

Transmit each tone of the second set of *N2* tones and each tone of the first set of *N1* tones located in the subband of the second frequency bandwidth at a second power level different than the first power level.

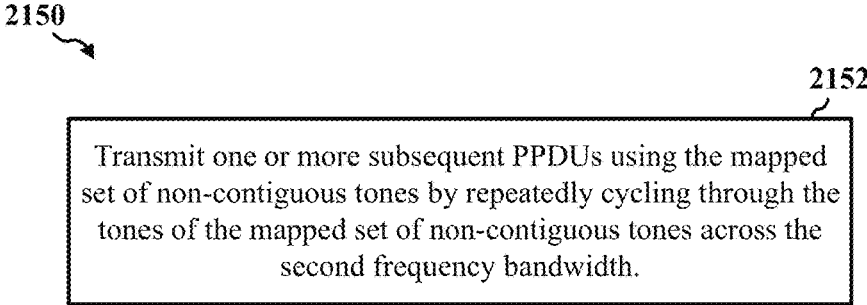

Transmit one or more subsequent PPDUs using the mapped set of non-contiguous tones by repeatedly cycling through the tones of the mapped set of non-contiguous tones across the second frequency bandwidth.

*Figure 21F*

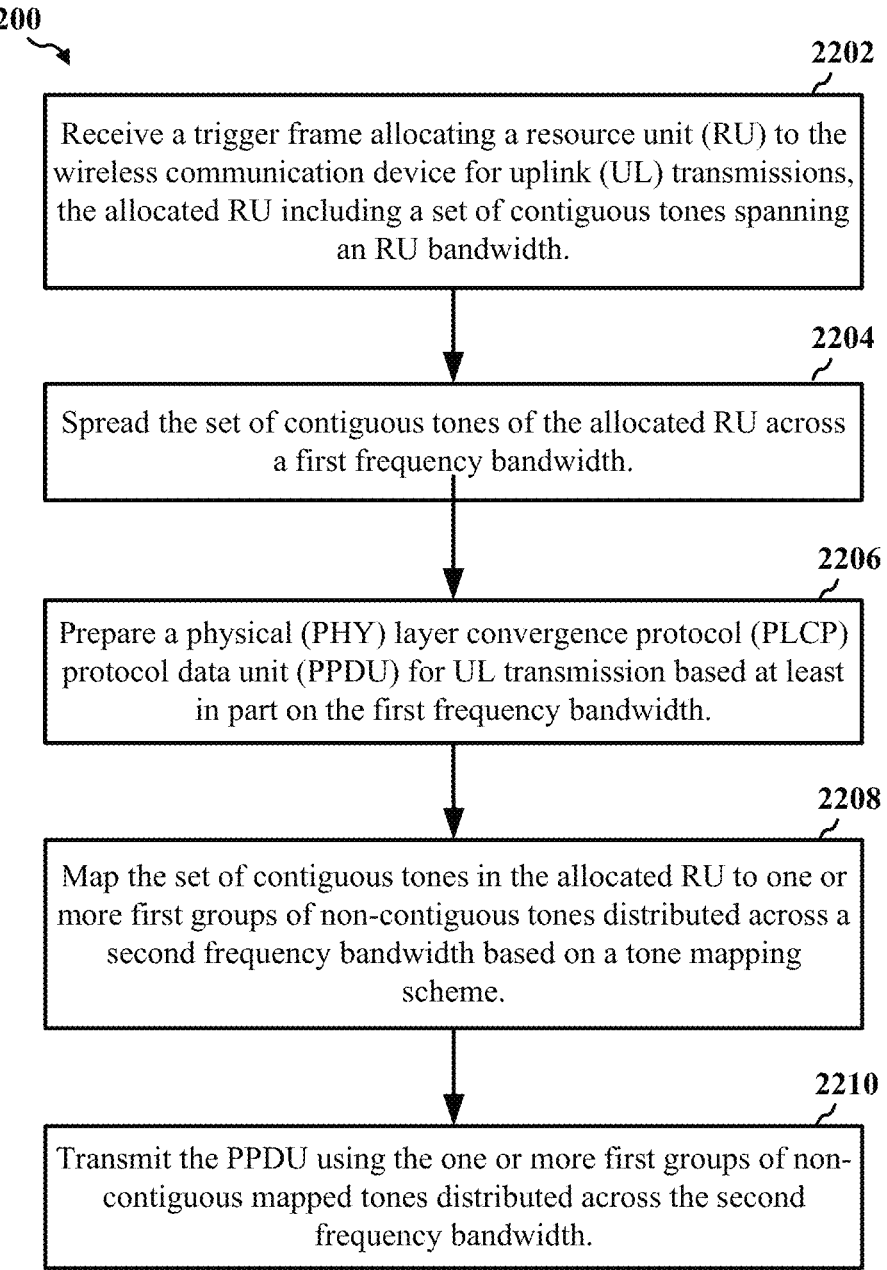

2200

2202

Receive a trigger frame allocating a resource unit (RU) to the wireless communication device for uplink (UL) transmissions, the allocated RU including a set of contiguous tones spanning an RU bandwidth.

2204

Spread the set of contiguous tones of the allocated RU across a first frequency bandwidth.

2206

Prepare a physical (PHY) layer convergence protocol (PLCP) protocol data unit (PPDU) for UL transmission based at least in part on the first frequency bandwidth.

2208

Map the set of contiguous tones in the allocated RU to one or more first groups of non-contiguous tones distributed across a second frequency bandwidth based on a tone mapping scheme.

2210

Transmit the PPDU using the one or more first groups of non-contiguous mapped tones distributed across the second frequency bandwidth.

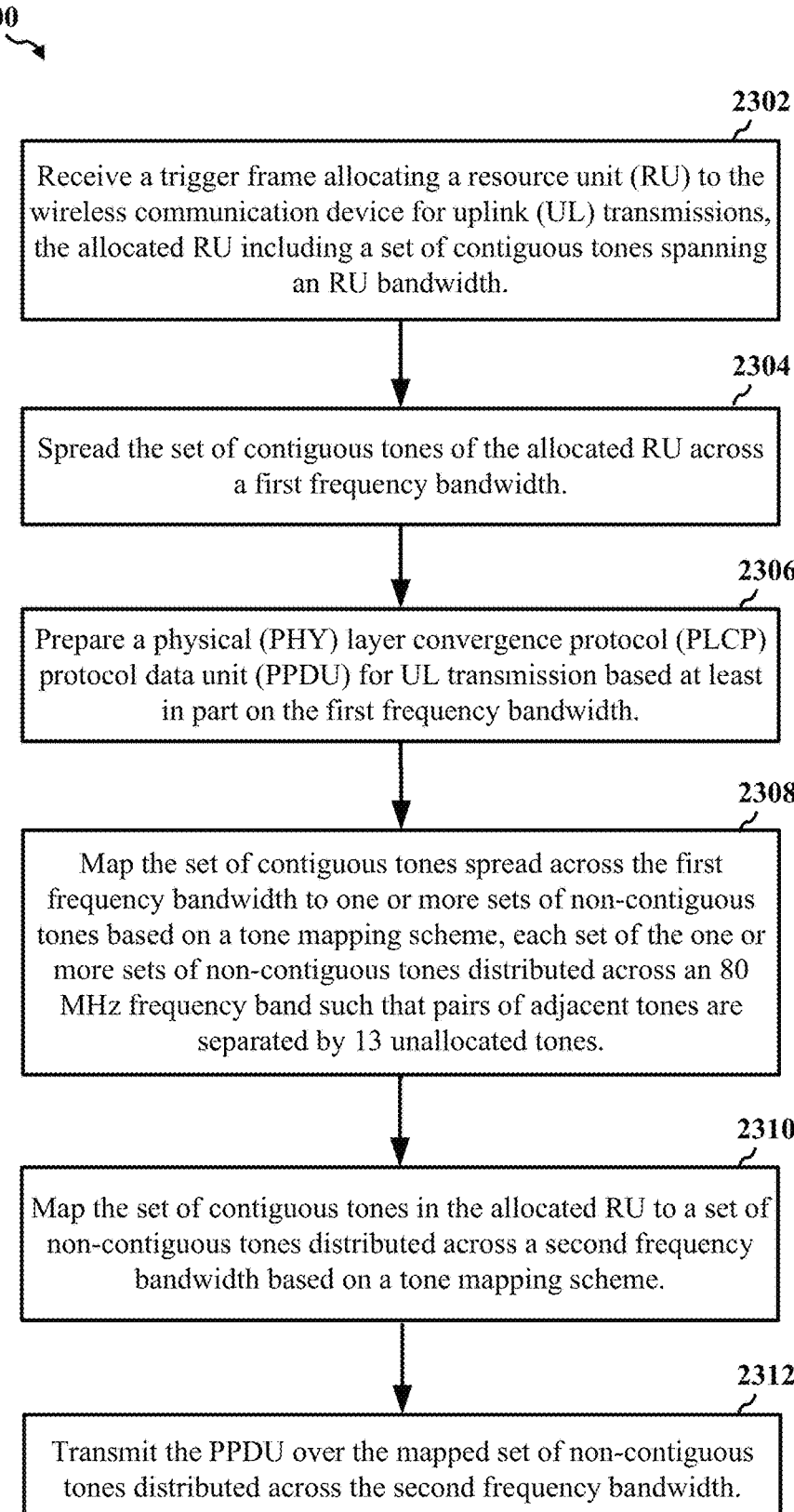

2302

Receive a trigger frame allocating a resource unit (RU) to the wireless communication device for uplink (UL) transmissions, the allocated RU including a set of contiguous tones spanning an RU bandwidth.

2304

Spread the set of contiguous tones of the allocated RU across a first frequency bandwidth.

2306

Prepare a physical (PHY) layer convergence protocol (PLCP) protocol data unit (PPDU) for UL transmission based at least in part on the first frequency bandwidth.

2308

Map the set of contiguous tones spread across the first frequency bandwidth to one or more sets of non-contiguous tones based on a tone mapping scheme, each set of the one or more sets of non-contiguous tones distributed across an 80 MHz frequency band such that pairs of adjacent tones are separated by 13 unallocated tones.

2310

Map the set of contiguous tones in the allocated RU to a set of non-contiguous tones distributed across a second frequency bandwidth based on a tone mapping scheme.

2312

Transmit the PPDU over the mapped set of non-contiguous tones distributed across the second frequency bandwidth.

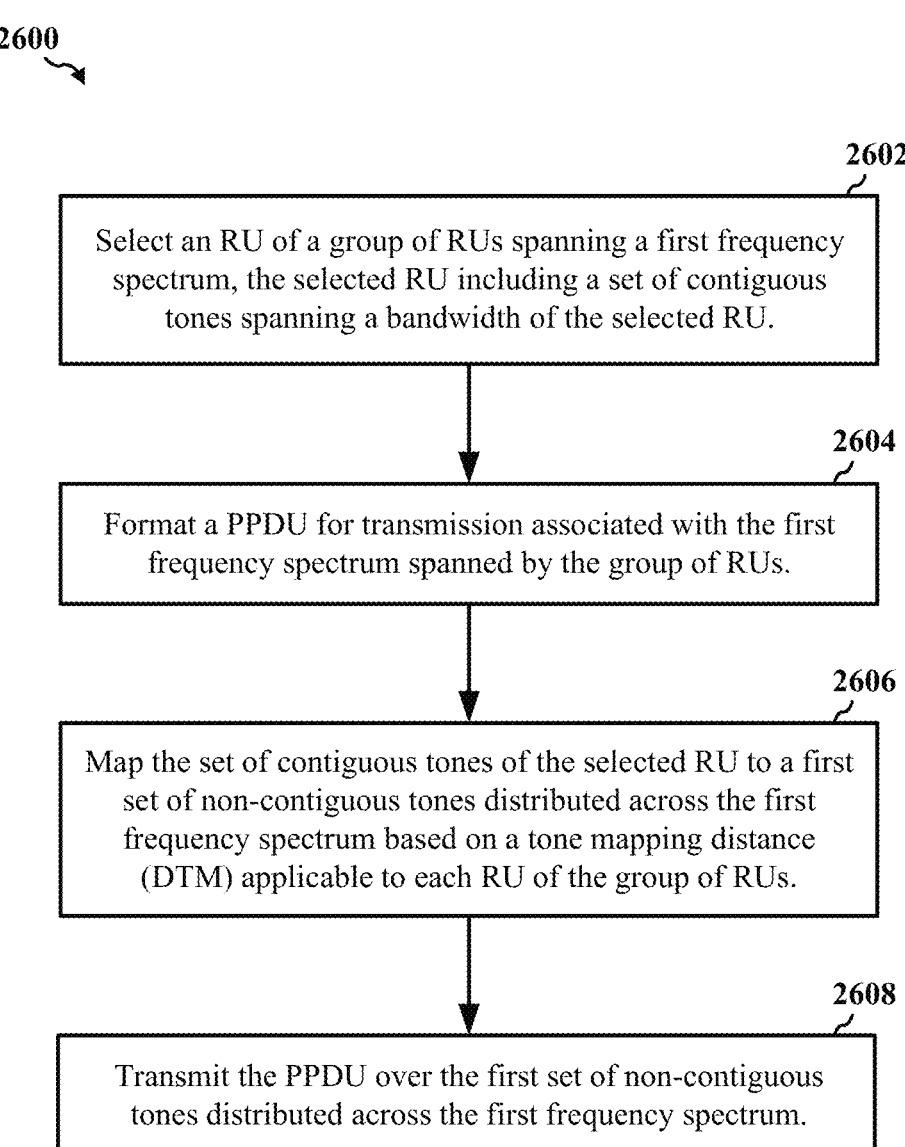

2602

Select an RU of a group of RUs spanning a first frequency spectrum, the selected RU including a set of contiguous tones spanning a bandwidth of the selected RU.

2604

Format a PPDU for transmission associated with the first frequency spectrum spanned by the group of RUs.

2606

Map the set of contiguous tones of the selected RU to a first set of non-contiguous tones distributed across the first frequency spectrum based on a tone mapping distance (DTM) applicable to each RU of the group of RUs.

2608

Transmit the PPDU over the first set of non-contiguous tones distributed across the first frequency spectrum.

Figures 27A, 27B:
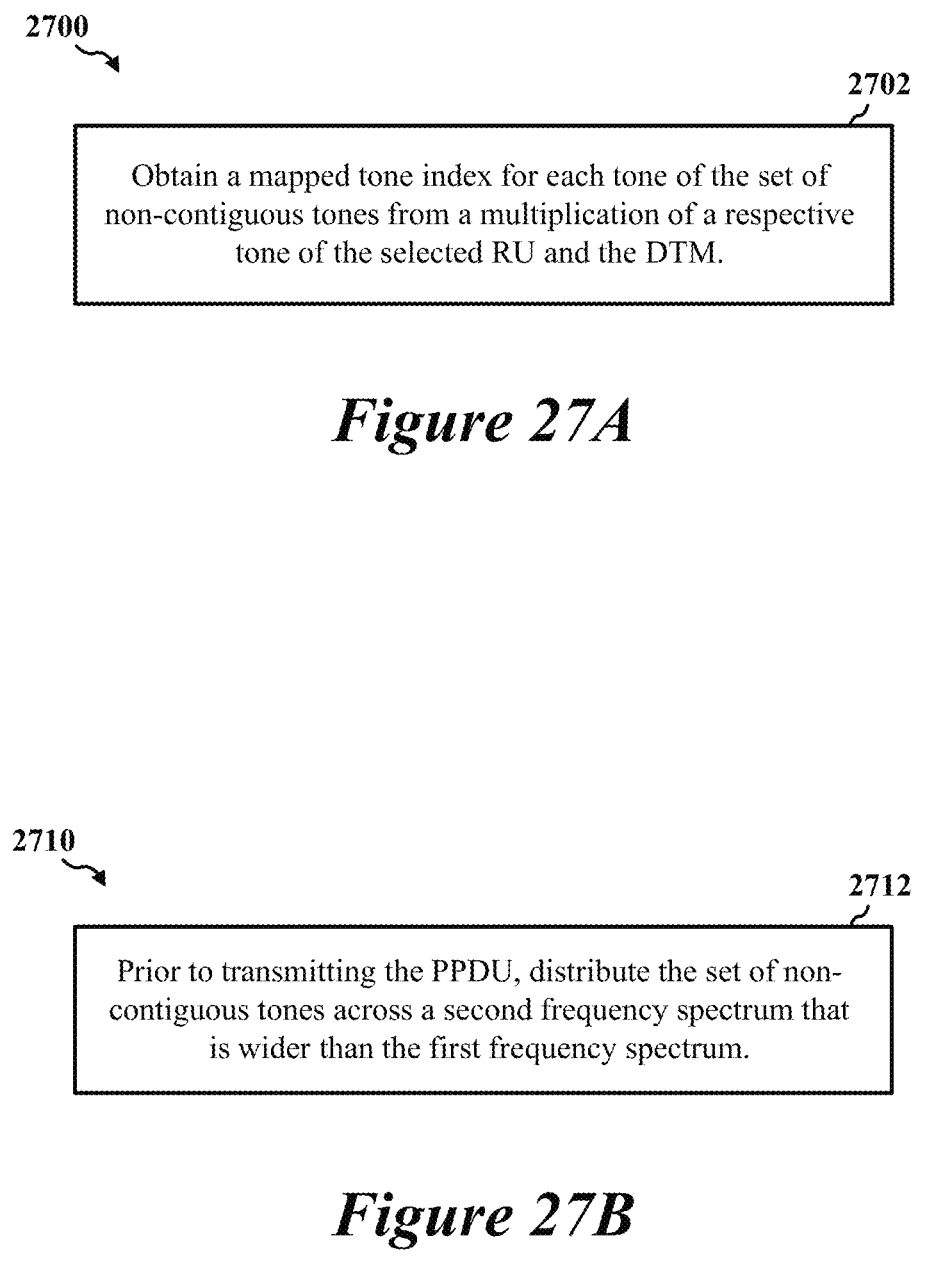

Obtain a mapped tone index for each tone of the set of non-contiguous tones from a multiplication of a respective tone of the selected RU and the DTM.

Prior to transmitting the PPDU, distribute the set of non-contiguous tones across a second frequency spectrum that is wider than the first frequency spectrum.

Figure 28:
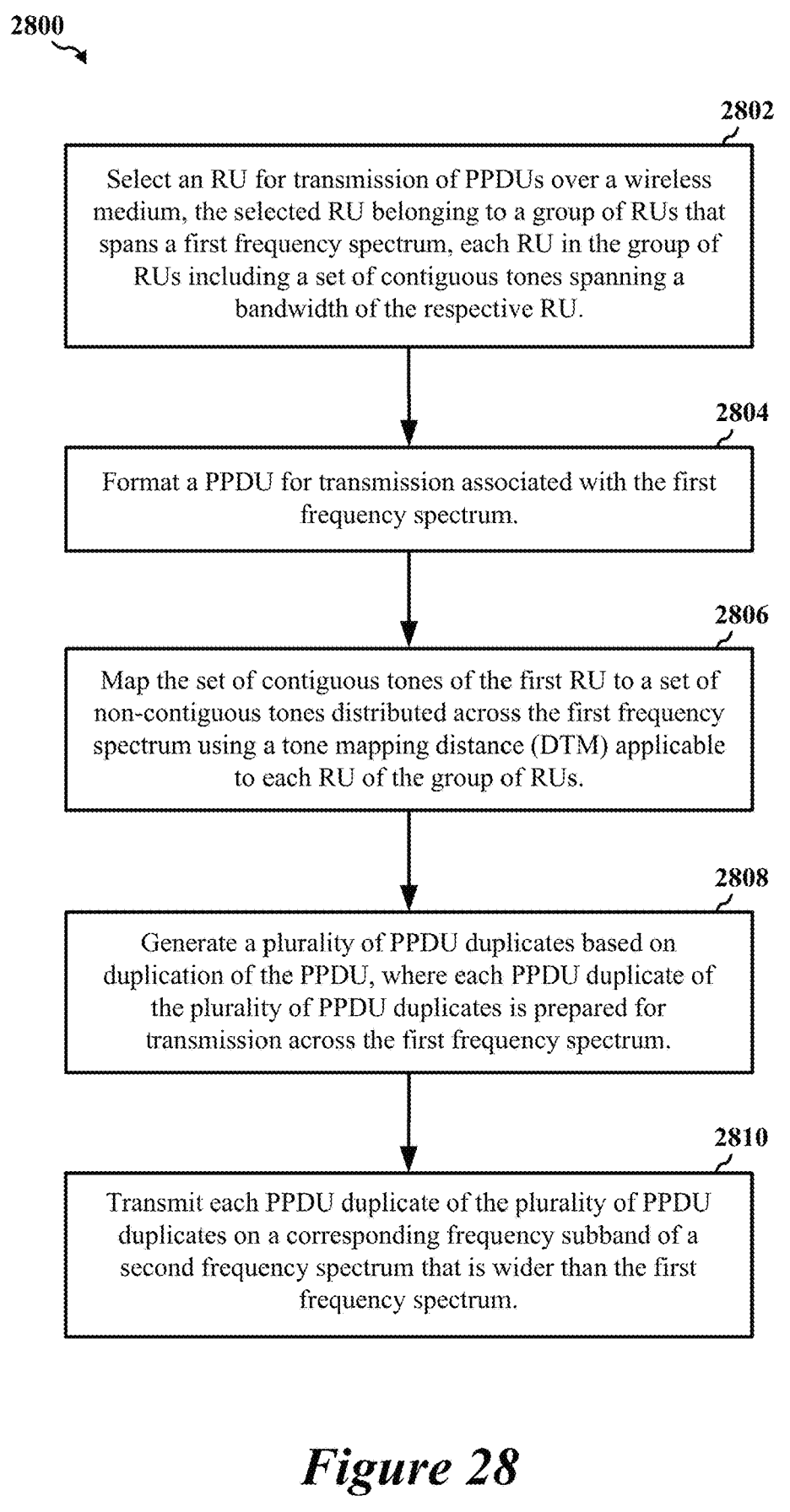

Select an RU for transmission of PPDUs over a wireless medium, the selected RU belonging to a group of RUs that spans a first frequency spectrum, each RU in the group of RUs including a set of contiguous tones spanning a bandwidth of the respective RU.

2804

Format a PPDU for transmission associated with the first frequency spectrum.

2806

Map the set of contiguous tones of the first RU to a set of non-contiguous tones distributed across the first frequency spectrum using a tone mapping distance (DTM) applicable to each RU of the group of RUs.

2808

Generate a plurality of PPDU duplicates based on duplication of the PPDU, where each PPDU duplicate of the plurality of PPDU duplicates is prepared for transmission across the first frequency spectrum.

2810

Transmit each PPDU duplicate of the plurality of PPDU duplicates on a corresponding frequency subband of a second frequency spectrum that is wider than the first frequency spectrum.

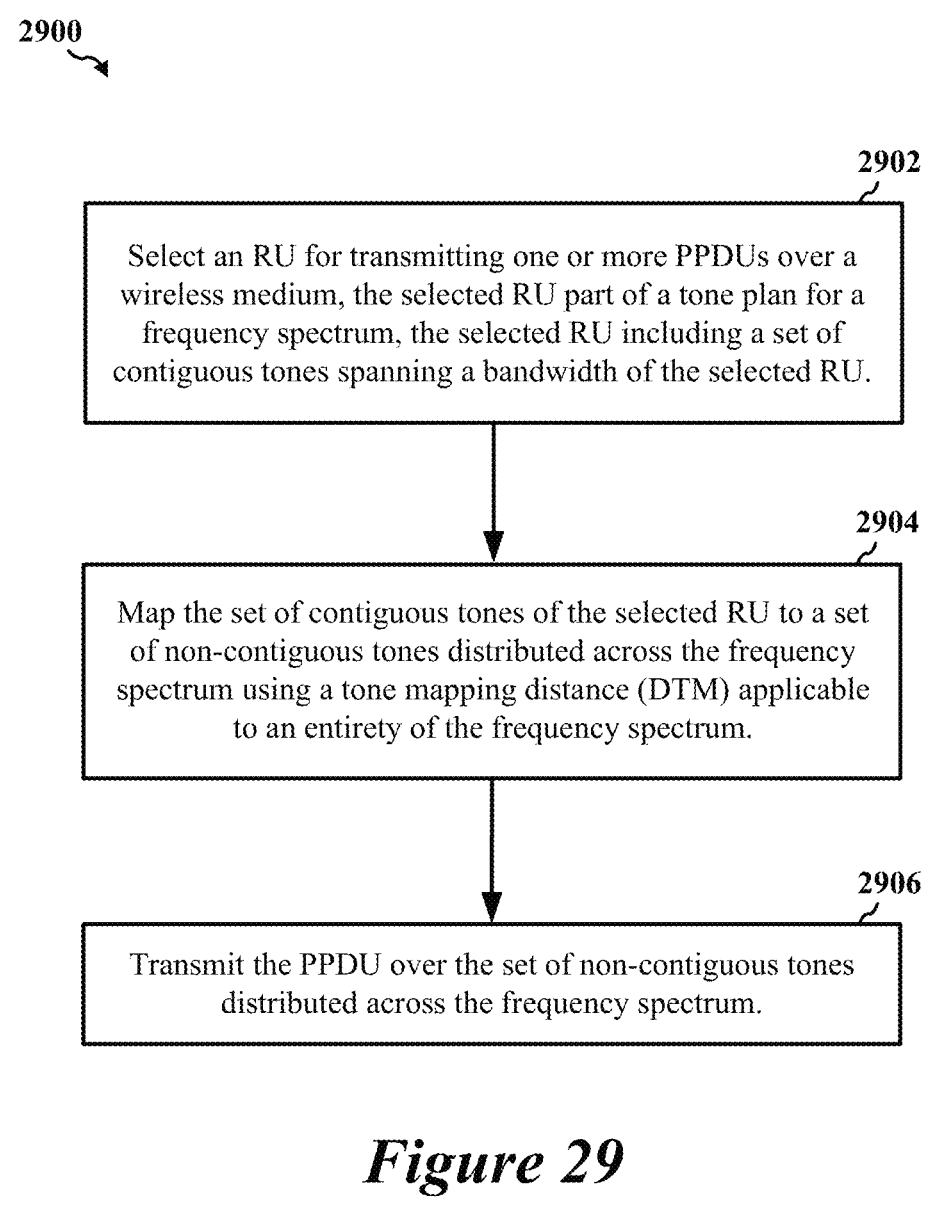

Select an RU for transmitting one or more PPDUs over a wireless medium, the selected RU part of a tone plan for a frequency spectrum, the selected RU including a set of contiguous tones spanning a bandwidth of the selected RU.

2904

Map the set of contiguous tones of the selected RU to a set of non-contiguous tones distributed across the frequency spectrum using a tone mapping distance (DTM) applicable to an entirety of the frequency spectrum.

2906

Transmit the PPDU over the set of non-contiguous tones distributed across the frequency spectrum.

*Figure 29*

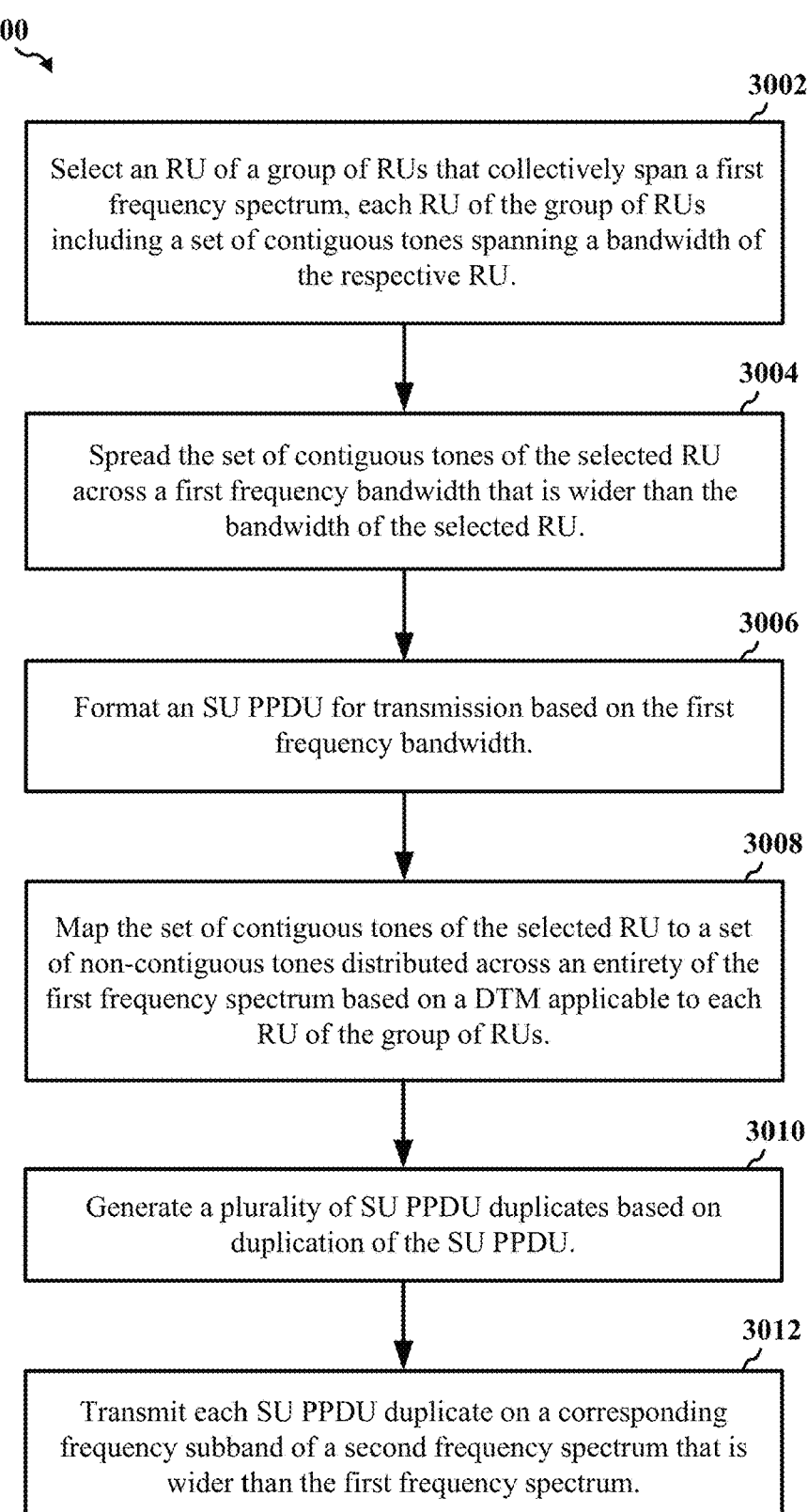

3000

3002

Select an RU of a group of RUs that collectively span a first frequency spectrum, each RU of the group of RUs including a set of contiguous tones spanning a bandwidth of the respective RU.

3004

Spread the set of contiguous tones of the selected RU across a first frequency bandwidth that is wider than the bandwidth of the selected RU.

3006

Format an SU PPDU for transmission based on the first frequency bandwidth.

3008

Map the set of contiguous tones of the selected RU to a set of non-contiguous tones distributed across an entirety of the first frequency spectrum based on a DTM applicable to each RU of the group of RUs.

3010

Generate a plurality of SU PPDU duplicates based on duplication of the SU PPDU.

3012

Transmit each SU PPDU duplicate on a corresponding frequency subband of a second frequency spectrum that is wider than the first frequency spectrum.

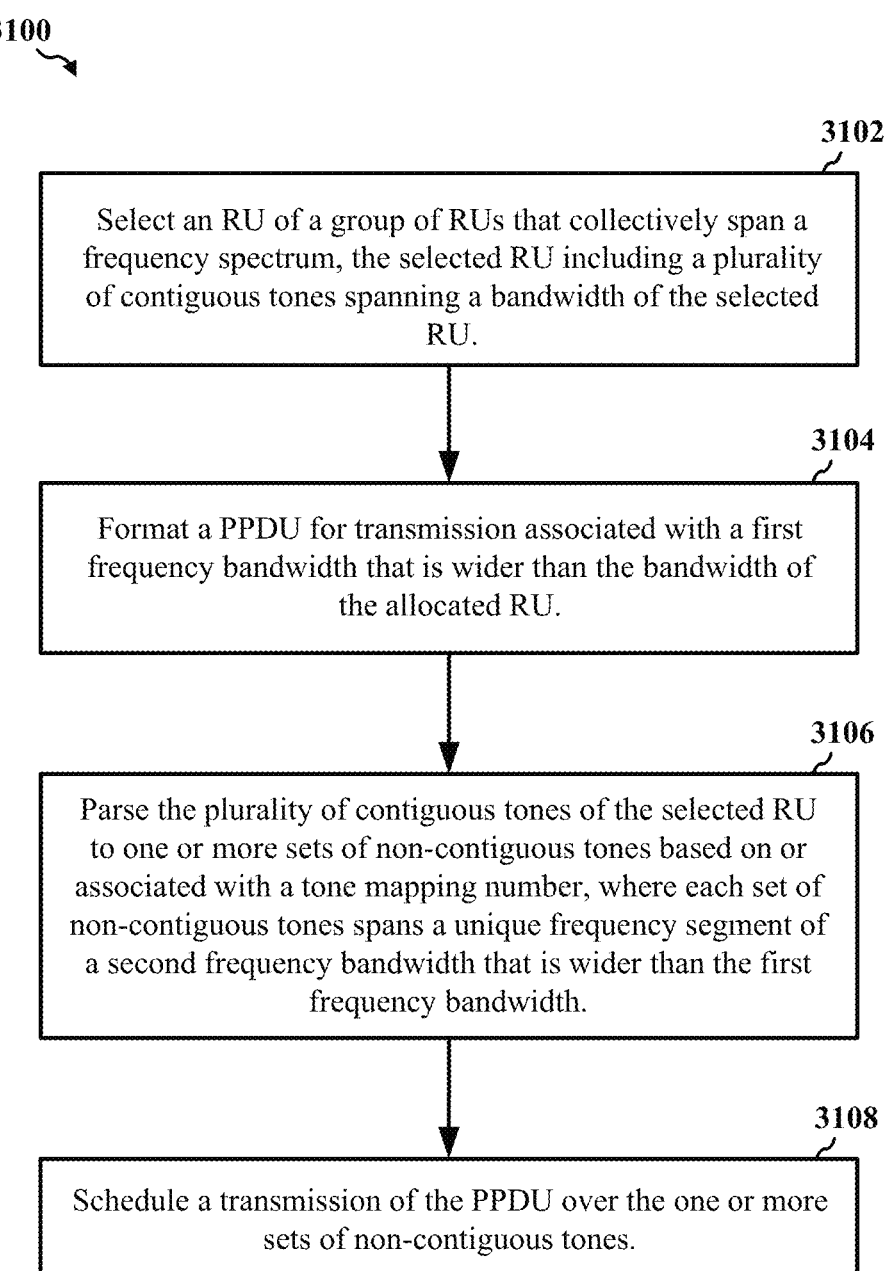

3102

Select an RU of a group of RUs that collectively span a frequency spectrum, the selected RU including a plurality of contiguous tones spanning a bandwidth of the selected RU.

3104

Format a PPDU for transmission associated with a first frequency bandwidth that is wider than the bandwidth of the allocated RU.

3106

Parse the plurality of contiguous tones of the selected RU to one or more sets of non-contiguous tones based on or associated with a tone mapping number, where each set of non-contiguous tones spans a unique frequency segment of a second frequency bandwidth that is wider than the first frequency bandwidth.

3108

Schedule a transmission of the PPDU over the one or more sets of non-contiguous tones.

| Logical RU Index | Binary index | Bit-reversed binary index | Interleaved RU Index | Tone Offset |
|---|---|---|---|---|
| 0 | 000 | 000 | 0 | 5 |
| 1 | 001 | 100 | 4 | 6 |
| 2 | 010 | 010 | 2 | 7 |
| 3 | 011 | 110 | 6 | 8 |
| 4 | 100 | 001 | 1 | 10 |
| 5 | 101 | 101 | 5 | 11 |
| 6 | 110 | 011 | 3 | 12 |
| 7 | 111 | 111 | 7 | 13 |

| Logical RU Index | Binary index | Bit-reversed binary index | Interleaved RU Index | Tone Offset |
|---|---|---|---|---|
| 0 | 0000 | 0000 | 0 | 9 |
| 1 | 0001 | 1000 | 8 | 10 |
| 2 | 0010 | 0100 | 4 | 11 |
| 3 | 0011 | 1100 | 12 | 12 |
| 4 | 0100 | 0010 | 2 | 13 |
| 5 | 0101 | 1010 | 10 | 14 |
| 6 | 0110 | 0110 | 6 | 15 |
| 7 | 0111 | 1110 | 14 | 16 |
| 8 | 1000 | 0001 | 1 | 18 |
| 9 | 1001 | 1001 | 9 | 19 |
| 10 | 1010 | 0101 | 5 | 20 |
| 11 | 1011 | 1101 | 13 | 21 |
| 12 | 1100 | 0011 | 3 | 22 |
| 13 | 1101 | 1011 | 11 | 23 |
| 14 | 1110 | 0111 | 7 | 24 |
| 15 | 1111 | 1111 | 15 | 25 |

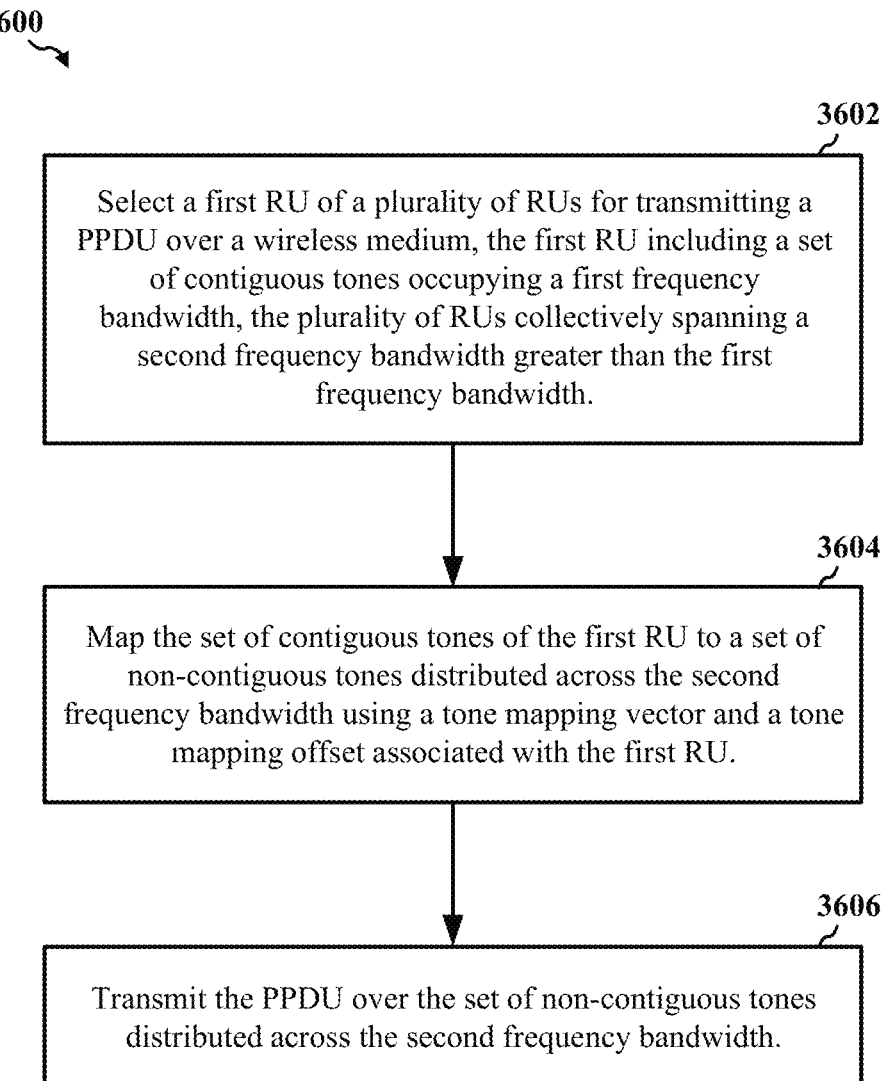

3602

Select a first RU of a plurality of RUs for transmitting a PPDU over a wireless medium, the first RU including a set of contiguous tones occupying a first frequency bandwidth, the plurality of RUs collectively spanning a second frequency bandwidth greater than the first frequency bandwidth.

3604

Map the set of contiguous tones of the first RU to a set of non-contiguous tones distributed across the second frequency bandwidth using a tone mapping vector and a tone mapping offset associated with the first RU.

3606

Transmit the PPDU over the set of non-contiguous tones distributed across the second frequency bandwidth.

Figures 37, 38, 39:
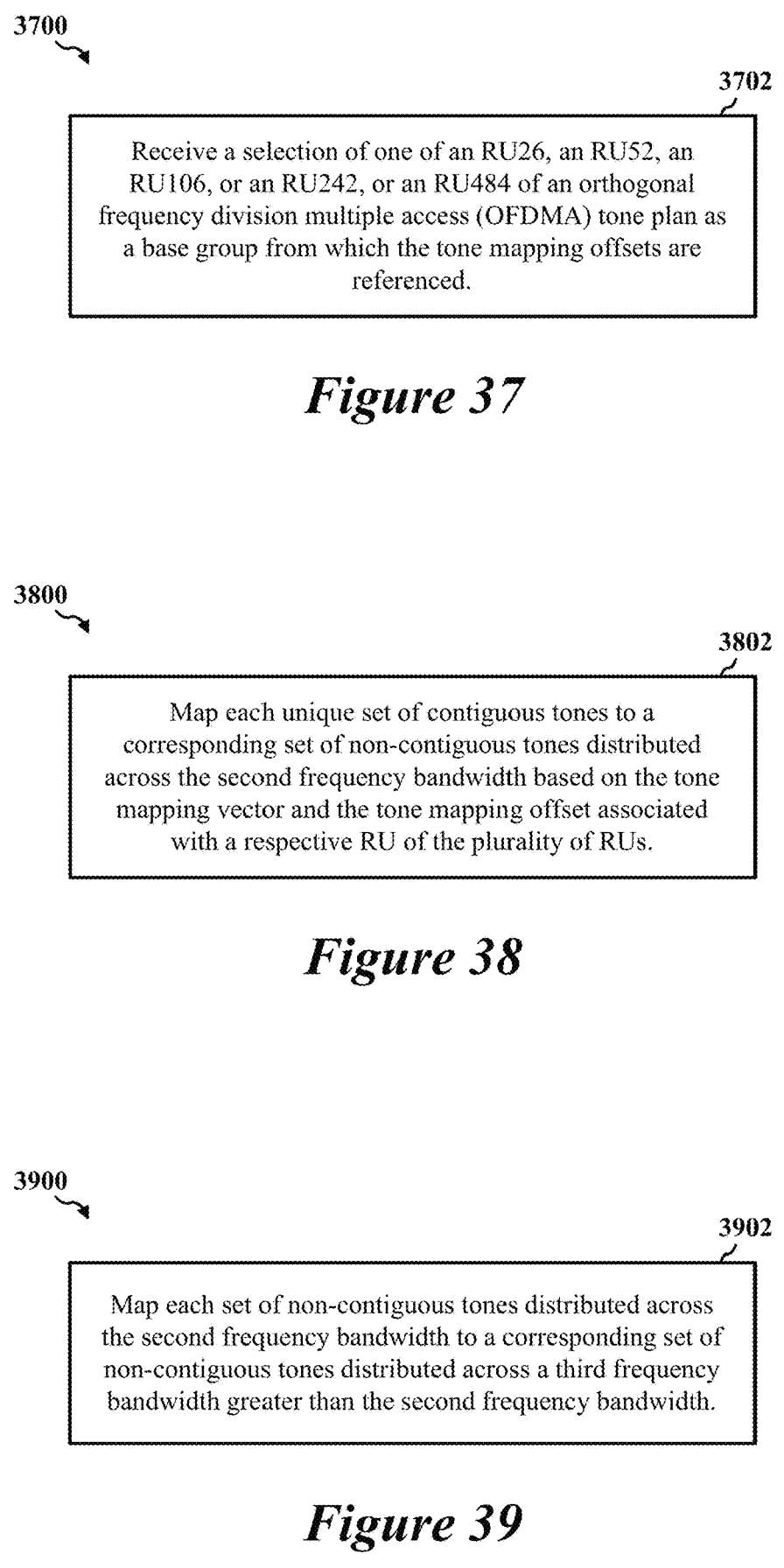

Receive a selection of one of an RU26, an RU52, an RU106, or an RU242, or an RU484 of an orthogonal frequency division multiple access (OFDMA) tone plan as a base group from which the tone mapping offsets are referenced.

Map each unique set of contiguous tones to a corresponding set of non-contiguous tones distributed across the second frequency bandwidth based on the tone mapping vector and the tone mapping offset associated with a respective RU of the plurality of RUs.

Map each set of non-contiguous tones distributed across the second frequency bandwidth to a corresponding set of non-contiguous tones distributed across a third frequency bandwidth greater than the second frequency bandwidth.

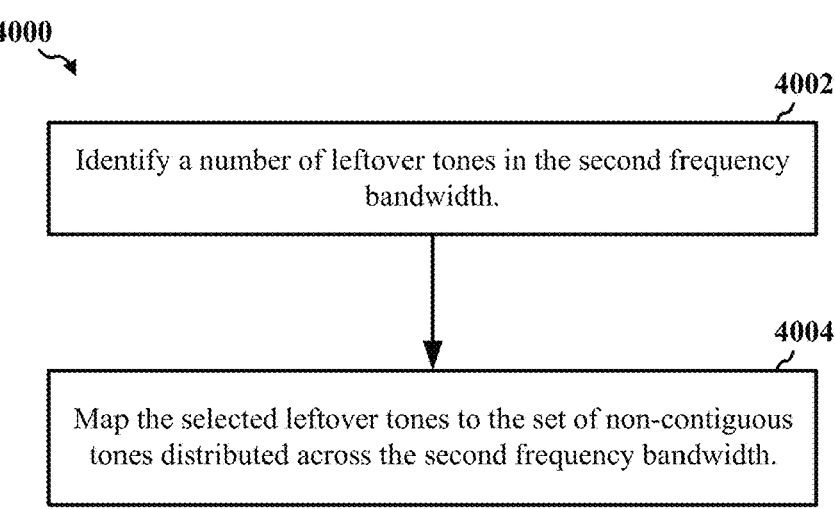

4002

Identify a number of leftover tones in the second frequency bandwidth.

4004

Map the selected leftover tones to the set of non-contiguous tones distributed across the second frequency bandwidth.

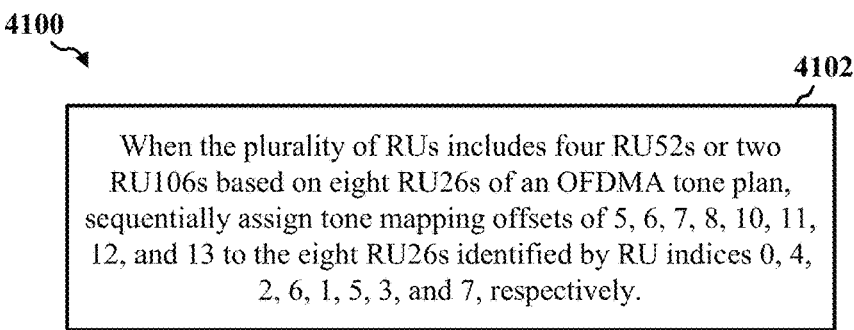

4102

When the plurality of RUs includes four RU52s or two RU106s based on eight RU26s of an OFDMA tone plan, sequentially assign tone mapping offsets of 5, 6, 7, 8, 10, 11, 12, and 13 to the eight RU26s identified by RU indices 0, 4, 2, 6, 1, 5, 3, and 7, respectively.

When the plurality of RUs includes eight RU52s or four RU106s based on sixteen RU26s of an OFDMA tone plan, sequentially assign tone mapping offsets of 9, 10, 11, 12, 13, 14, 15, 16, 18, 19, 20, 21, 22, 23, 24, and 25 to the sixteen RU26s identified by RU indices 0, 8, 4, 12, 2, 10, 6, 14, 1, 9, 5, 13, 3, 11, 7, and 15, respectively.

When the plurality of RUs includes eight RU52s or four RU106s based on sixteen RU26s of an OFDMA tone plan, sequentially assign tone mapping offset values between 9–12, 14–21, and 23–26 to the sixteen RU26s identified by RU indices of 0, 8, 4, 12, 2, 10, 6, 14, 1, 9, 5, 13, 3, 11, 7, and 15, respectively.

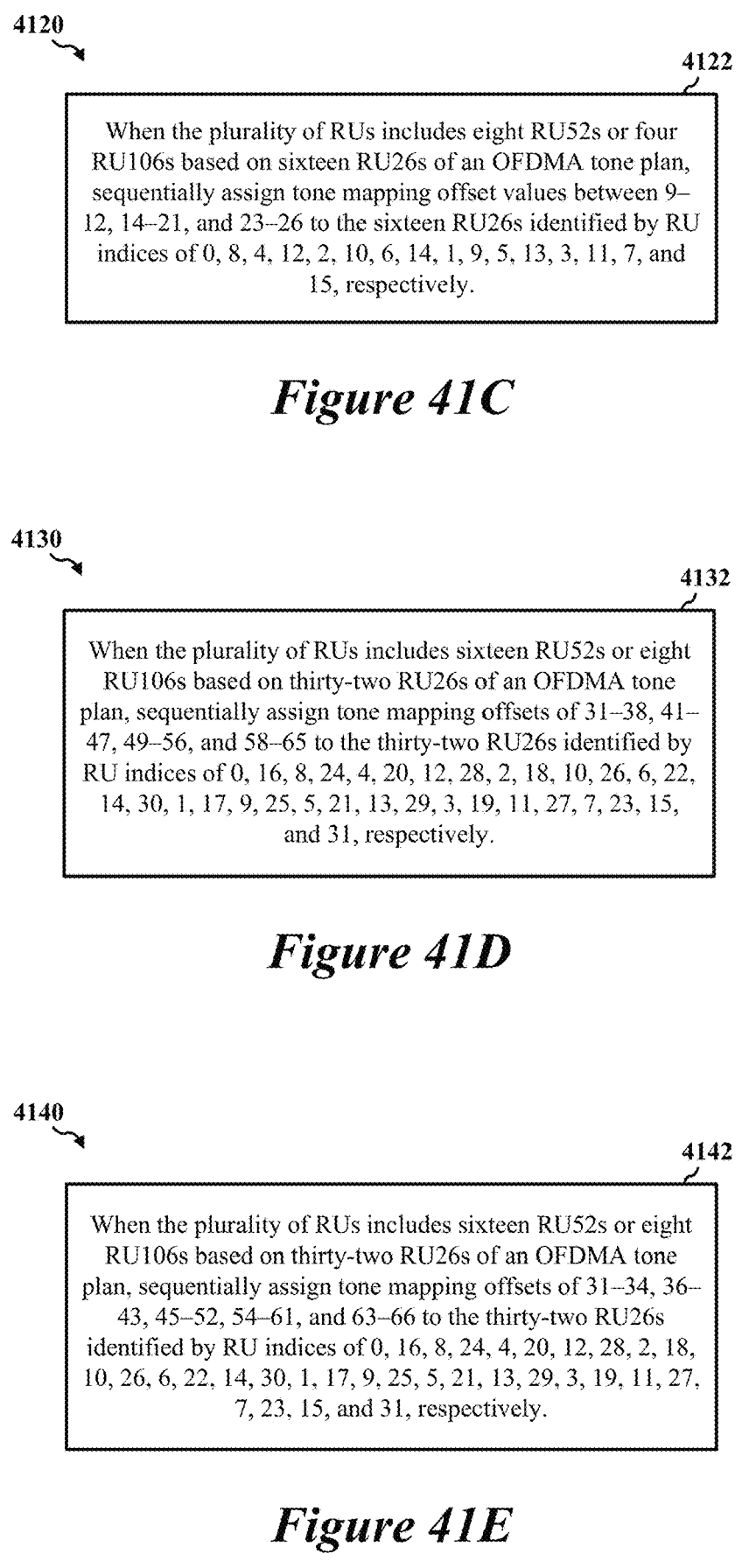

When the plurality of RUs includes sixteen RU52s or eight RU106s based on thirty-two RU26s of an OFDMA tone plan, sequentially assign tone mapping offsets of 31–38, 41–47, 49–56, and 58–65 to the thirty-two RU26s identified by RU indices of 0, 16, 8, 24, 4, 20, 12, 28, 2, 18, 10, 26, 6, 22, 14, 30, 1, 17, 9, 25, 5, 21, 13, 29, 3, 19, 11, 27, 7, 23, 15, and 31, respectively.

When the plurality of RUs includes sixteen RU52s or eight RU106s based on thirty-two RU26s of an OFDMA tone plan, sequentially assign tone mapping offsets of 31–34, 36–43, 45–52, 54–61, and 63–66 to the thirty-two RU26s identified by RU indices of 0, 16, 8, 24, 4, 20, 12, 28, 2, 18, 10, 26, 6, 22, 14, 30, 1, 17, 9, 25, 5, 21, 13, 29, 3, 19, 11, 27, 7, 23, 15, and 31, respectively.

*Figure 41E*

WIRELESS TRANSMISSIONS USING DISTRIBUTED TONES

CROSS-REFERENCE TO RELATED APPLICATION

This Patent Application is a continuation of U.S. patent application Ser. No. 17/196,557 entitled "WIRELESS TRANSMISSIONS USING DISTRIBUTED TONES" filed on Mar. 9, 2021, which claims priority to U.S. Provisional Patent Application No. 63/115,021 entitled "WIRELESS TRANSMISSIONS USING DISTRIBUTED TONES" filed on Nov. 17, 2020, to U.S. Provisional Patent Application No. 63/027,349 entitled "DISTRIBUTED TONE MAPPING FOR POWER SPECTRAL DENSITY (PSD) LIMITS" filed on May 19, 2020, to U.S. Provisional Patent Application No. 62/989,588 entitled "PHYSICAL LAYER (PHY) PACKET DESIGN FOR POWER SPECTRAL DENSITY (PSD) LIMITS" filed on Mar. 13, 2020, and to U.S. Provisional Patent Application No. 63/009,450 entitled "PHYSICAL LAYER (PHY) PACKET DESIGN FOR POWER SPEC-TRAL DENSITY (PSD) LIMITS" filed on Apr. 13, 2020, all of which are assigned to the assignee hereof. The disclosures of all prior Applications are considered part of and are incorporated by reference in this Patent Application in their respective entireties.

TECHNICAL FIELD

This disclosure relates generally to wireless communication, and more specifically to physical layer (PHY) packets and signaling for wireless transmissions.

DESCRIPTION OF THE RELATED TECHNOLOGY

A wireless local area network (WLAN) may be formed by one or more access points (APs) that provide a shared wireless communication medium for use by a number of client devices such as stations (STAs). An AP may manage a Basic Service Set (BSS), which may be identified by a Basic Service Set Identifier (BSSID) that is advertised by the AP. An AP periodically broadcasts beacon frames to enable any STAs within wireless range of the AP to establish or maintain a communication link with the WLAN. New WLAN communication protocols are being developed to enable enhanced WLAN communication features.

In some instances, APs and STAs may be subject to power spectral density (PSD) limits that can undesirably reduce transmission ranges. These PSD limits also may reduce packet detection and channel estimation capabilities of APs and STAs.

SUMMARY

The systems, methods and devices of this disclosure each have several innovative aspects, no single one of which is solely responsible for the desirable attributes disclosed herein.

One innovative aspect of the subject matter described in this disclosure can be implemented in a method for wireless communication. The method may be performed by an apparatus of a wireless communication device, and may include selecting a first resource unit (RU) of a plurality of RUs for transmitting a physical (PHY) layer convergence protocol (PLCP) protocol data unit (PPDU) over a wireless medium. The first RU may include a set of contiguous tones occupying a first frequency bandwidth, and the plurality of RUs may collectively span a second frequency bandwidth greater than the first frequency bandwidth. The method may include mapping the set of contiguous tones of the first RU to a set of non-contiguous tones distributed across the second frequency bandwidth using a tone mapping vector and a tone mapping offset associated with the first RU. The method may include transmitting the PPDU over the set of non-contiguous tones distributed across the second frequency bandwidth.

In some implementations, mapping the set of contiguous tones may include mapping pilot tones and data tones of the first RU to the set of non-contiguous tones distributed across the second frequency bandwidth. In some instances, the tones of the set of non-contiguous tones are interleaved with the tones of one or more other sets of non-contiguous tones distributed across the second frequency bandwidth. In some other instances, the tone mapping offset associated with the first RU may be a bit-reversed ordering of an RU index of the first RU. The tone mapping vector may indicate a starting tone index, an ending tone index, and a tone spacing of the set of non-contiguous tones.

In some implementations, an ordering of the tones of the sets of non-contiguous tones distributed across the second frequency bandwidth may be based on or associated with the tone mapping offsets of the plurality of RUs. In some instances, an ordering of the tones of the sets of non-contiguous tones distributed across the second frequency bandwidth may be different than an ordering of the tones of the unique sets of contiguous tones corresponding to the plurality of RUs.

In some implementations, the method also may include mapping each set of non-contiguous tones distributed across the second frequency bandwidth to a corresponding set of non-contiguous tones distributed across a third frequency bandwidth greater than the second frequency bandwidth. In some other implementations, the method also may include identifying a number of leftover tones in the second frequency bandwidth, and mapping the selected leftover tones to the set of non-contiguous tones distributed across the second frequency bandwidth. In some instances, the number of selected leftover tones may be a modulo of the number of contiguous tones in the one of the RU52, the RU106, the RU242, or the RU484 and the number of contiguous tones in the RU26. In some other implementations, the method also may include receiving an RU26, an RU52, an RU106, an RU242, or an RU484 of an orthogonal frequency division multiple access (OFDMA) tone plan as a base group from which the tone mapping offsets are referenced.

In some implementations, the plurality of RUs may include four RU52s or two RU106s based on eight RU26s of an OFDMA tone plan. In some instances, mapping the unique sets of contiguous tones may include sequentially assigning tone mapping offsets of 5, 6, 7, 8, 10, 11, 12, and 13 to the eight RU26s identified by RU indices 0, 4, 2, 6, 1, 5, 3, and 7, respectively, and assigning a tone mapping offset of 9 to the center 26-tone RU of the OFDMA tone plan.

In some other implementations, the plurality of RUs includes eight RU52s or four RU106s based on sixteen RU26s of an OFDMA tone plan, and mapping the unique sets of contiguous tones includes sequentially assigning tone mapping offsets of 9, 10, 11, 12, 13, 14, 15, 16, 18, 19, 20, 21, 22, 23, 24, and 25 to the sixteen RU26s identified by RU indices 0, 8, 4, 12, 2, 10, 6, 14, 1, 9, 5, 13, 3, 11, 7, and 15, respectively, and assigning tone mapping offsets of 17 and 26 to the middle 26-tone RUs of the OFDMA tone plan.

In some other implementations, the plurality of RUs includes eight RU52s or four RU106s based on sixteen RU26s of an OFDMA tone plan, and mapping the unique sets of contiguous tones includes sequentially assigning tone mapping offset values between 9-12, 14-21, and 23-26 to the sixteen RU26s identified by RU indices of 0, 8, 4, 12, 2, 10, 6, 14, 1, 9, 5, 13, 3, 11, 7, and 15, respectively, and assigning tone mapping offsets of 13 and 22 to the two middle 26-tone RUs of the OFDMA tone plan.

In some other implementations, the plurality of RUs includes sixteen RU52s or eight RU106s based on thirty-two RU26s of an OFDMA tone plan, and mapping the unique sets of contiguous tones includes sequentially assigning tone mapping offsets of 31-38, 40-47, 49-56, and 58-65 to the thirty-two RU26s identified by RU indices of 0, 16, 8, 24, 4, 20, 12, 28, 2, 18, 10, 26, 6, 22, 14, 30, 1, 17, 9, 25, 5, 21, 13, 29, 3, 19, 11, 27, 7, 23, 15, and 31, respectively, and assigning tone mapping offsets of 39, 48, 57, and 66 to the four middle 26-tone RUs of the OFDMA tone plan.

In some other implementations, the plurality of RUs includes sixteen RU52s or eight RU106s based on thirty-two RU26s of an OFDMA tone plan, and mapping the unique sets of contiguous tones includes sequentially assigning tone mapping offsets of 31-34, 36-43, 45-52, 54-61, and 63-66 to the thirty-two RU26s identified by RU indices of 0, 16, 8, 24, 4, 20, 12, 28, 2, 18, 10, 26, 6, 22, 14, 30, 1, 17, 9, 25, 5, 21, 13, 29, 3, 19, 11, 27, 7, 23, 15, and 31, respectively, and assigning tone mapping offsets of 35, 44, 53, and 62 to the four middle 26-tone RUs of the OFDMA tone plan.

Another innovative aspect of the subject matter described in this disclosure can be implemented in a wireless communication device. The wireless communication device may include a processing system coupled to an interface. The processing system may be configured to select a first RU of a plurality of RUs for transmitting a PPDU over a wireless medium. The first RU may include a set of contiguous tones occupying a first frequency bandwidth, and the plurality of RUs may collectively span a second frequency bandwidth greater than the first frequency bandwidth. The processing system may be configured to map the set of contiguous tones of the first RU to a set of non-contiguous tones distributed across the second frequency bandwidth using a tone mapping vector and a tone mapping offset associated with the first RU. The interface may be configured to output the PPDU for transmission over the set of non-contiguous tones distributed across the second frequency bandwidth.

In some implementations, mapping the set of contiguous tones may include mapping pilot tones and data tones of the first RU to the set of non-contiguous tones distributed across the second frequency bandwidth. In some instances, the tones of the set of non-contiguous tones are interleaved with the tones of one or more other sets of non-contiguous tones distributed across the second frequency bandwidth. In some other instances, the tone mapping offset associated with the first RU may be a bit-reversed ordering of an RU index of the first RU. The tone mapping vector may indicate a starting tone index, an ending tone index, and a tone spacing of the set of non-contiguous tones.

In some implementations, an ordering of the tones of the sets of non-contiguous tones distributed across the second frequency bandwidth may be based on or associated with the tone mapping offsets of the plurality of RUs. In some instances, an ordering of the tones of the sets of non-contiguous tones distributed across the second frequency bandwidth may be different than an ordering of the tones of the unique sets of contiguous tones corresponding to the plurality of RUs.

In some implementations, the processing system may be further configured to map each set of non-contiguous tones distributed across the second frequency bandwidth to a corresponding set of non-contiguous tones distributed across a third frequency bandwidth greater than the second frequency bandwidth. In some other implementations, the processing system may be further configured to identify a number of leftover tones in the second frequency bandwidth, and to map the selected leftover tones to the set of non-contiguous tones distributed across the second frequency bandwidth. In some instances, the number of selected leftover tones may be a modulo of the number of contiguous tones in the one of the RU52, the RU106, the RU242, or the RU484 and the number of contiguous tones in the RU26. In some other implementations, the interface may be further configured to receive an RU26, an RU52, an RU106, an RU242, or an RU484 of an orthogonal frequency division multiple access (OFDMA) tone plan as a base group from which the tone mapping offsets are referenced.

In some implementations, the plurality of RUs may include four RU52s or two RU106s based on eight RU26s of an OFDMA tone plan. In some instances, mapping the unique sets of contiguous tones may include sequentially assigning tone mapping offsets of 5, 6, 7, 8, 10, 11, 12, and 13 to the eight RU26s identified by RU indices 0, 4, 2, 6, 1, 5, 3, and 7, respectively, and assigning a tone mapping offset of 9 to the center 26-tone RU of the OFDMA tone plan.

In some other implementations, the plurality of RUs includes eight RU52s or four RU106s based on sixteen RU26s of an OFDMA tone plan, and mapping the unique sets of contiguous tones includes sequentially assigning tone mapping offsets of 9, 10, 11, 12, 13, 14, 15, 16, 18, 19, 20, 21, 22, 23, 24, and 25 to the sixteen RU26s identified by RU indices 0, 8, 4, 12, 2, 10, 6, 14, 1, 9, 5, 13, 3, 11, 7, and 15, respectively, and assigning tone mapping offsets of 17 and 26 to the middle 26-tone RUs of the OFDMA tone plan.

In some other implementations, the plurality of RUs includes eight RU52s or four RU106s based on sixteen RU26s of an OFDMA tone plan, and mapping the unique sets of contiguous tones includes sequentially assigning tone mapping offset values between 9-12, 14-21, and 23-26 to the sixteen RU26s identified by RU indices of 0, 8, 4, 12, 2, 10, 6, 14, 1, 9, 5, 13, 3, 11, 7, and 15, respectively, and assigning tone mapping offsets of 13 and 22 to the two middle 26-tone RUs of the OFDMA tone plan.

In some other implementations, the plurality of RUs includes sixteen RU52s or eight RU106s based on thirty-two RU26s of an OFDMA tone plan, and mapping the unique sets of contiguous tones includes sequentially assigning tone mapping offsets of 31-38, 40-47, 49-56, and 58-65 to the thirty-two RU26s identified by RU indices of 0, 16, 8, 24, 4, 20, 12, 28, 2, 18, 10, 26, 6, 22, 14, 30, 1, 17, 9, 25, 5, 21, 13, 29, 3, 19, 11, 27, 7, 23, 15, and 31, respectively, and assigning tone mapping offsets of 39, 48, 57, and 66 to the four middle 26-tone RUs of the OFDMA tone plan.

In some other implementations, the plurality of RUs includes sixteen RU52s or eight RU106s based on thirty-two RU26s of an OFDMA tone plan, and mapping the unique sets of contiguous tones includes sequentially assigning tone mapping offsets of 31-34, 36-43, 45-52, 54-61, and 63-66 to the thirty-two RU26s identified by RU indices of 0, 16, 8, 24, 4, 20, 12, 28, 2, 18, 10, 26, 6, 22, 14, 30, 1, 17, 9, 25, 5, 21, 13, 29, 3, 19, 11, 27, 7, 23, 15, and 31, respectively, and assigning tone mapping offsets of 35, 44, 53, and 62 to the four middle 26-tone RUs of the OFDMA tone plan.

Details of one or more implementations of the subject matter described in this disclosure are set forth in the accompanying drawings and the description below. Other features, aspects, and advantages will become apparent from the description, the drawings and the claims. Note that the relative dimensions of the following figures may not be drawn to scale.

BRIEF DESCRIPTION OF THE DRAWINGS

FIG. 11 shows a flowchart illustrating an example operation for wireless communication that supports transmitting PPDU duplicates.

FIGS. 12A, 12B, and 12C show flowcharts illustrating example operations for wireless communication that support transmitting PPDU duplicates.

FIG. 13 shows a flowchart illustrating an example operation for wireless communication that supports RU duplication.

FIG. 14 shows a flowchart illustrating an example operation for wireless communication that supports transmitting one or more PPDUs using tone mapping.

FIGS. 15A and 15B show flowcharts illustrating example operations for wireless communication that support transmitting one or more PPDUs using tone mapping.

FIG. 20 shows a flowchart illustrating an example operation for wireless communication that supports transmitting one or more PPDUs using tone mapping.

FIGS. 21A, 21B, 21C, 21D, 21E and 21F show flowcharts illustrating example operations for wireless communication that support transmitting one or more PPDUs using tone mapping.

FIG. 22 shows a flowchart illustrating an example operation for wireless communication that supports transmitting one or more PPDUs using tone mapping.

FIG. 23 shows a flowchart illustrating an example operation for wireless communication that supports transmitting one or more PPDUs using tone mapping.

FIG. 26 shows a flowchart illustrating an example operation for wireless communication that supports transmission of one or more PPDUs using tone mapping based on a DTM.

FIGS. 27A and 27B show flowcharts illustrating example operations for wireless communication that support transmission of one or more PPDUs using tone mapping based on a DTM.

FIG. 28 shows a flowchart illustrating an example operation for wireless communication that supports transmission of one or more PPDUs using tone mapping and PPDU duplicates.

FIG. 29 shows a flowchart illustrating an example operation for wireless communication that supports transmission of one or more single-user (SU) PPDUs using tone mapping based on a DTM.

FIG. 30 shows a flowchart illustrating an example operation for wireless communication that supports transmission of one or more PPDUs using tone mapping based on a DTM and PPDU duplicates.

FIG. 31 shows a flowchart illustrating an example operation for wireless communication that supports transmission of one or more PPDUs using tone mapping based on parsing.

FIG. 33 shows an example table of tone mapping offsets.

FIG. 34 shows another example table of tone mapping offsets.

FIG. 36 shows a flowchart illustrating an example operation for wireless communication that supports tone mapping based on a tone mapping vector and a tone mapping offset.

FIG. 37 shows a flowchart illustrating another example operation for wireless communication that supports tone mapping based on a tone mapping vector and a tone mapping offset.

FIG. 38 shows a flowchart illustrating another example operation for wireless communication that supports tone mapping based on a tone mapping vector and a tone mapping offset.

FIG. 39 shows a flowchart illustrating another example operation for wireless communication that supports tone mapping based on a tone mapping vector and a tone mapping offset.

FIG. 40 shows a flowchart illustrating another example operation for wireless communication that supports tone mapping based on a tone mapping vector and a tone mapping offset.

FIGS. 41A-41E show flowcharts illustrating other example operations for wireless communication that support tone mapping based on a tone mapping vector and a tone mapping offset.

Like reference numbers and designations in the various drawings indicate like elements.

DETAILED DESCRIPTION

Figure 1:
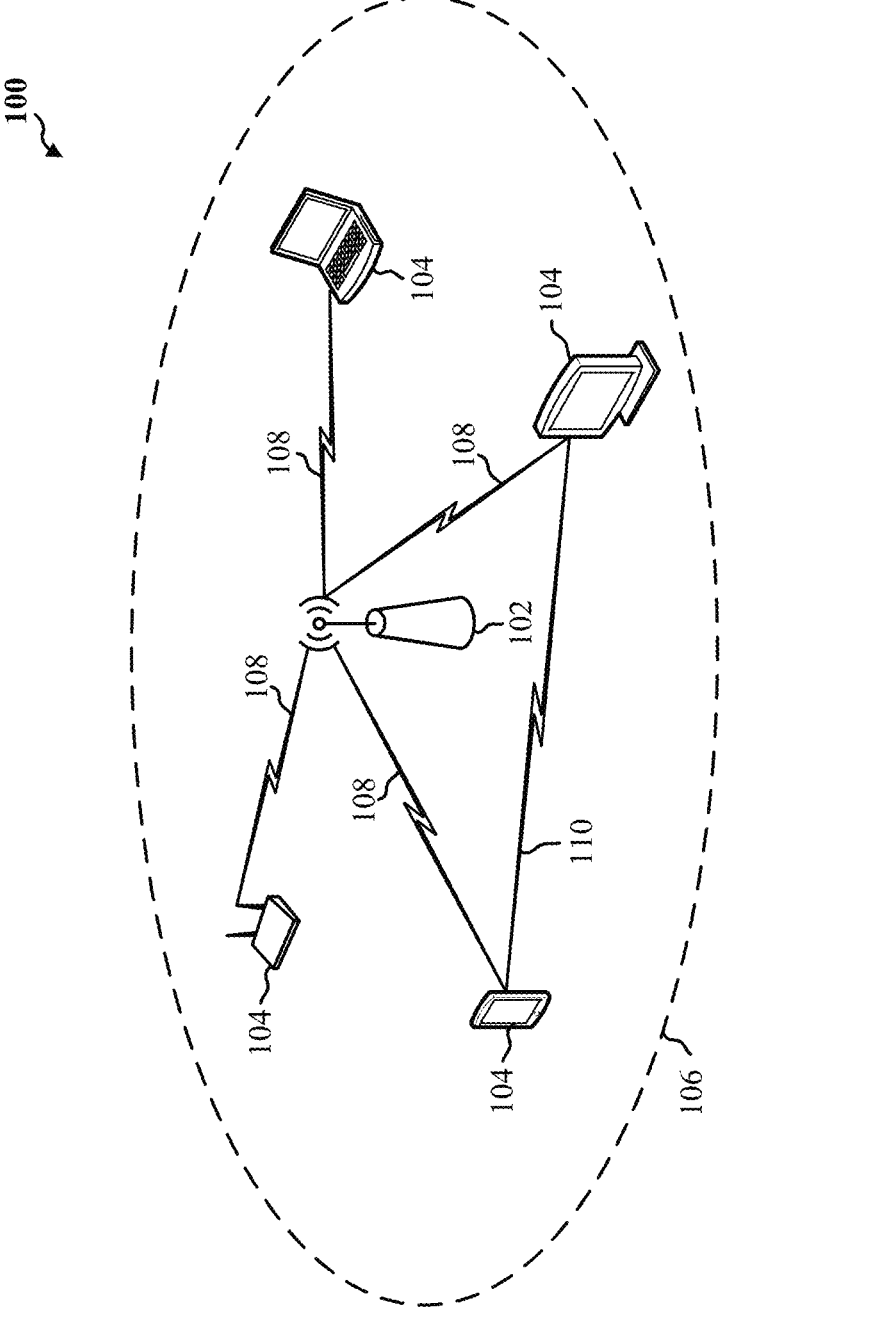
FIG. 1 shows a block diagram of an example wireless communication network.

The following description is directed to certain implementations for the purposes of describing innovative aspects of this disclosure. However, a person having ordinary skill in the art will readily recognize that the teachings herein can be applied in a multitude of different ways. The described implementations can be implemented in any device, system or network that is capable of transmitting and receiving radio frequency (RF) signals according to one or more of the Institute of Electrical and Electronics Engineers (IEEE) 802.11 standards, the IEEE 802.15 standards, the Bluetooth® standards as defined by the Bluetooth Special Interest Group (SIG), or the Long Term Evolution (LTE), 3G, 4G or 5G (New Radio (NR)) standards promulgated by the 3rd Generation Partnership Project (3GPP), among others. The described implementations can be implemented in any device, system or network that is capable of transmitting and receiving RF signals according to one or more of the following technologies or techniques: code division multiple access (CDMA), time division multiple access (TDMA), frequency division multiple access (FDMA), orthogonal FDMA (OFDMA), single-carrier FDMA (SC-FDMA), single-user (SU) multiple-input multiple-output (MIMO) and multi-user (MU) MIMO. The described implementations also can be implemented using other wireless communication protocols or RF signals suitable for use in one or more of a wireless personal area network (WPAN), a wireless local area network (WLAN), a wireless wide area network (WWAN), or an internet of things (IOT) network.

Various implementations relate generally to increasing the allowed transmit power of APs and STAs. APs and STAs may be subject to power spectral density (PSD) limits that can undesirably reduce transmission ranges, reduce packet detection capabilities, and reduce channel estimation capabilities of APs and STAs. For example, recently proposed PSD limits on wireless communications in the 6 GHz frequency band may limit the transmit power of APs to 5 dBm/MHz, and may limit the transmit power of non-AP STAs to −1 dBm/MHz. Some implementations more specifically relate to using tone mapping to increase the frequency bandwidth upon which information is transmitted between wireless communication devices. In some instances, the STA may identify a first resource unit (RU) of a plurality of RUs allocated to the STA for wireless transmissions. The first RU may include a set of contiguous tones occupying a first frequency bandwidth, and the plurality of RUs may span a second frequency bandwidth greater than the first frequency bandwidth. The STA may prepare a PPDU based on the second frequency bandwidth. The STA may map the set of contiguous tones occupying the first frequency bandwidth of the first RU to a set of non-contiguous tones distributed across the second frequency bandwidth based on a tone mapping vector and a tone mapping offset associated with the first RU. The STA may transmit the PPDU using the set of non-contiguous tones distributed across the second frequency bandwidth.

Particular implementations of the subject matter described in this disclosure can be implemented to realize one or more of the following potential advantages. In some implementations, the described techniques can be used to increase the allowable transmit power of APs and STAs. Specifically, because PSD limits imposed on wireless communications are expressed as a function of bandwidth, the maximum transmit power allowed by such PSD limits may be increased by using larger bandwidths for wireless communications without increasing the number or width of RUs allocated for such communications. In some implementations, a STA that is allocated an RU including a set of contiguous tones spanning a first frequency bandwidth may map the tones of the allocated RU to a set of non-contiguous tones distributed across a second frequency bandwidth larger than the first frequency bandwidth, and transmit data using the mapped tones distributed across the second frequency bandwidth. Transmitting information on a wider frequency bandwidth may increase the PSD limit applicable to such transmissions, which may allow the STA to use higher transmit power levels for such transmissions without violating PSD limits. Transmitting information using higher transmit power levels may extend the transmission range of wireless communication devices, may increase the power gain of wireless communication devices, and may increase throughput capacities of wireless communication devices. In this way, implementations of the subject matter disclosed herein can be used to increase the total transmit power of wireless communication devices. Increasing the allowed transmit power of a wireless communication device may improve the range and signal quality of wireless transmissions from the wireless communication device (such as by increasing one or more of a received signal strength indicator (RSSI), a channel quality indicator (CQI), a signal-to-noise ratio (SNR), a signal-to-interference plus noise ratio (SINR), and so on).

FIG. 1 shows a block diagram of an example wireless communication network 100. According to some aspects, the wireless communication network 100 can be an example of a wireless local area network (WLAN) such as a Wi-Fi network (and will hereinafter be referred to as WLAN 100). For example, the WLAN 100 can be a network implementing at least one of the IEEE 802.11 family of wireless communication protocol standards (such as that defined by the IEEE 802.11-2016 specification or amendments thereof including, but not limited to, 802.11ay, 802.11ax, 802.11az, 802.11ba and 802.11be). The WLAN 100 may include numerous wireless communication devices such as an access point (AP) 102 and multiple stations (STAs) 104. While only one AP 102 is shown, the WLAN network 100 also can include multiple APs 102.

Each of the STAs 104 also may be referred to as a mobile station (MS), a mobile device, a mobile handset, a wireless handset, an access terminal (AT), a user equipment (UE), a subscriber station (SS), or a subscriber unit, among other examples. The STAs 104 may represent various devices such as mobile phones, personal digital assistant (PDAs), other handheld devices, netbooks, notebook computers, tablet computers, laptops, display devices (for example, TVs, computer monitors, navigation systems, among others), music or other audio or stereo devices, remote control devices ("remotes"), printers, kitchen or other household appliances, key fobs (for example, for passive keyless entry and start (PKES) systems), among other examples.

A single AP 102 and an associated set of STAs 104 may be referred to as a basic service set (BSS), which is managed by the respective AP 102. FIG. 1 additionally shows an example coverage area 106 of the AP 102, which may represent a basic service area (BSA) of the WLAN 100. The BSS may be identified to users by a service set identifier (SSID), as well as to other devices by a basic service set identifier (BSSID), which may be a medium access control (MAC) address of the AP 102. The AP 102 periodically broadcasts beacon frames ("beacons") including the BSSID to enable any STAs 104 within wireless range of the AP 102 to "associate" or re-associate with the AP 102 to establish a respective communication link 108 (hereinafter also referred to as a "Wi-Fi link"), or to maintain a communication link 108, with the AP 102. For example, the beacons can include an identification of a primary channel used by the respective AP 102 as well as a timing synchronization function for establishing or maintaining timing synchronization with the AP 102. The AP 102 may provide access to external networks to various STAs 104 in the WLAN via respective communication links 108.

To establish a communication link 108 with an AP 102, each of the STAs 104 is configured to perform passive or active scanning operations ("scans") on frequency channels in one or more frequency bands (for example, the 2.4 GHZ, 5 GHZ, 6 GHz or 60 GHz bands). To perform passive scanning, a STA 104 listens for beacons, which are transmitted by respective APs 102 at a periodic time interval referred to as the target beacon transmission time (TBTT) (measured in time units (TUs) where one TU may be equal to 1024 microseconds (μs)). To perform active scanning, a STA 104 generates and sequentially transmits probe requests on each channel to be scanned and listens for probe responses from APs 102. Each STA 104 may be configured to identify or select an AP 102 with which to associate based on the scanning information obtained through the passive or active scans, and to perform authentication and association operations to establish a communication link 108 with the selected AP 102. The AP 102 assigns an association identifier (AID) to the STA 104 at the culmination of the association operations, which the AP 102 uses to track the STA 104.

As a result of the increasing ubiquity of wireless networks, a STA 104 may have the opportunity to select one of many BSSs within range of the STA or to select among multiple APs 102 that together form an extended service set (ESS) including multiple connected BSSs. An extended network station associated with the WLAN 100 may be connected to a wired or wireless distribution system that may allow multiple APs 102 to be connected in such an ESS. As such, a STA 104 can be covered by more than one AP 102 and can associate with different APs 102 at different times for different transmissions. Additionally, after association with an AP 102, a STA 104 also may be configured to periodically scan its surroundings to find a more suitable AP 102 with which to associate. For example, a STA 104 that is moving relative to its associated AP 102 may perform a "roaming" scan to find another AP 102 having more desirable network characteristics such as a greater received signal strength indicator (RSSI) or a reduced traffic load.

In some cases, STAs 104 may form networks without APs 102 or other equipment other than the STAs 104 themselves. One example of such a network is an ad hoc network (or wireless ad hoc network). Ad hoc networks may alternatively be referred to as mesh networks or peer-to-peer (P2P)

networks. In some cases, ad hoc networks may be implemented within a larger wireless network such as the WLAN 100. In such implementations, while the STAs 104 may be capable of communicating with each other through the AP 102 using communication links 108, STAs 104 also can communicate directly with each other via direct wireless links 110. Additionally, two STAs 104 may communicate via a direct communication link 110 regardless of whether both STAs 104 are associated with and served by the same AP 102. In such an ad hoc system, one or more of the STAs 104 may assume the role filled by the AP 102 in a BSS. Such a STA 104 may be referred to as a group owner (GO) and may coordinate transmissions within the ad hoc network. Examples of direct wireless links 110 include Wi-Fi Direct connections, connections established by using a Wi-Fi Tunneled Direct Link Setup (TDLS) link, and other P2P group connections.

The APs 102 and STAs 104 may function and communicate (via the respective communication links 108) according to the IEEE 802.11 family of wireless communication protocol standards (such as that defined by the IEEE 802.11-2016 specification or amendments thereof including, but not limited to, 802.11ay, 802.11ax, 802.11az, 802.11ba and 802.11be). These standards define the WLAN radio and baseband protocols for the PHY and medium access control (MAC) layers. The APs 102 and STAs 104 transmit and receive wireless communications (hereinafter also referred to as "Wi-Fi communications") to and from one another in the form of PHY protocol data units (PPDUs) (or physical layer convergence protocol (PLCP) PDUs). The APs 102 and STAs 104 in the WLAN 100 may transmit PPDUs over an unlicensed spectrum, which may be a portion of spectrum that includes frequency bands traditionally used by Wi-Fi technology, such as the 2.4 GHz band, the 5 GHz band, the 60 GHz band, the 3.6 GHz band, and the 900 MHz band. Some implementations of the APs 102 and STAs 104 described herein also may communicate in other frequency bands, such as the 6 GHz band, which may support both licensed and unlicensed communications. The APs 102 and STAs 104 also can be configured to communicate over other frequency bands such as shared licensed frequency bands, where multiple operators may have a license to operate in the same or overlapping frequency band or bands.

Each of the frequency bands may include multiple sub-bands or frequency channels. For example, PPDUs conforming to the IEEE 802.11n, 802.11ac, 802.11ax and 802.11be standard amendments may be transmitted over the 2.4, 5 GHZ or 6 GHZ bands, each of which is divided into multiple 20 MHz channels. As such, these PPDUs are transmitted over a physical channel having a minimum bandwidth of 20 MHZ, but larger channels can be formed through channel bonding. For example, PPDUs may be transmitted over physical channels having bandwidths of 40 MHz, 80 MHz, 160 or 320 MHz by bonding together multiple 20 MHz channels.

Each PPDU is a composite structure that includes a PHY preamble and a payload in the form of a PHY service data unit (PSDU). The information provided in the preamble may be used by a receiving device to decode the subsequent data in the PSDU. In instances in which PPDUs are transmitted over a bonded channel, the preamble fields may be duplicated and transmitted in each of the multiple component channels. The PHY preamble may include both a legacy portion (or "legacy preamble") and a non-legacy portion (or "non-legacy preamble"). The legacy preamble may be used for packet detection, automatic gain control and channel estimation, among other uses. The legacy preamble also may generally be used to maintain compatibility with legacy devices. The format of, coding of, and information provided in the non-legacy portion of the preamble is based on the particular IEEE 802.11 protocol to be used to transmit the payload.

Figures 2A, 2B:
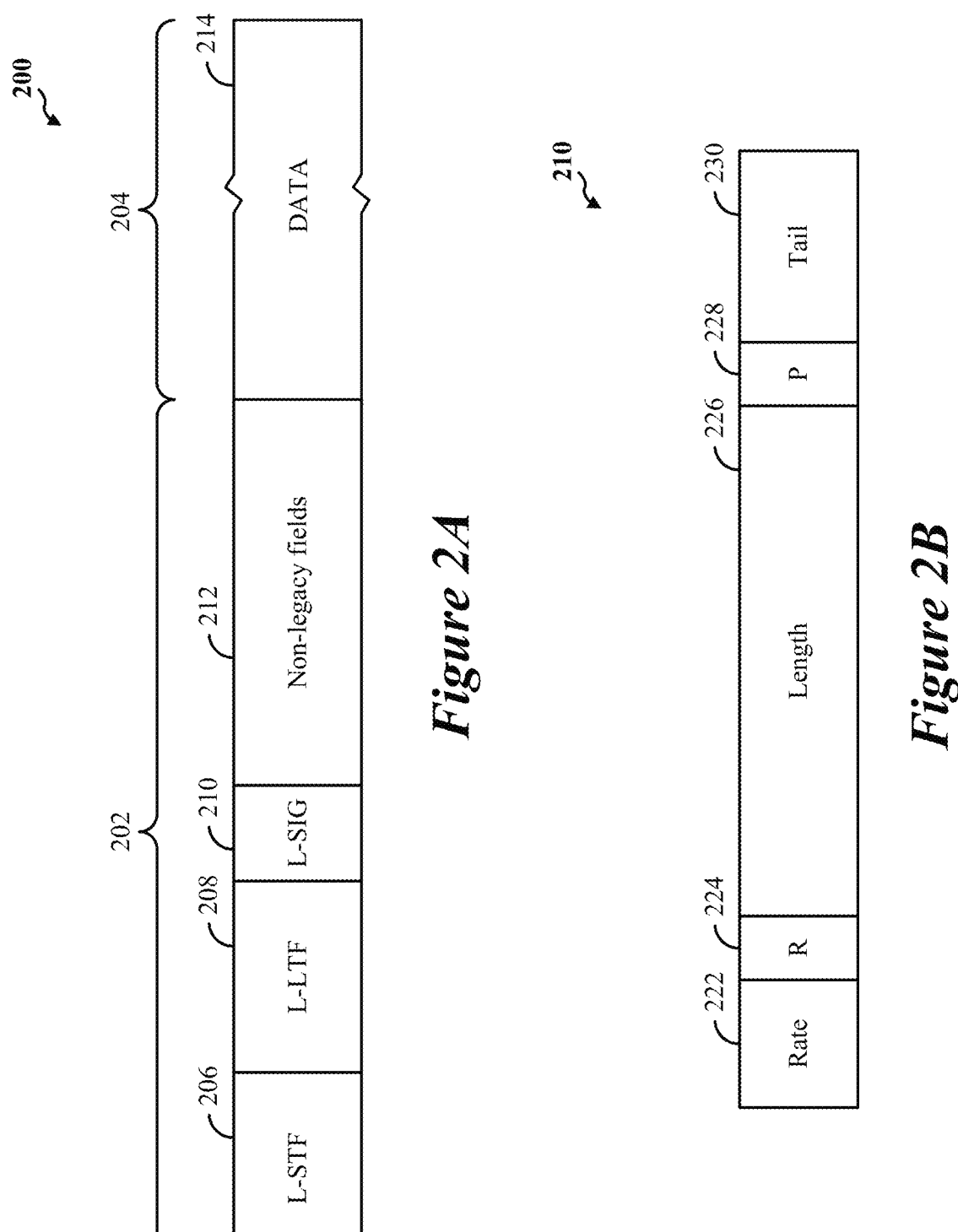
FIG. 2A shows an example protocol data unit (PDU) usable for communications between an access point (AP) and one or more stations (STAs).
FIG. 2B shows an example field in the PDU of FIG. 2A.

FIG. 2A shows an example protocol data unit (PDU) 200 usable for wireless communication between an AP 102 and one or more STAs 104. For example, the PDU 200 can be configured as a PPDU. As shown, the PDU 200 includes a PHY preamble 202 and a PHY payload 204. For example, the preamble 202 may include a legacy portion that itself includes a legacy short training field (L-STF) 206, which may consist of two BPSK symbols, a legacy long training field (L-LTF) 208, which may consist of two BPSK symbols, and a legacy signal field (L-SIG) 210, which may consist of two BPSK symbols. The legacy portion of the preamble 202 may be configured according to the IEEE 802.11a wireless communication protocol standard. The preamble 202 also may include a non-legacy portion including one or more non-legacy fields 212, for example, conforming to an IEEE wireless communication protocol such as the IEEE 802.11ac, 802.11ax, 802.11be or later wireless communication protocols.

The L-STF 206 generally enables a receiving device to perform automatic gain control (AGC) and coarse timing and frequency estimation. The L-LTF 208 generally enables a receiving device to perform fine timing and frequency estimation and also to perform an initial estimate of the wireless channel. The L-SIG 210 generally enables a receiving device to determine a duration of the PDU and to use the determined duration to avoid transmitting on top of the PDU. For example, the L-STF 206, the L-LTF 208 and the L-SIG 210 may be modulated according to a binary phase shift keying (BPSK) modulation scheme. The payload 204 may be modulated according to a BPSK modulation scheme, a quadrature BPSK (Q-BPSK) modulation scheme, a quadrature amplitude modulation (QAM) modulation scheme, or another appropriate modulation scheme. The payload 204 may include a PSDU including a data field (DATA) 214 that, in turn, may carry higher layer data, for example, in the form of medium access control (MAC) protocol data units (MPDUs) or an aggregated MPDU (A-MPDU).

FIG. 2B shows an example L-SIG 210 in the PDU 200 of FIG. 2A. The L-SIG 210 includes a data rate field 222, a reserved bit 224, a length field 226, a parity bit 228, and a tail field 230. The data rate field 222 indicates a data rate (note that the data rate indicated in the data rate field 212 may not be the actual data rate of the data carried in the payload 204). The length field 226 indicates a length of the packet in units of, for example, symbols or bytes. The parity bit 228 may be used to detect bit errors. The tail field 230 includes tail bits that may be used by the receiving device to terminate operation of a decoder (for example, a Viterbi decoder). The receiving device may utilize the data rate and the length indicated in the data rate field 222 and the length field 226 to determine a duration of the packet in units of, for example, microseconds (μs) or other time units.

Figures 3A, 3B:
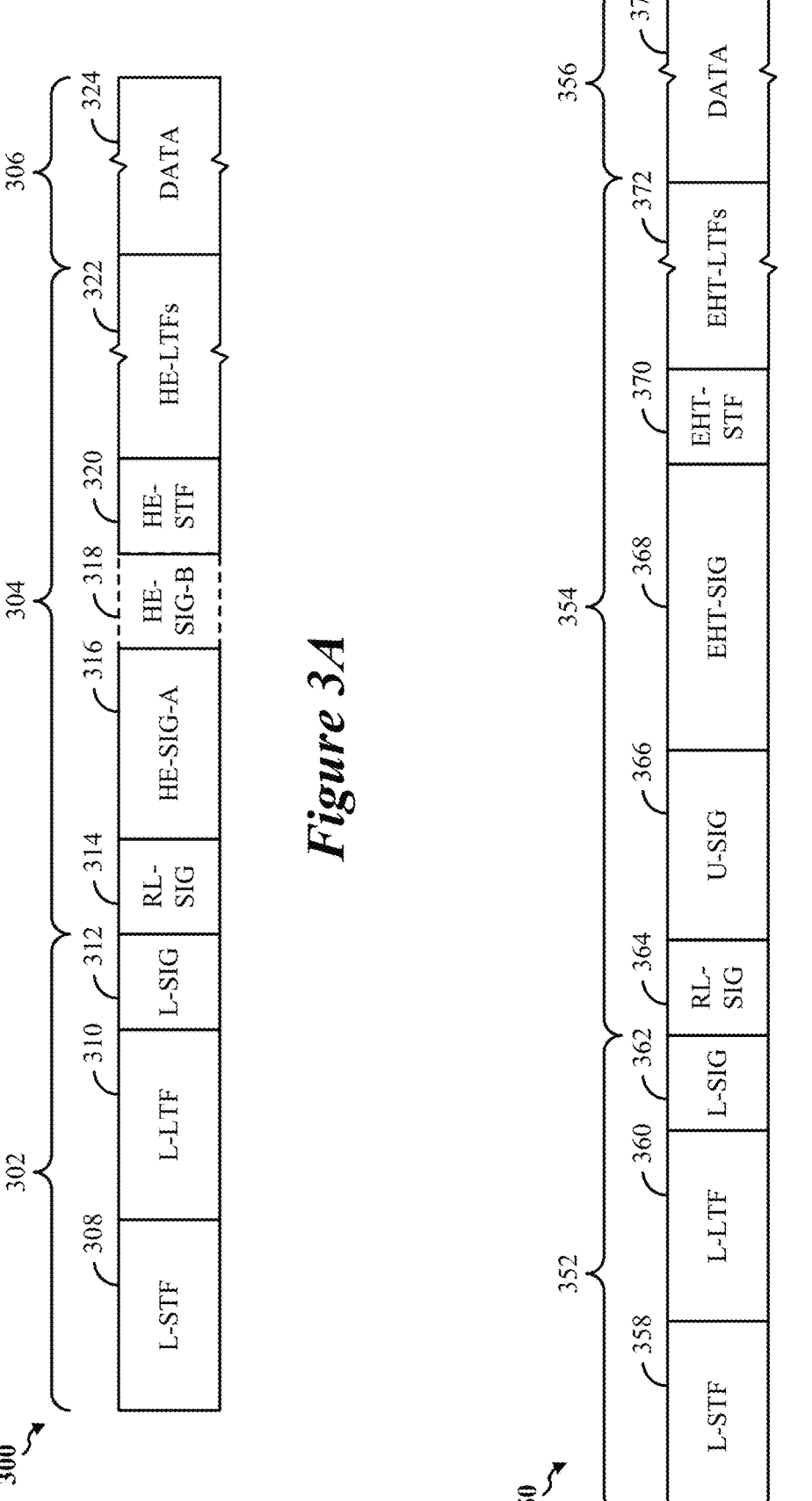
FIG. 3A shows an example PDU usable for communications between an AP and one or more STAs.
FIG. 3B shows another example PDU usable for communications between an AP and one or more STAs.

FIG. 3A shows an example PPDU 300 usable for wireless communication between an AP and one or more STAs. The PPDU 300 may be used for SU, OFDMA or MU-MIMO transmissions. The PPDU 300 may be formatted as a High Efficiency (HE) WLAN PPDU in accordance with the IEEE 802.11ax amendment to the IEEE 802.11 wireless communication protocol standard. The PPDU 300 includes a PHY preamble including a legacy portion 302 and a non-legacy portion 304. The PPDU 300 may further include a PHY payload 306 after the preamble, for example, in the form of a PSDU including a data field 324.

The legacy portion 302 of the preamble includes an L-STF 308, an L-LTF 310, and an L-SIG 312. The non-legacy portion 304 includes a repetition of L-SIG (RL-SIG) 314, a first HE signal field (HE-SIG-A) 316, an HE short training field (HE-STF) 320, and one or more HE long training fields (or symbols) (HE-LTFs) 322. For OFDMA or MU-MIMO communications, the second portion 304 further includes a second HE signal field (HE-SIG-B) 318 encoded separately from HE-SIG-A 316. Like the L-STF 308, L-LTF 310, and L-SIG 312, the information in RL-SIG 314 and HE-SIG-A 316 may be duplicated and transmitted in each of the component 20 MHZ channels in instances involving the use of a bonded channel. In contrast, the content in HE-SIG-B 318 may be unique to each 20 MHz channel and target specific STAs 104.

RL-SIG 314 may indicate to HE-compatible STAs 104 that the PPDU 300 is an HE PPDU. An AP 102 may use HE-SIG-A 316 to identify and inform multiple STAs 104 that the AP has scheduled UL or DL resources for them. For example, HE-SIG-A 316 may include a resource allocation subfield that indicates resource allocations for the identified STAs 104. HE-SIG-A 316 may be decoded by each HE-compatible STA 104 served by the AP 102. For MU transmissions, HE-SIG-A 316 further includes information usable by each identified STA 104 to decode an associated HE-SIG-B 318. For example, HE-SIG-A 316 may indicate the frame format, including locations and lengths of HE-SIG-Bs 318, available channel bandwidths and modulation and coding schemes (MCSs), among other examples. HE-SIG-A 316 also may include HE WLAN signaling information usable by STAs 104 other than the identified STAs 104.

HE-SIG-B 318 may carry STA-specific scheduling information such as, for example, STA-specific (or "user-specific") MCS values and STA-specific RU allocation information. In the context of DL MU-OFDMA, such information enables the respective STAs 104 to identify and decode corresponding resource units (RUs) in the associated data field 324. Each HE-SIG-B 318 includes a common field and at least one STA-specific field. The common field can indicate RU allocations to multiple STAs 104 including RU assignments in the frequency domain, indicate which RUs are allocated for MU-MIMO transmissions and which RUs correspond to MU-OFDMA transmissions, and the number of users in allocations, among other examples. The common field may be encoded with common bits, CRC bits, and tail bits. The user-specific fields are assigned to particular STAs 104 and may be used to schedule specific RUs and to indicate the scheduling to other WLAN devices. Each user-specific field may include multiple user block fields. Each user block field may include two user fields that contain information for two respective STAs to decode their respective RU payloads in data field 324.

FIG. 3B shows another example PPDU 350 usable for wireless communication between an AP and one or more STAs. The PPDU 350 may be used for SU, OFDMA or MU-MIMO transmissions. The PPDU 350 may be formatted as an Extreme High Throughput (EHT) WLAN PPDU in accordance with the IEEE 802.11be amendment to the IEEE 802.11 wireless communication protocol standard, or may be formatted as a PPDU conforming to any later (post-EHT) version of a new wireless communication protocol conforming to a future IEEE 802.11 wireless communication protocol standard or other wireless communication standard. The PPDU 350 includes a PHY preamble including a legacy portion 352 and a non-legacy portion 354. The PPDU 350 may further include a PHY payload 356 after the preamble, for example, in the form of a PSDU including a data field 374.

The legacy portion 352 of the preamble includes an L-STF 358, an L-LTF 360, and an L-SIG 362. The non-legacy portion 354 of the preamble includes an RL-SIG 364 and multiple wireless communication protocol version-dependent signal fields after RL-SIG 364. For example, the non-legacy portion 354 may include a universal signal field 366 (referred to herein as "U-SIG 366") and an EHT signal field 368 (referred to herein as "EHT-SIG 368"). One or both of U-SIG 366 and EHT-SIG 368 may be structured as, and carry version-dependent information for, other wireless communication protocol versions beyond EHT. The non-legacy portion 354 further includes an additional short training field 370 (referred to herein as "EHT-STF 370," although it may be structured as, and carry version-dependent information for, other wireless communication protocol versions beyond EHT) and one or more additional long training fields 372 (referred to herein as "EHT-LTFs 372," although they may be structured as, and carry version-dependent information for, other wireless communication protocol versions beyond EHT). Like L-STF 358, L-LTF 360, and L-SIG 362, the information in U-SIG 366 and EHT-SIG 368 may be duplicated and transmitted in each of the component 20 MHz channels in instances involving the use of a bonded channel. In some implementations, EHT-SIG 368 may additionally or alternatively carry information in one or more non-primary 20 MHz channels that is different than the information carried in the primary 20 MHz channel.

EHT-SIG 368 may include one or more jointly encoded symbols and may be encoded in a different block from the block in which U-SIG 366 is encoded. EHT-SIG 368 may be used by an AP to identify and inform multiple STAs 104 that the AP has scheduled UL or DL resources for them. EHT-SIG 368 may be decoded by each compatible STA 104 served by the AP 102. EHT-SIG 368 may generally be used by a receiving device to interpret bits in the data field 374. For example, EHT-SIG 368 may include RU allocation information, spatial stream configuration information, and per-user signaling information such as MCSs, among other examples. EHT-SIG 368 may further include a cyclic redundancy check (CRC) (for example, four bits) and a tail (for example, 6 bits) that may be used for binary convolutional code (BCC). In some implementations, EHT-SIG 368 may include one or more code blocks that each include a CRC and a tail. In some aspects, each of the code blocks may be encoded separately.

EHT-SIG 368 may carry STA-specific scheduling information such as, for example, user-specific MCS values and user-specific RU allocation information. EHT-SIG 368 may generally be used by a receiving device to interpret bits in the data field 374. In the context of DL MU-OFDMA, such information enables the respective STAs 104 to identify and decode corresponding RUs in the associated data field 374. Each EHT-SIG 368 may include a common field and at least one user-specific field. The common field can indicate RU distributions to multiple STAs 104, indicate the RU assignments in the frequency domain, indicate which RUs are allocated for MU-MIMO transmissions and which RUs correspond to MU-OFDMA transmissions, and the number of users in allocations, among other examples. The common field may be encoded with common bits, CRC bits, and tail bits. The user-specific fields are assigned to particular STAs 104 and may be used to schedule specific RUs and to indicate the scheduling to other WLAN devices. Each user-specific field may include multiple user block fields. Each user block field may include, for example, two user fields that contain information for two respective STAs to decode their respective RU payloads.

The presence of RL-SIG 364 and U-SIG 366 may indicate to EHT- or later version-compliant STAs 104 that the PPDU 350 is an EHT PPDU or a PPDU conforming to any later (post-EHT) version of a new wireless communication protocol conforming to a future IEEE 802.11 wireless communication protocol standard. For example, U-SIG 366 may be used by a receiving device to interpret bits in one or more of EHT-SIG 368 or the data field 374.

FIG. 3C shows an example signal field 380 that may be carried in a WLAN PPDU. In implementations for which the signal field 380 is carried in an HE PPDU, the signal field 380 may be, or may correspond to, a HE-SIG-A field (such as the HE-SIG-A field 316 of the PPDU 300 of FIG. 3A). In implementations for which the signal field 380 is carried in an EHT PPDU, the signal field 380 may be, or may correspond to, an EHT-SIG field (such as the EHT-SIG field 368 of the PPDU 350 of FIG. 3B). The signal field 380 may include an UL/DL subfield 382 indicating whether the PPDU 400 is sent UL or DL, may include a SIGB-MCS subfield 384 indicating the MCS for the HE-SIGB field 412, and may include a SIGB DCM subfield 386 indicating whether or not the HE-SIG-B field 412 is modulated with dual carrier modulation (DCM). The signal field 380 may further include a BSS color field 388 indicating a BSS color identifying the BSS. Each device in a BSS may identify itself with the same BSS color. Thus, receiving a transmission having a different BSS color indicates the transmission is from another BSS, such as an OBSS.

The signal field 380 may further include a spatial reuse subfield 390 indicating whether spatial reuse is allowed during transmission of the corresponding PPDU. The signal field 380 may further include a bandwidth subfield 392 indicating a bandwidth of the PPDU data field, such as 20 MHz, 40 MHZ, 80 MHZ, 160 MHZ, and so on. The signal field 380 may further include a number of HE-SIG-B symbols or MU-MIMO user subfield 394 indicating either a number of OFDM symbols in the HE-SIG-B field 412 or a number of MU-MIMO users. The signal field 380 may further include a SIGB compression subfield 396 indicating whether or not a common signaling field is present, may include a GI+LTF size subfield 398 indicating the guard interval (GI) duration and the size of the non-legacy LTFs. The signal field 380 may further include a doppler subfield 399 indicating whether a number of OFDM symbols in the PPDU data field is larger than a signaled midamble periodicity plus one, and the midamble is present, or that the number of OFDM symbols in the PPDU data field data field 418 is less than or equal to the signaled midamble periodicity plus 1, that the midamble is not present, but that the channel is fast varying.

Figure 4:
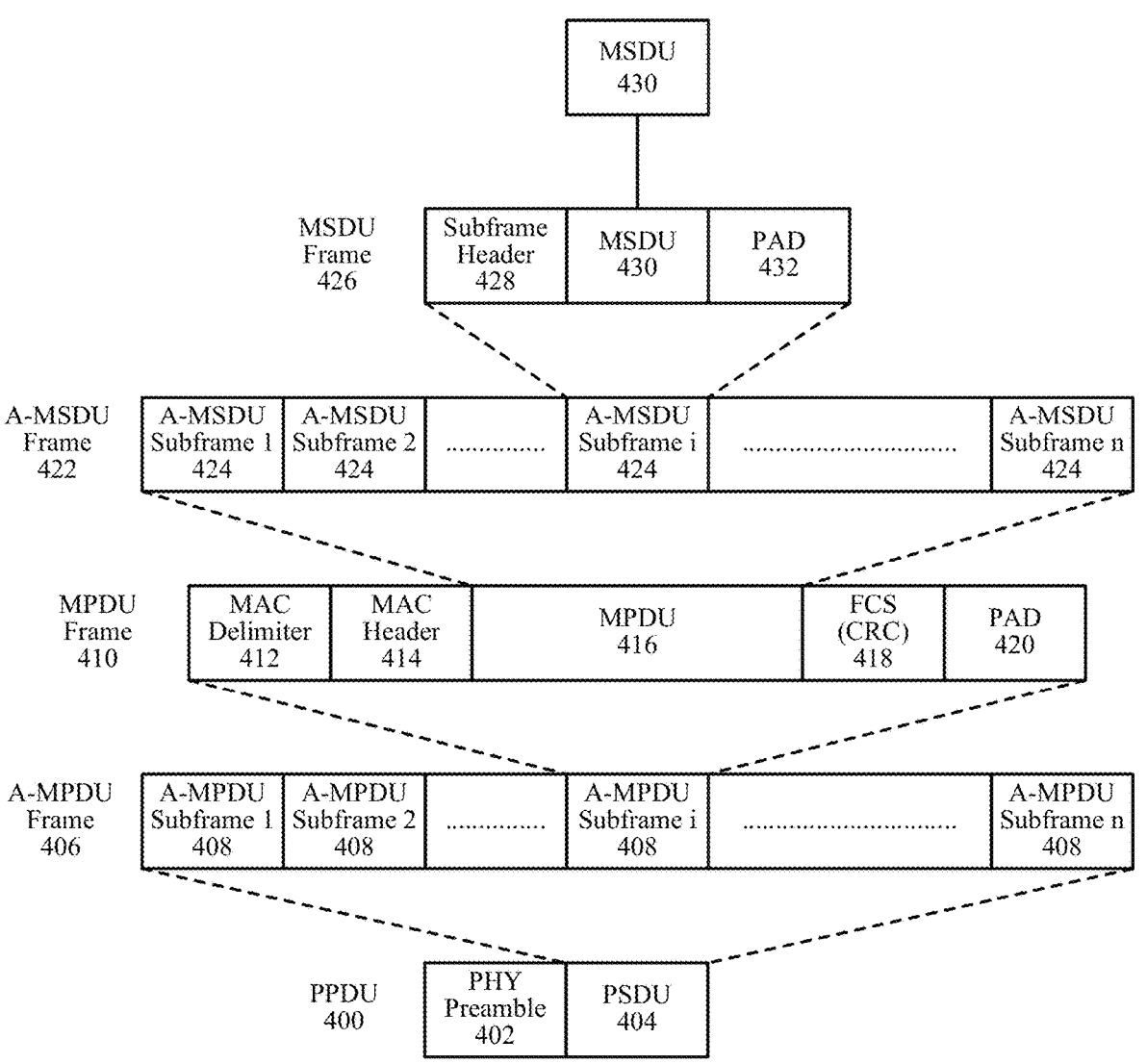
FIG. 4 shows an example physical layer convergence protocol (PLCP) protocol data unit (PPDU) usable for communications between an AP and each of a number of STAs.

FIG. 4 shows an example PPDU 400 usable for communications between an AP 102 and one or more STAs 104. As described above, each PPDU 400 includes a PHY preamble 402 and a PSDU 404. Each PSDU 404 may represent (or "carry") one or more MAC protocol data units (MPDUs) 416. For example, each PSDU 404 may carry an aggregated MPDU (A-MPDU) 406 that includes an aggregation of multiple A-MPDU subframes 408. Each A-MPDU subframe 406 may include an MPDU frame 410 that includes a MAC delimiter 412 and a MAC header 414 prior to the accompanying MPDU 416, which includes the data portion ("payload" or "frame body") of the MPDU frame 410. Each MPDU frame 410 also may include a frame check sequence (FCS) field 418 for error detection (for example, the FCS field may include a cyclic redundancy check (CRC)) and padding bits 420. The MPDU 416 may carry one or more MAC service data units (MSDUs) 416. For example, the MPDU 416 may carry an aggregated MSDU (A-MSDU) 422 including multiple A-MSDU subframes 424. Each A-MSDU subframe 424 contains a corresponding MSDU 430 preceded by a subframe header 428 and in some cases followed by padding bits 432.

Referring back to the MPDU frame 410, the MAC delimiter 412 may serve as a marker of the start of the associated MPDU 416 and indicate the length of the associated MPDU 416. The MAC header 414 may include multiple fields containing information that defines or indicates characteristics or attributes of data encapsulated within the frame body 416. The MAC header 414 includes a duration field indicating a duration extending from the end of the PPDU until at least the end of an acknowledgment (ACK) or Block ACK (BA) of the PPDU that is to be transmitted by the receiving wireless communication device. The use of the duration field serves to reserve the wireless medium for the indicated duration, and enables the receiving device to establish its network allocation vector (NAV). The MAC header 414 also includes one or more fields indicating addresses for the data encapsulated within the frame body 416. For example, the MAC header 414 may include a combination of a source address, a transmitter address, a receiver address or a destination address. The MAC header 414 may further include a frame control field containing control information. The frame control field may specify a frame type, for example, a data frame, a control frame, or a management frame.

Access to the shared wireless medium is generally governed by a distributed coordination function (DCF). With a DCF, there is generally no centralized master device allocating time and frequency resources of the shared wireless medium. On the contrary, before a wireless communication device, such as an AP 102 or a STA 104, is permitted to transmit data, it must wait for a particular time and contend for access to the wireless medium. In some implementations, the wireless communication device may be configured to implement the DCF through the use of carrier sense multiple access (CSMA) with collision avoidance (CA) (CSMA/CA) techniques and timing intervals. Before transmitting data, the wireless communication device may perform a clear channel assessment (CCA) and determine that the appropriate wireless channel is idle. The CCA includes both physical (PHY-level) carrier sensing and virtual (MAC-level) carrier sensing. Physical carrier sensing is accomplished via a measurement of the received signal strength of a valid frame, which is compared to a threshold to determine whether the channel is busy. For example, if the received signal strength of a detected preamble is above a threshold, the medium is considered busy. Physical carrier sensing also includes energy detection. Energy detection involves measuring the total energy the wireless communication device receives regardless of whether the received signal represents a valid frame. If the total energy detected is above a threshold, the medium is considered busy. Virtual carrier sensing is accomplished via the use of a network allocation vector (NAV), an indicator of a time when the medium may next become idle. The NAV is reset each time a valid frame is received that is not addressed to the wireless communication device. The NAV effectively serves as a time duration that must elapse before the wireless communication device may contend for access even in the absence of a detected symbol or even if the detected energy is below the relevant threshold.

As described above, the DCF is implemented through the use of time intervals. These time intervals include the slot time (or "slot interval") and the inter-frame space (IFS). The slot time is the basic unit of timing and may be determined based on one or more of a transmit-receive turnaround time, a channel sensing time, a propagation delay and a MAC processing time. Measurements for channel sensing are performed for each slot. All transmissions may begin at slot boundaries. Different varieties of IFS exist including the short IFS (SIFS), the distributed IFS (DIFS), the extended IFS (EIFS), and the arbitration IFS (AIFS). For example, the DIFS may be defined as the sum of the SIFS and two times the slot time. The values for the slot time and IFS may be provided by a suitable standard specification, such as one of the IEEE 802.11 family of wireless communication protocol standards (such as that defined by the IEEE 802.11-2016 specification or amendments thereof including, but not limited to, 802.1 lay, 802.11ax, 802.11az, 802.11ba and 802.11be).

When the NAV reaches 0, the wireless communication device performs the physical carrier sensing. If the channel remains idle for the appropriate IFS (for example, the DIFS), the wireless communication device initiates a backoff timer, which represents a duration of time that the device must sense the medium to be idle before it is permitted to transmit. The backoff timer is decremented by one slot each time the medium is sensed to be idle during a corresponding slot interval. If the channel remains idle until the backoff timer expires, the wireless communication device becomes the holder (or "owner") of a transmit opportunity (TXOP) and may begin transmitting. The TXOP is the duration of time the wireless communication device can transmit frames over the channel after it has won contention for the wireless medium. If, on the other hand, one or more of the carrier sense mechanisms indicate that the channel is busy, a MAC controller within the wireless communication device will not permit transmission.

Each time the wireless communication devices generates a new PPDU for transmission in a new TXOP, it randomly selects a new backoff timer duration. The available distribution of the numbers that may be randomly selected for the backoff timer is referred to as the contention window (CW). If, when the backoff timer expires, the wireless communication device transmits the PPDU, but the medium is still busy, there may be a collision. Additionally, if there is otherwise too much energy on the wireless channel resulting in a poor signal-to-noise ratio (SNR), the communication may be corrupted or otherwise not successfully received. In such instances, the wireless communication device may not receive a communication acknowledging the transmitted PDU within a timeout interval. The MAC may increase the CW exponentially, for example, doubling it, and randomly select a new backoff timer duration from the CW before each attempted retransmission of the PPDU. Before each attempted retransmission, the wireless communication device may wait a duration of DIFS and, if the medium remains idle, proceed to initiate the new backoff timer. There are different CW and TXOP durations for each of the four access categories (ACs): voice (AC_VO), video (AC_VI), background (AC_BK), and best effort (AC_BE). This enables particular types of traffic to be prioritized in the network.

Some APs and STAs may be configured to implement spatial reuse techniques. For example, APs and STAs configured for communications using IEEE 802.11ax or 802.11be may be configured with a BSS color. APs associated with different BSSs may be associated with different BSS colors. If an AP or a STA detects a wireless packet from another wireless communication device while contending for access, the AP or STA may apply different contention parameters based on whether the wireless packet is transmitted by, or transmitted to, another wireless communication device within its BSS or from a wireless communication device from an overlapping BSS (OBSS), as determined by a BSS color indication in a preamble of the wireless packet. For example, if the BSS color associated with the wireless packet is the same as the BSS color of the AP or STA, the AP or STA may use a first received signal strength indication (RSSI) detection threshold when performing a CCA on the wireless channel. However, if the BSS color associated with the wireless packet is different than the BSS color of the AP or STA, the AP or STA may use a second RSSI detection threshold in lieu of using the first RSSI detection threshold when performing the CCA on the wireless channel, the second RSSI detection threshold being greater than the first RSSI detection threshold. In this way, the requirements for winning contention are relaxed when interfering transmissions are associated with an OBSS.

As described above, APs 102 and STAs 104 can support multi-user (MU) communications; that is, concurrent transmissions from one device to each of multiple devices (for example, multiple simultaneous downlink (DL) communications from an AP 102 to corresponding STAs 104), or concurrent transmissions from multiple devices to a single device (for example, multiple simultaneous uplink (UL) transmissions from corresponding STAs 104 to an AP 102). To support the MU transmissions, the APs 102 and STAs 104 may utilize multi-user multiple-input, multiple-output (MU-MIMO) and multi-user orthogonal frequency division multiple access (MU-OFDMA) techniques.

In MU-OFDMA schemes, the available frequency spectrum of the wireless channel may be divided into multiple resource units (RUs) each including a number of different frequency subcarriers ("tones"). Different RUs may be allocated or assigned by an AP 102 to different STAs 104 at particular times. The sizes and distributions of the RUs may be referred to as an RU allocation. In some implementations, RUs may be allocated in 2 MHz intervals, and as such, the smallest RU may include 26 tones consisting of 24 data tones and 2 pilot tones. Consequently, in a 20 MHz channel, up to 9 RUs (such as 2 MHz, 26-tone RUs) may be allocated (because some tones are reserved for other purposes). Similarly, in a 160 MHz channel, up to 74 RUs may be allocated. Larger 52 tone, 106 tone, 242 tone, 484 tone and 996 tone RUs also may be allocated. Adjacent RUs may be separated by a null subcarrier (such as a DC subcarrier), for example, to reduce interference between adjacent RUs, to reduce receiver DC offset, and to avoid transmit center frequency leakage.

For UL MU transmissions, an AP 102 can transmit a trigger frame to initiate and synchronize an UL MU-OFDMA or UL MU-MIMO transmission from multiple STAs 104 to the AP 102. Such trigger frames may thus enable multiple STAs 104 to send UL traffic to the AP 102 concurrently in time. A trigger frame may address one or more STAs 104 through respective association identifiers (AIDs), and may assign each AID (and thus each STA 104) one or more RUs that can be used to send UL traffic to the AP 102. The AP also may designate one or more random access (RA) RUs that unscheduled STAs 104 may contend for.

Figure 5A:
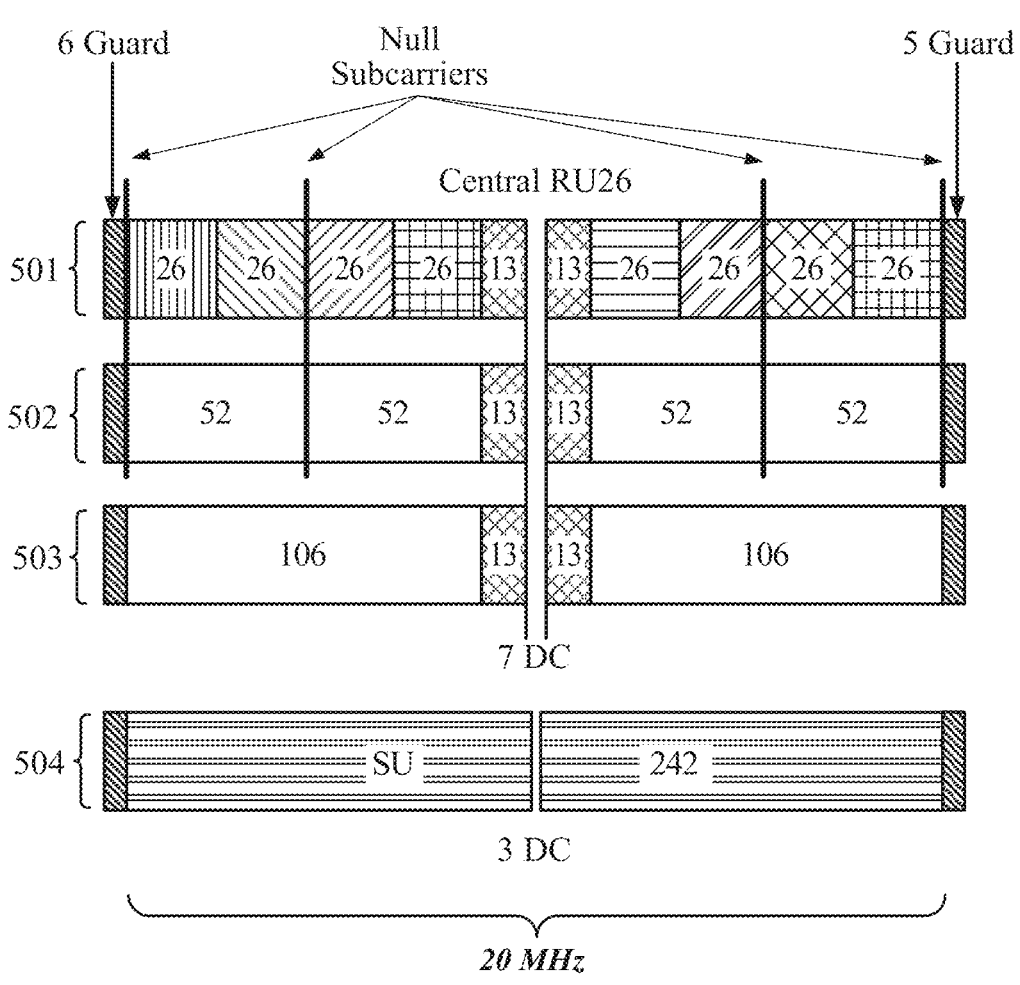
FIG. 5A shows an example tone map for a 20 MHz bandwidth.

FIG. 5A shows an example tone map 500 for a 20 MHz bandwidth. The 20 MHz bandwidth may be divided into different numbers of RUs based on the size of the RUs. As shown, the tone map 500 includes four tone plans: a first tone plan 501 includes RUs that span 26 tones, a second tone plan 502 includes RUs that span 52 tones, a third tone plan 503 includes RUs that span 106 tones, and a fourth tone plan 504 includes an RU that spans 242 tones. Specifically, the first tone plan 501 includes eight RUs each spanning 26 tones, the second tone plan 502 includes four RUs each spanning 52 tones, the third tone plan 503 includes two RUs each spanning 106 tones, and the fourth tone plan 504 includes one RU spanning 242 tones (with the left half of the channel for single-user (SU) operations). Each 26-tone RU may include 24 data subcarriers and 2 pilot subcarriers, each 52-tone RU may include 48 data subcarriers and 4 pilot subcarriers, each 106-tone RU may include 102 data subcarriers and 4 pilot subcarriers, and the 242-tone RU may include 234 data subcarriers and 8 pilot subcarriers.

Figure 5B:
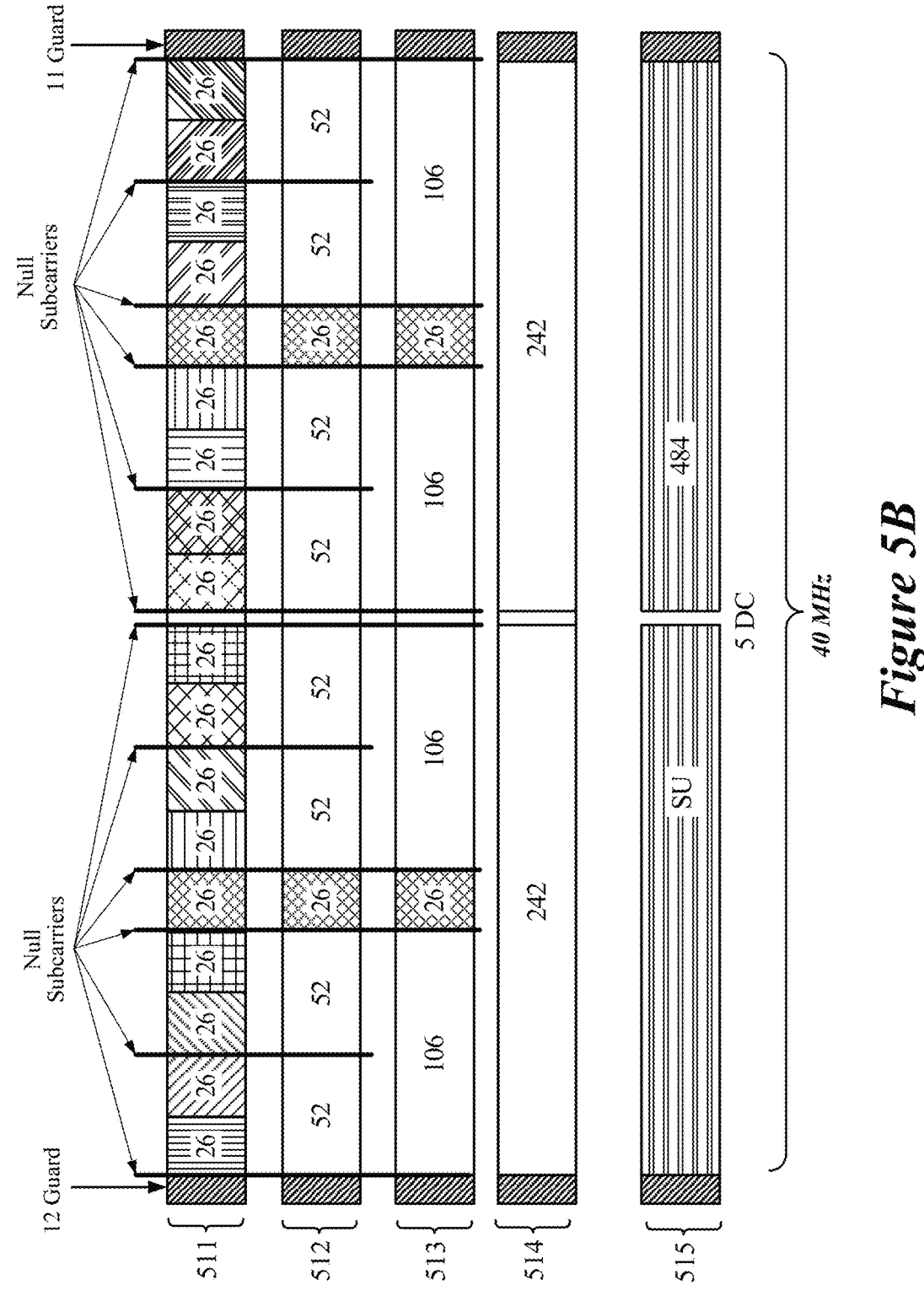
FIG. 5B shows an example tone map for a 40 MHz bandwidth.

FIG. 5B shows an example tone map 510 for a 40 MHz bandwidth. The 40 MHz bandwidth may be divided into different numbers of RUs based on the size of the RUs. As shown, the tone map 510 includes five tone plans: a first tone plan 511 includes RUs that span 26 tones, a second tone plan 512 includes RUs that span 52 tones, a third plan 513 includes RUs that span 106 tones, a fourth tone plan 514 includes RUs that span 242 tones, and a fifth tone plan 515 includes an RU that spans 484 tones. Specifically, the first tone plan 511 includes eighteen RUs each spanning 26 tones, the second tone plan 512 includes eight RUs each spanning 52 tones, the third tone plan 513 includes four RUs each spanning 106 tones, the fourth tone plan 514 includes two RUs each spanning 242 tones, and the fifth tone plan 515 includes one RU spanning 484 tones (with the left half of the channel for SU operations). Each 26-tone RU may include 24 data subcarriers and 2 pilot subcarriers, each 52-tone RU may include 48 data subcarriers and 4 pilot subcarriers, each 106-tone RU may include 102 data subcarriers and 4 pilot subcarriers, each 242-tone RU may include 234 data subcarriers and 8 pilot subcarriers, and the 484-tone RU may include 468 data subcarriers and 16 pilot subcarriers.

Figure 5C:
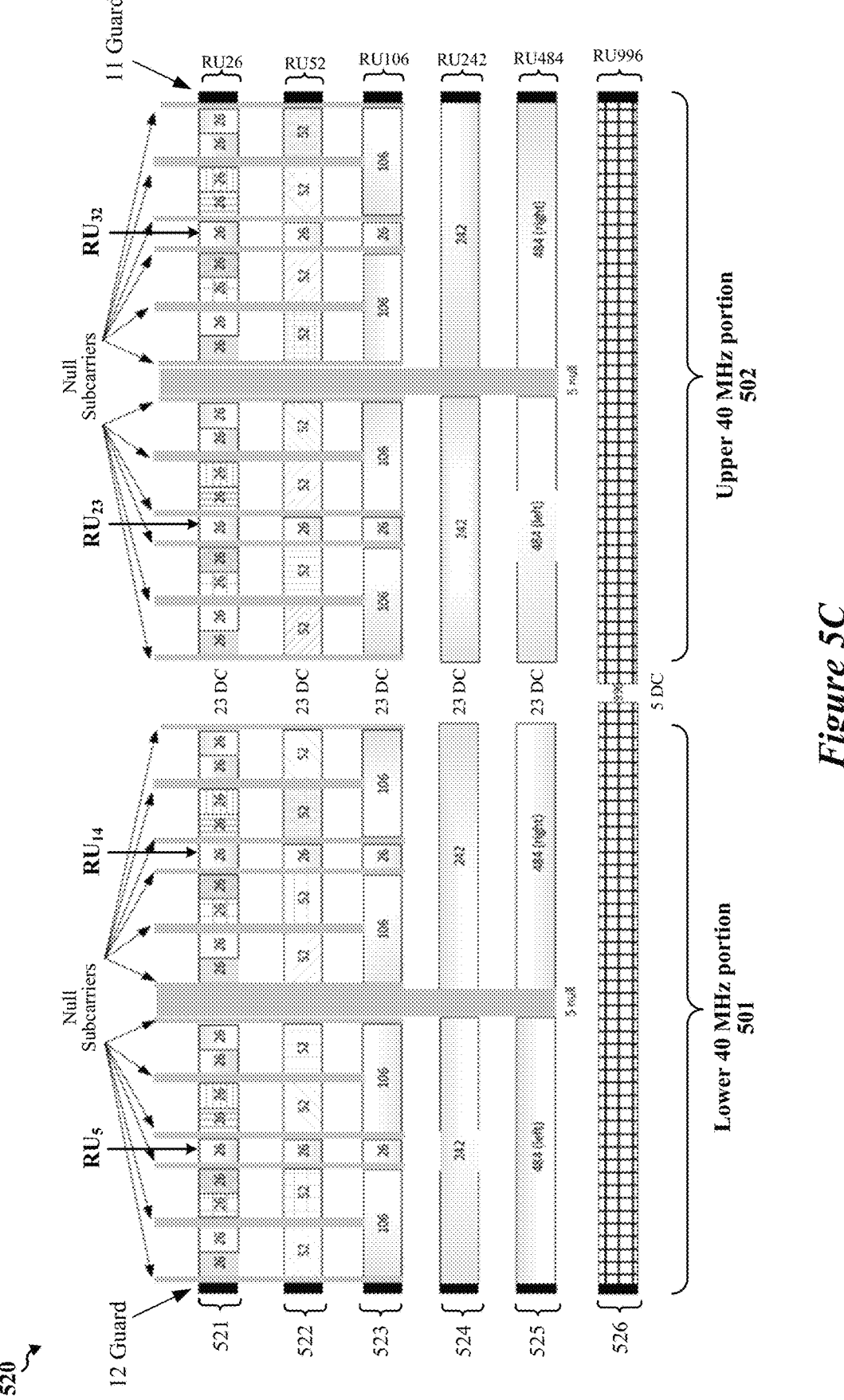
FIG. 5C shows an example tone map for an 80 MHz bandwidth.

FIG. 5C shows an example tone map 520 for an 80 MHz bandwidth. The 80 MHz bandwidth may be divided into different numbers of RUs based on the size of the RUs. As shown, the tone map 520 includes six tone plans: a first tone plan 521 includes RUs that span 26 tones, a second tone plan 522 includes RUs that span 52 tones, a third plan 523 includes RUs that span 106 tones, a fourth tone plan 524 includes RUs that span 242 tones, a fifth tone plan 525 includes RUs that span 484 tones, and a sixth tone plan 526 includes an RU that spans 996 tones. The first tone plan 521 includes thirty-six RUs each spanning 26 tones, the second tone plan 522 includes eighteen RUs each spanning 52 tones, the third tone plan 523 includes eight RUs each spanning 106 tones, the fourth tone plan 524 includes four RUs each spanning 242 tones, the fifth tone plan 525 includes two RUs each spanning 484 tones, and the sixth tone plan 526 includes one RU spanning 996 tones (with the left half of the channel for SU operations). Each 26-tone RU includes 24 data subcarriers and 2 pilot subcarriers, each 52-tone RU includes 48 data subcarriers and 4 pilot subcarriers, each 106-tone RU includes 102 data subcarriers and 4 pilot subcarriers, each 242-tone RU includes 234 data subcarriers and 8 pilot subcarriers, each 484-tone RU includes 468 data subcarriers and 16 pilot subcarriers, and the 996-tone RU includes 980 data subcarriers and 16 pilot subcarriers.

Each of the tone plans 521-526 is divided into a lower 40 MHz portion 501 and an upper 40 MHz portion 502. The lower 40 MHz portion 501 and the upper 40 MHz portion

502 of each of the tone plans 521-525 are separated by 23 DC tones, and the lower 40 MHz portion 501 and the upper 40 MHz portion 502 of the tone plan 526 are separated by 5 DC tones. Additionally, the lower 40 MHz portion 501 of each of the tone plans 521-525 is divided into first and second 20 MHz portions separated by 5 null subcarriers, and the upper 40 MHz portion 502 of each of the tone plans 521-525 is divided into third and fourth 20 MHz portions separated by 5 null subcarriers.

Figure 6:
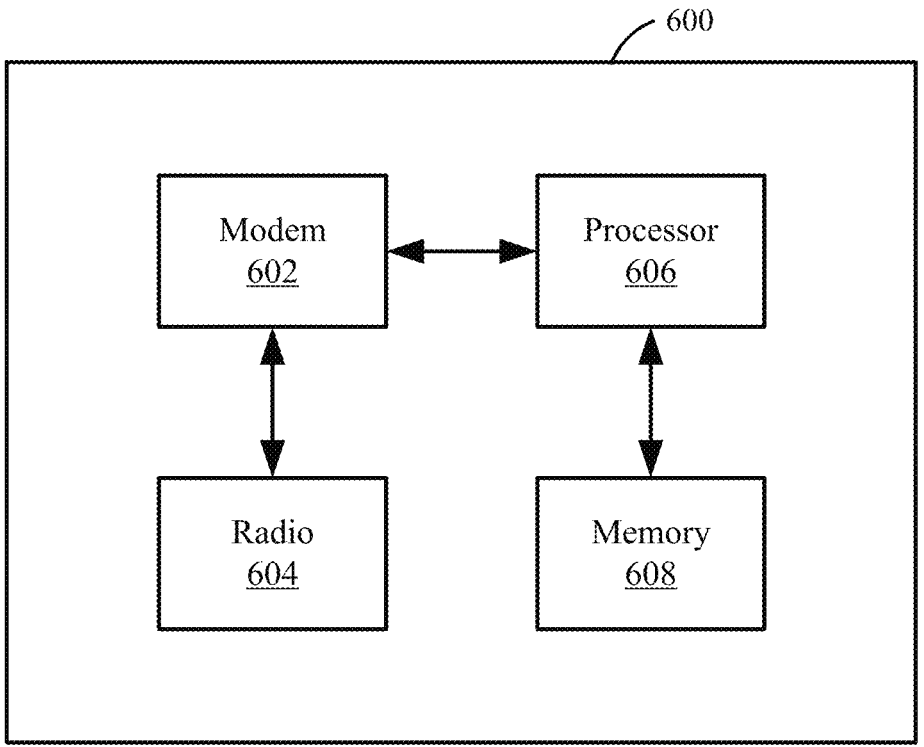
FIG. 6 shows a block diagram of an example wireless communication device.

FIG. 6 shows a block diagram of an example wireless communication device 600. In some implementations, the wireless communication device 600 can be an example of a device for use in a STA such as one of the STAs 104 described above with reference to FIG. 1. In some implementations, the wireless communication device 600 can be an example of a device for use in an AP such as the AP 102 described above with reference to FIG. 1. The wireless communication device 600 is capable of transmitting (or outputting for transmission) and receiving wireless communications (for example, in the form of wireless packets). For example, the wireless communication device can be configured to transmit and receive packets in the form of PPDUs and MPDUs conforming to an IEEE 802.11 standard, such as that defined by the IEEE 802.11-2016 specification or amendments thereof including, but not limited to, 802.11ah, 802.11ad, 802.11ay, 802.11ax, 802.11az, 802.11ba and 802.11be.

The wireless communication device 600 can be, or can include, a chip, system on chip (SoC), chipset, package or device that includes one or more modems 602, for example, a Wi-Fi (IEEE 802.11 compliant) modem. In some implementations, the one or more modems 602 (collectively "the modem 602") additionally include a WWAN modem (for example, a 3GPP 4G LTE or 5G compliant modem). In some implementations, the wireless communication device 600 also includes one or more radios 604 (collectively "the radio 604"). In some implementations, the wireless communication device 606 further includes one or more processors, processing blocks or processing elements 606 (collectively "the processor 606") and one or more memory blocks or elements 608 (collectively "the memory 608").

The modem 602 can include an intelligent hardware block or device such as, for example, an application-specific integrated circuit (ASIC) among other possibilities. The modem 602 is generally configured to implement a PHY layer. For example, the modem 602 is configured to modulate packets and to output the modulated packets to the radio 604 for transmission over the wireless medium. The modem 602 is similarly configured to obtain modulated packets received by the radio 604 and to demodulate the packets to provide demodulated packets. In addition to a modulator and a demodulator, the modem 602 may further include digital signal processing (DSP) circuitry, automatic gain control (AGC), a coder, a decoder, a multiplexer and a demultiplexer. For example, while in a transmission mode, data obtained from the processor 606 is provided to a coder, which encodes the data to provide encoded bits. The encoded bits are mapped to points in a modulation constellation (using a selected MCS) to provide modulated symbols. The modulated symbols may be mapped to a number $N_{SS}$ of spatial streams or a number $N_{STS}$ of space-time streams. The modulated symbols in the respective spatial or space-time streams may be multiplexed, transformed via an inverse fast Fourier transform (IFFT) block, and subsequently provided to the DSP circuitry for Tx windowing and filtering. The digital signals may be provided to a digital-to-analog converter (DAC). The resultant analog signals may be provided to a frequency upconverter, and ultimately, the radio 604. In implementations involving beamforming, the modulated symbols in the respective spatial streams are precoded via a steering matrix prior to their provision to the IFFT block.

While in a reception mode, digital signals received from the radio 604 are provided to the DSP circuitry, which is configured to acquire a received signal, for example, by detecting the presence of the signal and estimating the initial timing and frequency offsets. The DSP circuitry is further configured to digitally condition the digital signals, for example, using channel (narrowband) filtering, analog impairment conditioning (such as correcting for I/Q imbalance), and applying digital gain to ultimately obtain a narrowband signal. The output of the DSP circuitry may be fed to the AGC, which is configured to use information extracted from the digital signals, for example, in one or more received training fields, to determine an appropriate gain. The output of the DSP circuitry also is coupled with the demodulator, which is configured to extract modulated symbols from the signal and, for example, compute the logarithm likelihood ratios (LLRs) for each bit position of each subcarrier in each spatial stream. The demodulator is coupled with the decoder, which may be configured to process the LLRs to provide decoded bits. The decoded bits from all of the spatial streams are fed to the demultiplexer for demultiplexing. The demultiplexed bits may be descrambled and provided to the MAC layer (the processor 606) for processing, evaluation or interpretation.

The radio 604 generally includes at least one radio frequency (RF) transmitter (or "transmitter chain") and at least one RF receiver (or "receiver chain"), which may be combined into one or more transceivers. For example, the RF transmitters and receivers may include various DSP circuitry including at least one power amplifier (PA) and at least one low-noise amplifier (LNA), respectively. The RF transmitters and receivers may in turn be coupled to one or more antennas. For example, in some implementations, the wireless communication device 600 can include, or be coupled with, multiple transmit antennas (cach with a corresponding transmit chain) and multiple receive antennas (cach with a corresponding receive chain). The symbols output from the modem 602 are provided to the radio 604, which transmits the symbols via the coupled antennas. Similarly, symbols received via the antennas are obtained by the radio 604, which provides the symbols to the modem 602.

The processor 606 can include an intelligent hardware block or device such as, for example, a processing core, a processing block, a central processing unit (CPU), a microprocessor, a microcontroller, a digital signal processor (DSP), an application-specific integrated circuit (ASIC), a programmable logic device (PLD) such as a field programmable gate array (FPGA), discrete gate or transistor logic, discrete hardware components, or any combination thereof designed to perform the functions described herein. The processor 606 processes information received through the radio 604 and the modem 602, and processes information to be output through the modem 602 and the radio 604 for transmission through the wireless medium. For example, the processor 606 may implement a control plane and MAC layer configured to perform various operations related to the generation and transmission of MPDUs, frames or packets. The MAC layer is configured to perform or facilitate the coding and decoding of frames, spatial multiplexing, space-time block coding (STBC), beamforming, and OFDMA resource allocation, among other operations or techniques.

In some implementations, the processor 606 may generally control the modem 602 to cause the modem to perform various operations described above.

The memory 608 can include tangible storage media such as random-access memory (RAM) or read-only memory (ROM), or combinations thereof. The memory 608 also can store non-transitory processor- or computer-executable software (SW) code containing instructions that, when executed by the processor 606, cause the processor to perform various operations described herein for wireless communication, including the generation, transmission, reception and interpretation of MPDUs, frames or packets. For example, various functions of components disclosed herein, or various blocks or steps of a method, operation, process or algorithm disclosed herein, can be implemented as one or more modules of one or more computer programs.

Figure 7B:
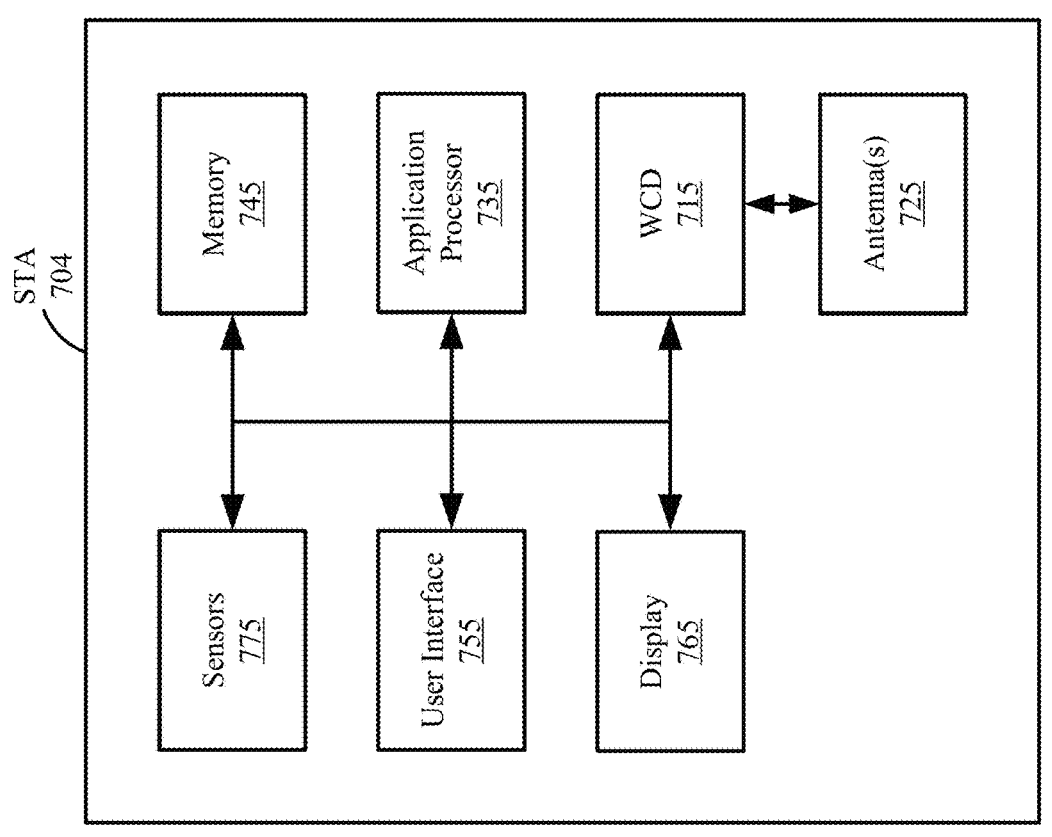
FIG. 7B shows a block diagram of an example STA.
Figure 7A:
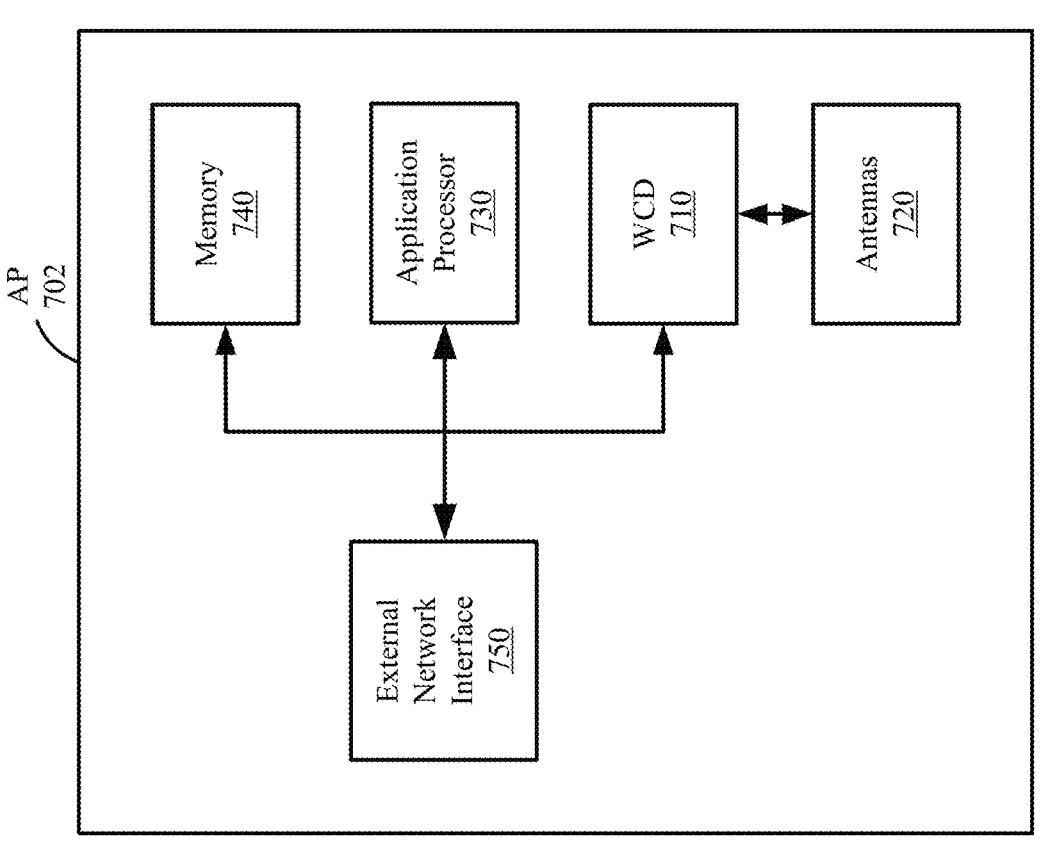
FIG. 7A shows a block diagram of an example AP.

FIG. 7A shows a block diagram of an example AP 702. For example, the AP 702 can be an example implementation of the AP 102 described with reference to FIG. 1. The AP 702 includes a wireless communication device (WCD) 710. For example, the wireless communication device 710 may be an example implementation of the wireless communication device 600 described with reference to FIG. 6. The AP 702 also includes multiple antennas 720 coupled with the wireless communication device 710 to transmit and receive wireless communications. In some implementations, the AP 702 additionally includes an application processor 730 coupled with the wireless communication device 710, and a memory 740 coupled with the application processor 730. The AP 702 further includes at least one external network interface 750 that enables the AP 702 to communicate with a core network or backhaul network to gain access to external networks including the Internet. For example, the external network interface 750 may include one or both of a wired (for example, Ethernet) network interface and a wireless network interface (such as a WWAN interface). Ones of the aforementioned components can communicate with other ones of the components directly or indirectly, over at least one bus. The AP 702 further includes a housing that encompasses the wireless communication device 710, the application processor 730, the memory 740, and at least portions of the antennas 720 and external network interface 750.

FIG. 7B shows a block diagram of an example STA 704. For example, the STA 704 can be an example implementation of the STA 104 described with reference to FIG. 1. The STA 704 includes a wireless communication device 715. For example, the wireless communication device 715 may be an example implementation of the wireless communication device 600 described with reference to FIG. 6. The STA 704 also includes one or more antennas 725 coupled with the wireless communication device 715 to transmit and receive wireless communications. The STA 704 additionally includes an application processor 735 coupled with the wireless communication device 715, and a memory 745 coupled with the application processor 735. In some implementations, the STA 704 further includes a user interface (UI) 755 (such as a touchscreen or keypad) and a display 765, which may be integrated with the UI 755 to form a touchscreen display. In some implementations, the STA 704 may further include one or more sensors 775 such as, for example, one or more inertial sensors, accelerometers, temperature sensors, pressure sensors, or altitude sensors. Ones of the aforementioned components can communicate with other ones of the components directly or indirectly, over at least one bus. The STA 704 further includes a housing that encompasses the wireless communication device 715, the application processor 735, the memory 745, and at least portions of the antennas 725, UI 755, and display 765.

Figure 8:
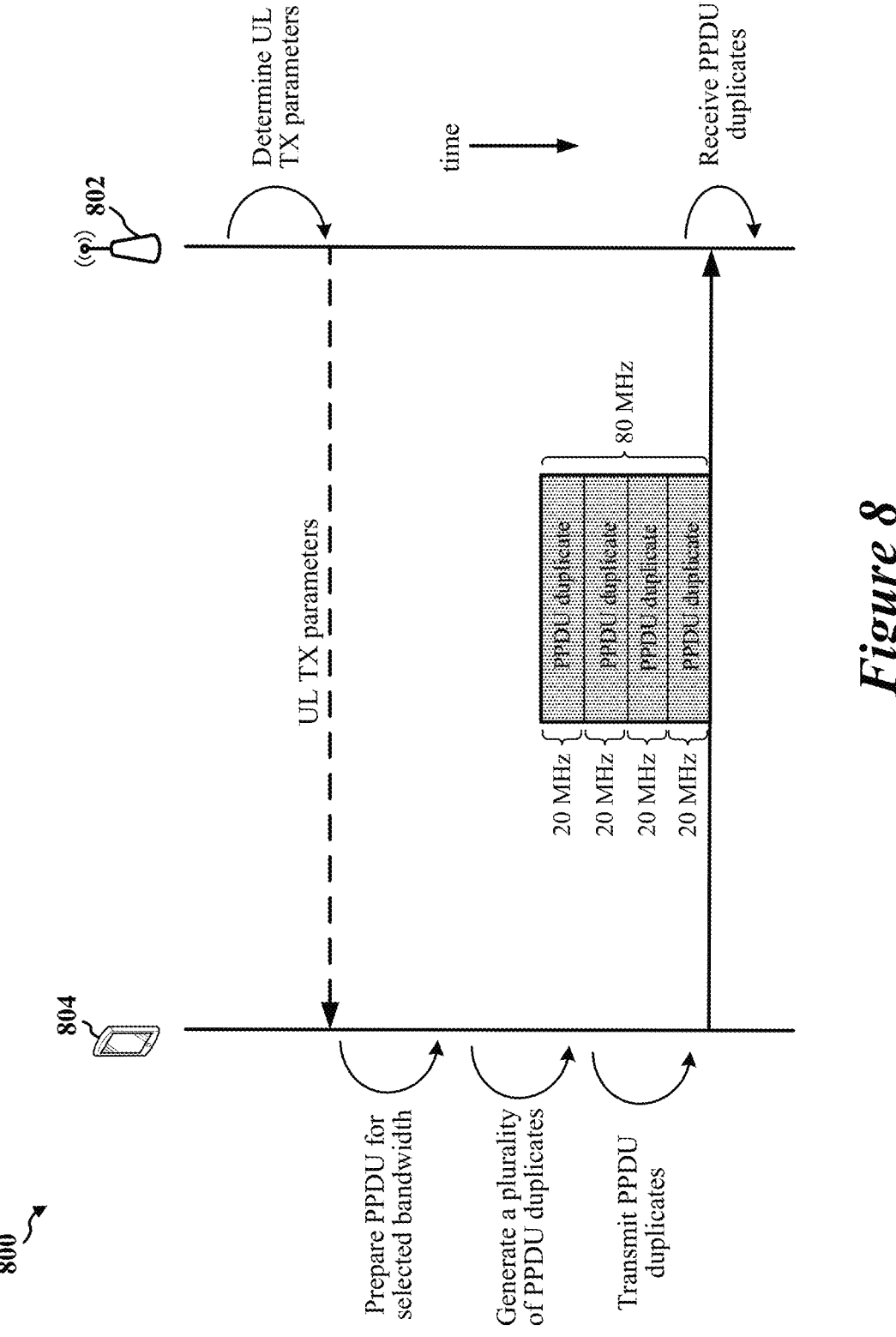
FIG. 8 shows a sequence diagram of an example communication that supports transmitting PPDU duplicates.

FIG. 8 shows a sequence diagram of an example communication 800 that supports transmitting PPDU duplicates. In some implementations, the communication 800 may be performed between an AP 802 and one or more STAs 804 (only one STA is shown in FIG. 8 for simplicity). The AP 802 may be an example of the AP 102 of FIG. 1 or the AP 702 of FIG. 7A, and the STA 804 may be an example of the STA 104 of FIG. 1 or the STA 704 of FIG. 7B. In some other implementations, the communication 800 may be performed by any suitable wireless communication devices.

In some implementations, the AP 802 may determine, select, or obtain one or more UL transmission parameters, and may indicate the one or more UL transmission parameters to the STA 804 using any suitable frame (such as a control frame or a management frame). The STA 804 receives the indication of the one or more UL transmission parameters, and formats or prepares a PPDU for transmission on a selected bandwidth.

The STA 804 generates a plurality of PPDU duplicates based on duplication of an entirety of the PPDU except for any universal signal field (U-SIG) and EHT-SIG, for example, such that each PPDU duplicate of the plurality of PPDU duplicates is prepared for transmission across the selected bandwidth. In some implementations, a number N of the PPDU duplicates generated by duplicating the PPDU may be based at least in part on a power spectral density (PSD) limit applicable to a combined frequency bandwidth of the plurality of different frequency subbands, where N is an integer greater than one. In the example of FIG. 8, the STA 804 generates N=4 PPDU duplicates, and each of the PPDU duplicates is formatted for a 20 MHz bandwidth.

The STA 804 transmits each PPDU duplicate of the plurality of PPDU duplicates on a corresponding frequency subband of a plurality of different frequency subbands. As shown, each PPDU duplicate is transmitted on a 20 MHz frequency subband, and the resulting PPDU transmission spans an 80 MHz bandwidth. The AP 802 receives the PPDU duplicates spanning the 80 MHz bandwidth.

As discussed, the number N of PPDU duplicates generated by the STA 804 may be based at least in part on a PSD limit applicable to a combined frequency bandwidth occupied by the number N of PPDU duplicates. In some instances, the combined frequency bandwidth may be N times greater than the selected bandwidth upon which a respective PPDU duplicate is transmitted. In the example of FIG. 8, the applicable PSD limit is based on the combined frequency bandwidth of 80 MHZ, rather than the 20 MHz bandwidth of each PPDU duplicate, thereby increasing the maximum allowed transmit power of the STA 804 by approximately four times.

Although not shown in FIG. 8 for simplicity, the PPDU may include a physical layer preamble containing a pre-HE or pre-EHT modulated portion and a HE or EHT modulated portion. The PPDU also may include one or more data fields. In some implementations, the STA 804 may duplicate the pre-HE or pre-EHT modulated portion of the preamble, the HE or EHT modulated portion of the preamble, and the one or more data fields according to a same duplicate format. In the example of FIG. 8, the pre-HE or pre-EHT modulated preamble portion, the HE or EHT modulated preamble portion, and the one or more data fields each span 20 MHz, and are each duplicated N=4 times to span a larger frequency bandwidth of 80 MHZ.

In some other implementations, the STA 804 may duplicate the pre-HE or pre-EHT modulated portion of the preamble according to a first duplicate format, and may duplicate the HE or EHT modulated portion of the preamble and the one or more data fields according to a second duplicate format that is different than the first duplicate format. For example, in some instances, the pre-HE or pre-EHT modulated preamble portion may span 20 MHz and may be duplicated 4 times to span a larger frequency bandwidth of 80 MHz, and the HE or EHT modulated preamble portion and the one or more data fields may each span 40 MHz and may be duplicated 2 times to span the larger frequency bandwidth of 80 MHZ.

For another example, the selected bandwidth may be 20 MHZ, duplicating the PPDU may generate eight PPDU duplicates, and the eight PPDU duplicates may be transmitted on different 20 MHz frequency subbands of a contiguous 160 MHz wireless channel or a non-contiguous 80+80 MHz wireless channel. For another example, the selected bandwidth may be 40 MHz, duplicating the PPDU may generate two PPDU duplicates, and the two PPDU duplicates may be transmitted on different 40 MHZ frequency subbands of an 80 MHz wireless channel. For another example, the selected bandwidth may be 40 MHz, duplicating the PPDU may generate four PPDU duplicates, and the four PPDU duplicates may be transmitted on different 40 MHz frequency subbands of a contiguous 160 MHz wireless channel or a non-contiguous 80+80 MHZ wireless channel. For another example, the selected bandwidth may be 80 MHZ, duplicating the PPDU may generate two PPDU duplicates, and the two PPDU duplicates may be transmitted on different 80 MHz frequency subbands of a contiguous 160 MHz wireless channel or a non-contiguous 80+80 MHz wireless channel. For another example, the selected bandwidth may be 80 MHz, duplicating the PPDU may generate four PPDU duplicates, and the four PPDU duplicates may be transmitted on different 80 MHz frequency subbands of a contiguous 320 MHz wireless channel or a non-contiguous 160+160 MHz wireless channel. Other configurations are possible.

In some implementations, the PPDU may be one of a high-efficiency (HE) format, an extremely high throughput (EHT) format, or a single-user (SU) extended range (ER) PPDU format. U-SIG and EHT-SIG also may be duplicated in the time domain, for example, in a manner similar to the time domain duplication of HE-SIG-A for HE ER SU PPDUs. In some instances, the STA 804 may generate the PPDU duplicates by duplicating a pre-HE or pre-EHT modulated portion of the preamble in cach of a plurality of 20 MHz frequency subbands, and duplicating a HE or EHT modulated portion of the preamble and one or more data portions in cach of a plurality of 40 MHz frequency subbands, 80 MHz frequency subbands, or 160 MHz frequency subbands.

The pre-HE or pre-EHT modulated portion of the preamble may include L-STF, L-LTF, L-SIG, RL-SIG, HE-SIG-A, and U-SIG (and possibly HE-SIG-B in pre-HE modulated portions, and EHT-SIG in pre-EHT modulated portions). The HE or EHT modulated portion of the preamble may include a number of HE or EHT signal fields and a number of HE or EHT training fields (such as HE-STF, HE-LTF, EHT-STF, EHT-LTF, and one or more data fields). In some implementations, a signal field of cach PPDU duplicate may be used to indicate a presence of the PPDU duplicates, to indicate a frequency bandwidth of the PPDU duplicate, to indicate an entire bandwidth across which the plurality of PPDU duplicates are transmitted, or any combination thereof. In some instances, the PPDU may be a HE PPDU, and the signal field may be one of a HE-SIG-A field or a HE-SIG-B field. In some other instances, the PPDU may be an EHT PPDU, and the signal field may be a EHT-SIG field or a U-SIG field.

Figure 9A:
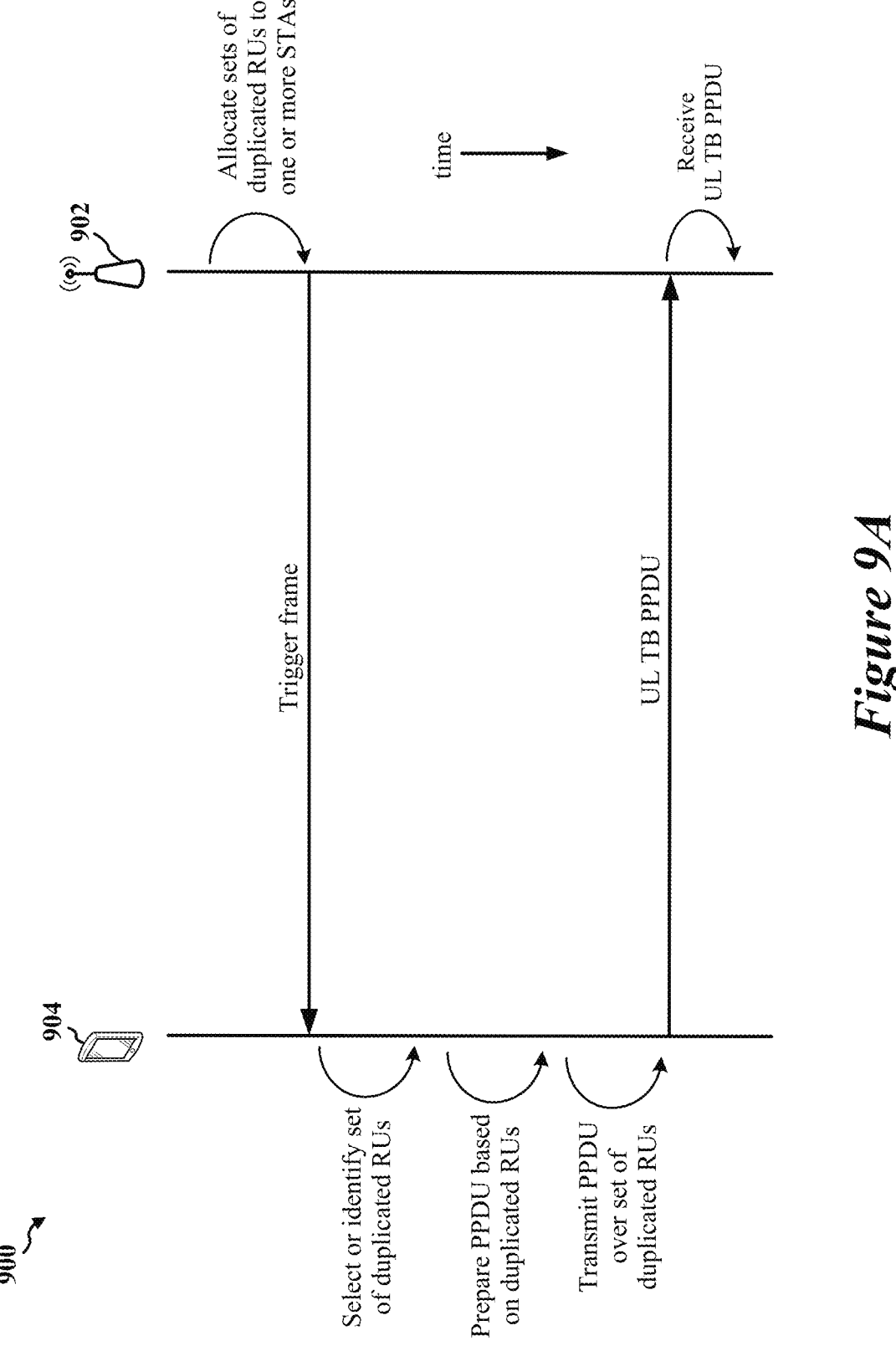
FIG. 9A shows a sequence diagram of an example communication that supports transmitting a PPDU using duplicated resource units (RUs).

FIG. 9A shows a sequence diagram of an example communication 900 that supports transmitting a PPDU using duplicated RUs. In some implementations, the communication 900 may be performed between an AP 902 and one or more STAs 904 (only one STA is shown in FIG. 9A for simplicity). The AP 902 may be an example of the AP 102 of FIG. 1 or the AP 702 of FIG. 7A, and the STA 904 may be an example of the STA 104 of FIG. 1 or the STA 704 of FIG. 7B. In some other implementations, the communication 900 may be performed by any suitable wireless communication devices.

In some implementations, the AP 902 may allocate one or more sets of duplicated RUs to different STAs for UL transmissions. In some instances, the AP 902 may transmit a trigger frame that allocates a set of duplicated RUs to the STA 904 for UL transmissions. The STA 904 receives the trigger frame, and obtains the set of duplicated RUs allocated by the trigger frame. In some other instances, the STA may select or otherwise obtain the set of duplicated RUs without the trigger frame. The STA 904 may format or prepare a PPDU for transmission based on the duplicated RUs, and transmit the PPDU using the set of duplicated RUs. In some instances, the PPDU may be transmitted as an UL TB PPDU. In some other instances, the PPDU may be transmitted as DL data (such as DL OFDMA communications).

The PSD limit applicable to the communication 900 may be based on a frequency bandwidth spanned by the set of duplicated RUs, and the frequency bandwidth may be at least twice the RU bandwidth of a respective duplicated RU. In some instances, each RU in a set of duplicated RUs may include a same number of tones. In some other instances, one or more RUs included in the set of duplicated RUs may include at least one non-contiguous tone.

Figure 9B:
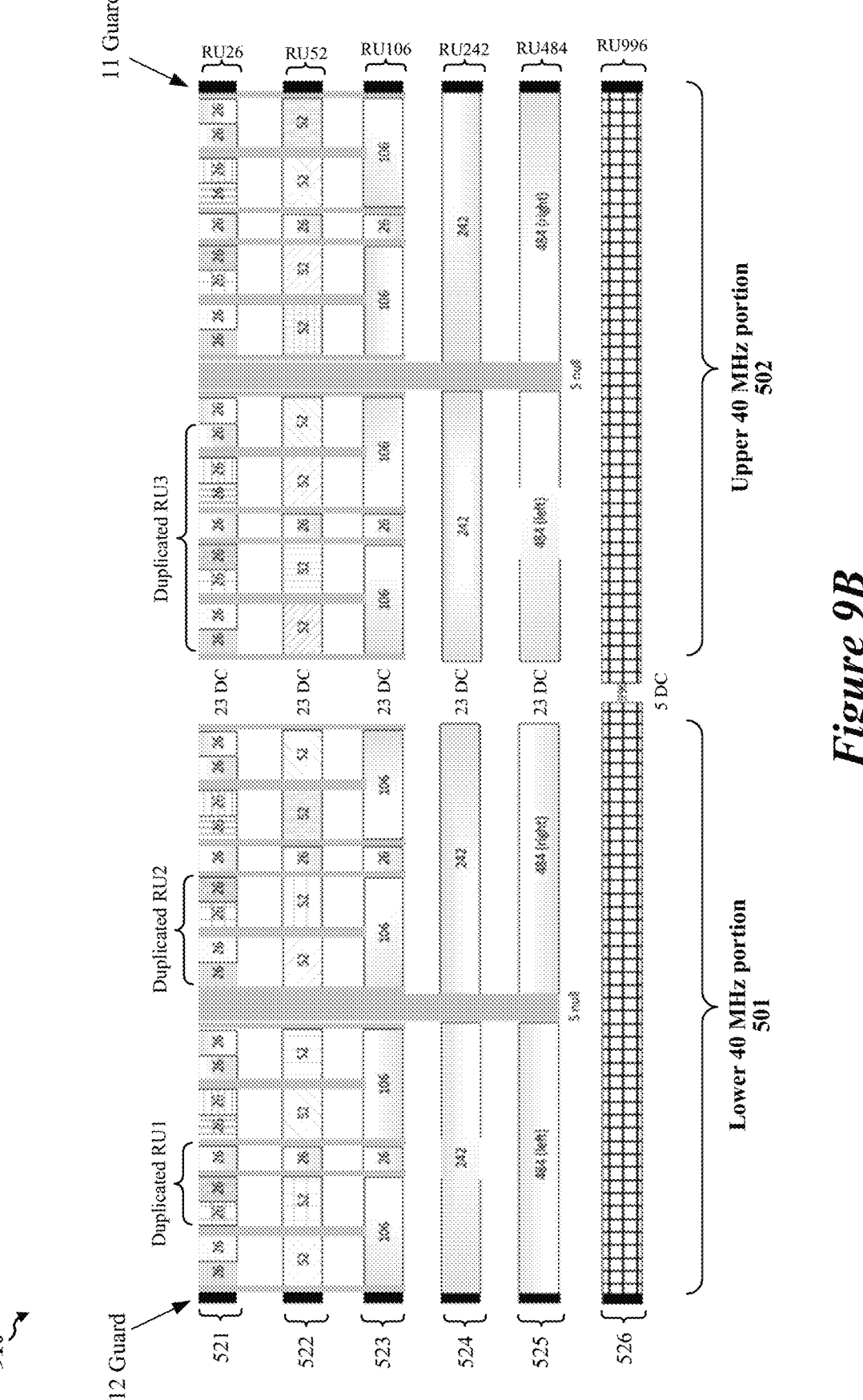
FIG. 9B shows an example RU duplication.

FIG. 9B shows an example RU duplication 910. The RU duplication 910 may include a first duplicated resource unit (RU1), a second duplicated resource unit (RU2), and a third duplicated resource unit (RU3). The first duplicated resource unit RU1 may be based on duplicating a 26-tone RU (RU26) two times such that the resulting duplicated resource unit RU1 spans three adjacent RU26s, which may increase the frequency bandwidth used to transmit a PPDU by three times (as compared with transmitting the PPDU using a single RU26), and therefore increase the allowable transmit power by three times. The second duplicated resource unit RU2 may be based on duplicating a 52-tone RU (RU52) once such that the resulting duplicated resource unit RU2 spans two adjacent RU52s, which may increase the frequency bandwidth used to transmit a PPDU by two times (as compared with transmitting the PPDU using a single RU52), and therefore increase the allowable transmit power by two times. The third duplicated resource unit RU3 may be based on duplicating a 26-tone RU (RU26) two times such that the resulting duplicated resource unit RU3 spans three non-adjacent RU26s, which may increase the frequency bandwidth used to transmit a PPDU by three times (as compared with transmitting the PPDU using a single RU26), and therefore increase the allowable transmit power by three times.

Figure 10A:
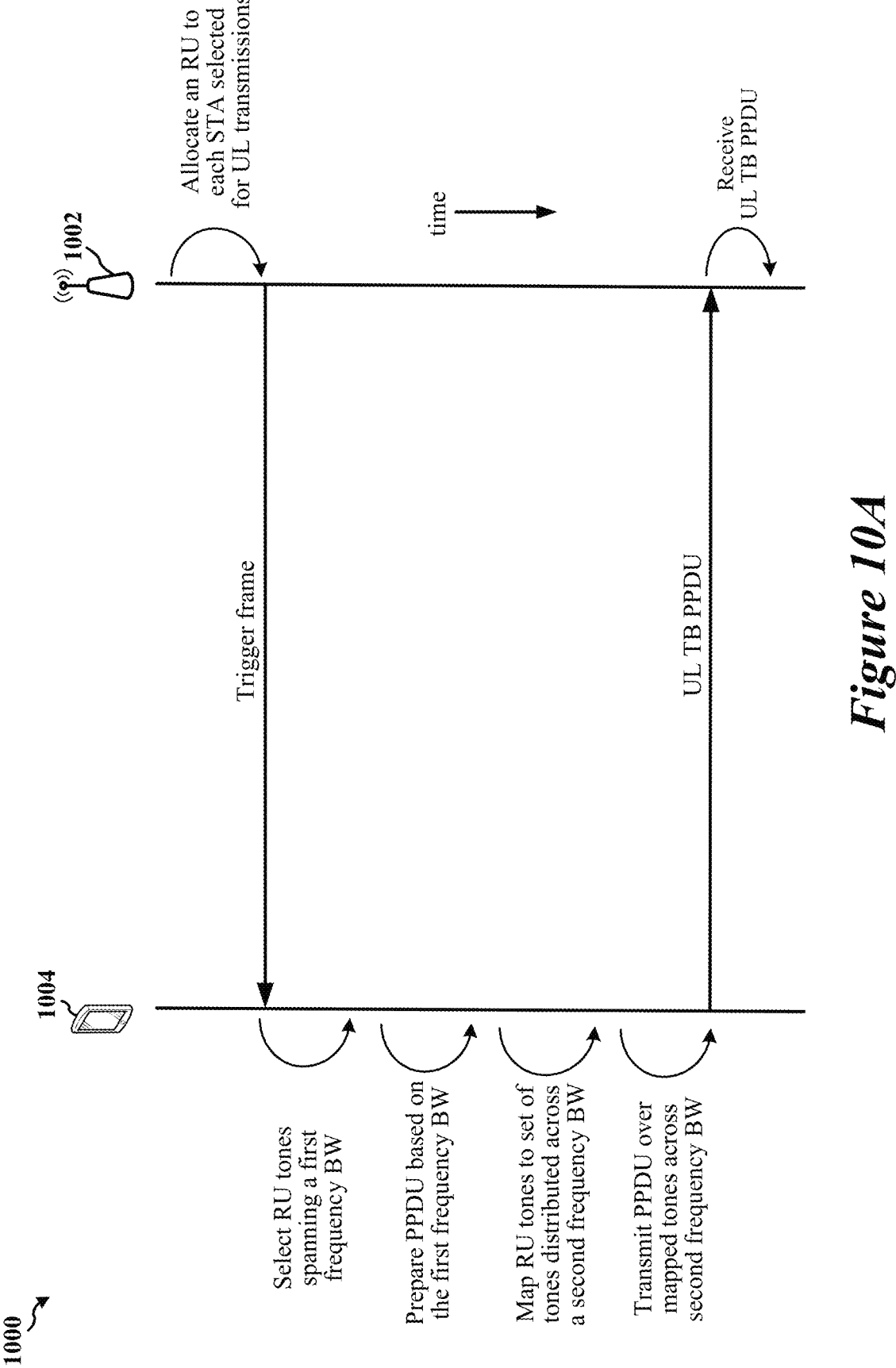
FIG. 10A shows a sequence diagram of an example communication that supports transmitting a PPDU using tone mapping.

FIG. 10A shows a sequence diagram of an example communication 1000 that supports transmitting a PPDU using tone mapping. In some implementations, the communication 1000 may be performed between an AP 1002 and one or more STAs 1004 (only one STA is shown in FIG. 10A for simplicity). The AP 1002 may be an example of the AP 102 of FIG. 1 or the AP 702 of FIG. 7A, and the STA 1004 may be an example of the STA 104 of FIG. 1 or the STA 704 of FIG. 7B. In some other implementations, the communication 1000 may be performed by any suitable wireless communication devices.

In some implementations, the AP 1002 may allocate one or more RUs to each of a number of STAs for UL transmissions. The AP 1002 may transmit a trigger frame that allocates a set of RUs to solicit UL transmissions from the STAs identified by the trigger frame. In some instances, the trigger frame may allocate a RU including a set of contiguous tones spanning a first frequency bandwidth to the STA 1004. In some other instances, a respective STA can obtain or select the RU.

The STA 1004 receives the trigger frame, and selects tones indicated by the trigger frame. The STA 1004 formats or prepares a PPDU for transmission based on the first frequency bandwidth of the selected RU, and maps the set of contiguous tones of the selected RU to a set of non-contiguous tones distributed across a second frequency bandwidth that is larger than the first frequency bandwidth. The STA 1004 transmits the PPDU using the set of non-contiguous tones that span the second frequency bandwidth.

The PSD limit applicable to the communication 1000 may be based on the second frequency bandwidth, and the second frequency bandwidth may be at least an order of magnitude larger than the first frequency bandwidth. In some implementations, the set of contiguous tones of the allocated RU includes 26 tones spanning a 2 MHZ frequency subband, includes 52 tones spanning a 4 MHz frequency subband, includes 106 tones spanning a 10 MHz frequency subband, or includes 242 tones spanning a 20 MHz frequency subband, and each tone of the set of non-contiguous tones is transmitted on a unique 1 MHz frequency subband. In some instances, a spacing between pairs of adjacent tones of the set of non-contiguous tones includes a number M of tones unallocated to the wireless communication device, where M is an integer greater than one. The number M of unallocated tones may be used for UL transmissions from one or more other STAs, concurrently with transmission of the UL TB PPDU from the STA 1004.

In some implementations, the STA 1004 may transmit a first portion of the PPDU using a first group of 26 tones of the set of non-contiguous tones, may transmit a second portion of the PPDU using a remaining 14 tones of the set of non-contiguous tones, where the first and second portions of the PPDU are transmitted concurrently. In some instances, the STA 1004 may transmit one or more subsequent PPDUs using the set of non-contiguous tones by repeatedly cycling through the tones of the set of non-contiguous tones. In some other implementations, the STA 1004 may transmit a first portion of the PPDU using a first group of 26 tones of the set of non-contiguous of tones, may transmit a second portion of the PPDU using a second group of 26 tones of the set of non-contiguous tones, may transmit a third portion of the PPDU using a third group of 26 tones of the set of non-contiguous tones, and may transmit a fourth portion of the PPDU using a remaining 2 tones of the set of non-contiguous tones, where the first, second, third, and fourth portions of the PPDU are transmitted concurrently, and are cyclic copies of each other. In some instances, the STA 1004 may transmit one or more subsequent PPDUs using the set of non-contiguous tones by repeatedly cycling through the tones of the set of non-contiguous tones.

In some other implementations, the set of contiguous tones of the allocated RU may include 26 tones spanning a 2 MHz frequency subband, and the set of non-contiguous tones may include 20 tones spanning a 20 MHz frequency subband. In some instances, the STA 1004 may map the set of contiguous tones to the set of non-contiguous tones by determining a spacing between adjacent tones of the set of non-contiguous tones, and distributing the tones of the set of non-contiguous tones across the second frequency bandwidth based on the determined spacing. The STA 1004 may determine the spacing by dividing the number of tones in the set of non-contiguous tones by the number of tones in the set of contiguous tones in the allocated RU, generating an integer quotient and a remainder based on the dividing, and selecting the integer quotient as the spacing.

Figure 10B:
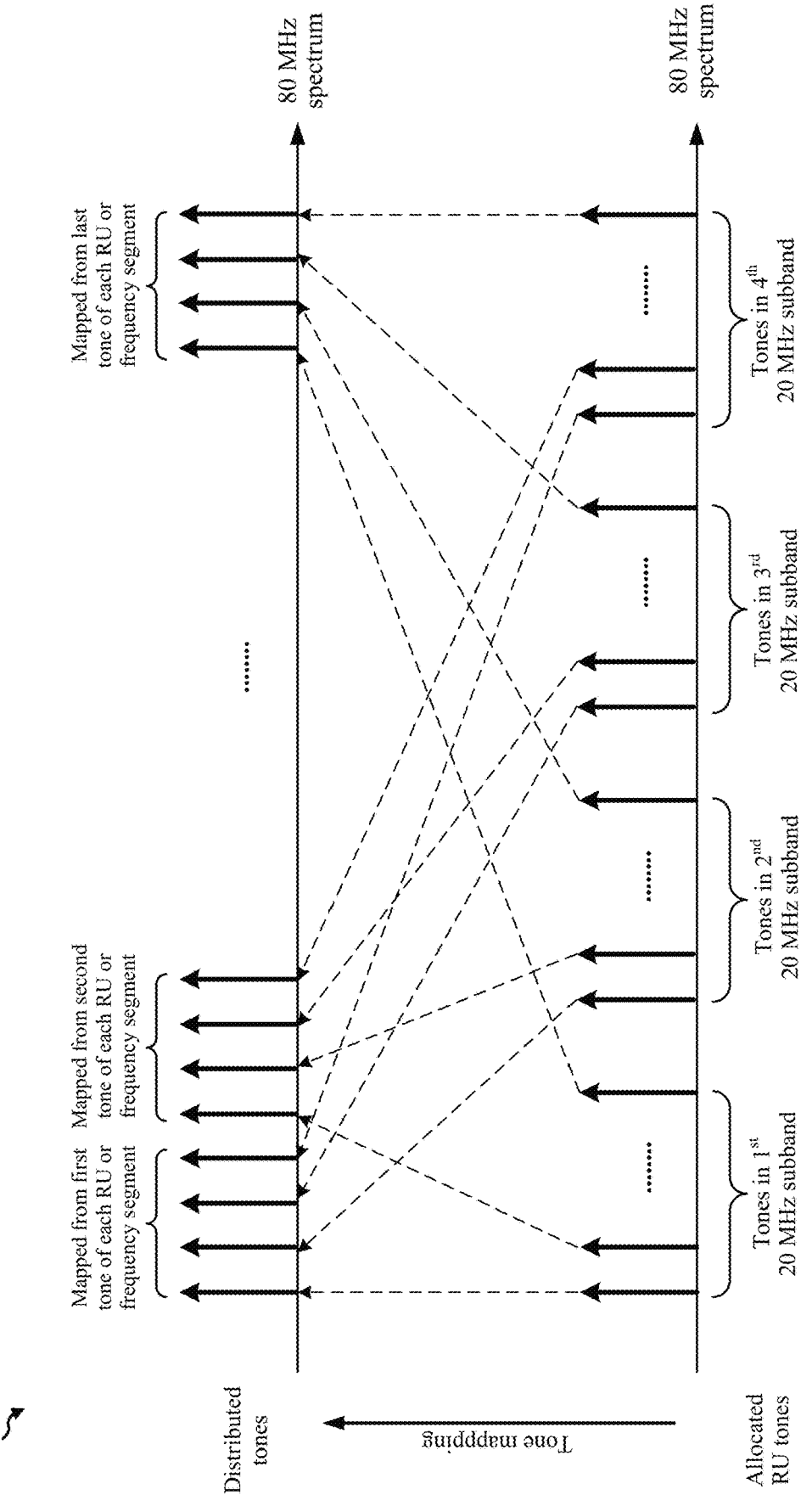
FIG. 10B shows an example mapping of tones.

FIG. 10B shows an example mapping 1010 of tones. As shown, the tones allocated to (or selected by) a user (or STA) can be mapped to a second set of tones that are distributed across an 80 MHz frequency band. In some instances, the tones included in a respective RU (which may be referred to herein as the "existing tones") may be contiguous tones associated with one of the RU26, RU52, RU106, RU242, RU484, or RU996 resource units of a tone plan adopted by one or more of the IEEE 802.11 family of wireless communication protocol standards (such as the IEEE 802.11ax or 802.11be standards). In some other instances, the tones included in a respective RU may be distributed across a 20 MHz frequency segment when the respective RU is one of the RU26, RU52, or RU106 resource units of the tone plan. For example, during a resource allocation stage, each STA may select or obtain a single RU or multi-RU for UL transmissions. When the STA selects, obtains, or is allocated an RU or multi-RU smaller than RU242 (which spans a 20 MHz frequency subband), the user may use the contiguous tones of the allocated RU to transmit UL data, or may spread the contiguous tones of the RU across a 20 MHz frequency subband and transmit UL data using the spread tones.

In some implementations, the existing tones allocated to a number of users can be mapped to corresponding sets of interleaved tones distributed across a wider frequency bandwidth (such as wider than 20 MHz). As shown in the example of FIG. 10B, the existing tones are sequentially mapped, one at a time from each selected or allocated RU (or 20 MHz frequency segment), to a corresponding tone in the second set of non-contiguous tones distributed across the 80 MHz frequency band. That is, the mapped tones occupy every $M^{th}$ tone of a tone plan associated with the wider frequency bandwidth, where $M=N+1$, and N indicates the number of other sets of non-contiguous tones. In this manner, the applicable PSD limit may be based on the wider frequency band spanned by the second sets of mapped tones, for example, rather than the frequency subband spanned by an allocated RU or a 20 MHz frequency segment.

In the example of FIG. 10B, the existing tones in the first 20 MHZ frequency subband are mapped to the first tone, the fifth tone, the nineth tone, and so on, of the distributed sets of tones spanning an 80 MHz frequency band. The existing tones in the second 20 MHz frequency subband are mapped to the second tone, the sixth tone, the tenth tone, and so on, of the distributed sets of tones spanning the 80 MHZ frequency band. The existing tones in the third 20 MHz frequency subband are mapped to the third tone, the seventh tone, the eleventh tone, and so on, of the distributed sets of tones spanning the 80 MHz frequency band. The existing tones in the fourth 20 MHZ frequency subband are mapped to the fourth tone, the eighth tone, the twelfth tone, and so on, of the distributed sets of tones spanning the 80 MHz frequency band. In this manner, the applicable PSD limit and total transmit power may be based on the 80 MHZ frequency band, for example, rather than on a 20 MHz frequency segment.

In some other implementations, the sets of non-contiguous tones mapped from selected, obtained, or allocated RUs or 20 MHz frequency segments may be distributed across other frequency bands such as, for example, a 20 MHz frequency band, a 40 MHz frequency band, a 160 MHz frequency band, or a 320 MHz frequency band. Also, implementations of the subject matter disclosed herein can be used with allocated RUs of other sizes such as, for example, RU52, RU106, RU242, RU484, or RU996.

Figure 10C:
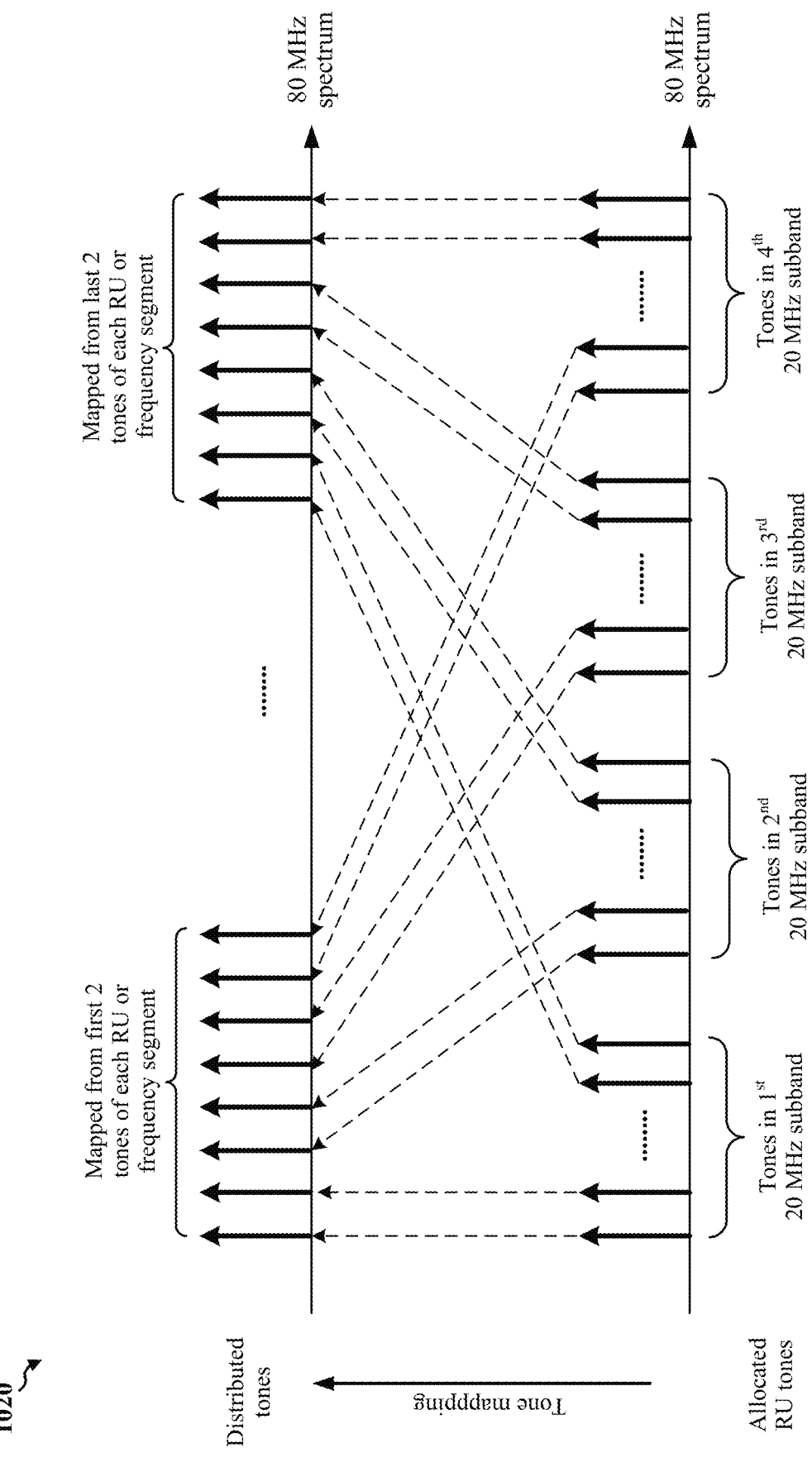
FIG. 10C shows an example mapping of tones.

FIG. 10C shows an example mapping 1020 of tones. As shown, the existing tones allocated by the trigger frame to each user may span a corresponding 20 MHz frequency subband, and may be mapped to a second set of tones that span an 80 MHz frequency band. In some implementations, the distributed tones mapped from the existing tones of each allocated RU (or each 20 MHz frequency segment) are interleaved with one another such that each of the second sets of distributed tones spans an entirety of the 80 MHz frequency band. In this manner, the applicable PSD limit and total transmit power may be based on the 80 MHz frequency band, for example, rather than on a 20 MHz frequency segment.

In the example of FIG. 10C, two tones are sequentially mapped from each RU or frequency segment to a corresponding pair of tones in the second set of tones distributed across the 80 MHz frequency band. That is, the tones of the set of non-contiguous tones occupy every $M^{th}$ and $M+1^{th}$ tone of a tone plan associated with the second frequency bandwidth, where M=N+1, and N indicates the number of other sets of non-contiguous tones. In some other implementations, a group of more than two tones are sequentially mapped from each allocated RU or frequency segment to a corresponding group of more than two tones in the second set of tones distributed across the 80 MHz frequency band. In some other implementations, the sets of non-contiguous tones mapped from allocated RUs or 20 MHz frequency segments may be distributed across other frequency bands such as, for example, a 20 MHz frequency band, a 40 MHz frequency band, a 160 MHz frequency band, or a 320 MHz frequency band. Also, implementations of the subject matter disclosed herein can be used with allocated RUs of other sizes such as, for example, RU52, RU106, RU242, RU484, or RU996.

FIG. 11 shows a flowchart illustrating an example operation 1100 for wireless communication that supports transmitting PPDU duplicates. In some implementations, the operation 1100 may be performed by an apparatus of a wireless communication device operating as or within a STA, such as one of the STAs 104 of FIG. 1, the STA 704 of FIG. 7B, or the STA 804 of FIG. 8. In some other implementations, the operation 1100 may be performed by an apparatus of a wireless communication device operating as or within a network node.

At block 1102, the wireless communication device generates a plurality of PPDU duplicates configured for transmission over the selected bandwidth. At block 1104, the wireless communication device outputs each PPDU duplicate of the plurality of PPDU duplicates over a corresponding frequency subband of a plurality of different frequency subbands of a wireless channel. In some instances, each PPDU duplicate may be based on duplication of an entirety of the PPDU except for any universal signal field (U-SIG).

The PPDU may include a physical layer preamble containing a pre-EHT modulated portion and an EHT modulated portion. The PPDU also may include one or more data fields. In some implementations, generating the plurality of PPDU duplicates includes duplicating the pre-EHT modulated portion of the preamble, the EHT modulated portion of the preamble, and the one or more data fields according to a same duplicate format. In some other implementations, generating the plurality of PPDU duplicates includes duplicating the pre-EHT modulated portion of the preamble according to a first duplicate format, duplicating the EHT modulated portion of the preamble according to a second duplicate format, and duplicating the one or more data fields according to the second duplicate format, where the second duplicate format is different than the first duplicate format. In some instances, the first duplicate format may be associated with a first multiple of a frequency bandwidth, and the second duplicate format may be associated with a second multiple of the frequency bandwidth, where the second multiple is at least twice the first multiple.

In some implementations, a number N of generated PPDU duplicates may be based at least in part on a power spectral density (PSD) limit applicable to a combined frequency bandwidth of the plurality of different frequency subbands, where N is an integer greater than one. In some instances, the combined frequency bandwidth may be N times greater than the selected bandwidth upon which a respective PPDU duplicate is transmitted. In some other implementations, the plurality of different frequency subbands may include one or more unlicensed channels in a 6 GHz frequency spectrum, and the PSD limit applicable to the transmission may be based on a combined frequency bandwidth of the plurality of different frequency subbands.

FIG. 12A shows a flowchart illustrating an example operation 1200 for wireless communication that supports transmitting PPDU duplicates. In some implementations, the operation 1200 may be performed by an apparatus of a wireless communication device operating as or within a STA, such as one of the STAs 104 of FIG. 1, the STA 704 of FIG. 7B, or the STA 804 of FIG. 8. In some other implementations, the operation 1200 may be performed by an apparatus of a wireless communication device operating as or within a network node. In some instances, the operation 1200 is an example of generating the plurality of PPDU duplicates in block 1102 of the operation 1100 described with reference to FIG. 11. For example, at block 1202, the wireless communication device duplicates the pre-EHT modulated portion of the preamble, the EHT modulated portion of the preamble, and the one or more data fields according to a same duplicate format.

FIG. 12B shows a flowchart illustrating an example operation 1210 for wireless communication that supports transmitting PPDU duplicates. In some implementations, the operation 1210 may be performed by an apparatus of a wireless communication device operating as or within a STA, such as one of the STAs 104 of FIG. 1, the STA 704 of FIG. 7B, or the STA 804 of FIG. 8. In some other implementations, the operation 1210 may be performed by an apparatus of a wireless communication device operating as or within a network node. In some instances, the operation 1210 is an example of generating the plurality of PPDU duplicates in block 1102 of the operation 1100 described with reference to FIG. 11. For example, at block 1212, the wireless communication device duplicates the pre-EHT modulated portion of the preamble according to a first duplicate format. At block 1214, the wireless communication device duplicates the EHT modulated portion of the preamble according to a second duplicate format different than the first duplicate format. At block 1216, the wireless communication device duplicates the one or more data fields according to the second duplicate format. In some instances, the first duplicate format may be associated with a first multiple of a frequency bandwidth, and the second duplicate format may be associated with a second multiple of the frequency bandwidth, where the second multiple is at least twice the first multiple.

In this manner, the pre-EHT modulated portion of the PPDU preamble may be duplicated for transmission on a first frequency bandwidth, and the EHT modulated portion of the PPDU preamble and the one or more data fields of the PPDU may be duplicated for transmission on a second frequency bandwidth larger than the first frequency bandwidth. For example, the pre-EHT modulated preamble portion may be duplicated in 20 MHz chunks, while the EHT modulated preamble portion and the one or more data fields may be duplicated in larger frequency chunks (such as 40 MHZ chunks, 80 MHz chunks, or 160 MHz chunks).

FIG. 12C shows a flowchart illustrating an example operation 1220 for wireless communication that supports transmitting PPDU duplicates. In some implementations, the operation 1220 may be performed by an apparatus of a wireless communication device operating as or within a STA, such as one of the STAs 104 of FIG. 1, the STA 704 of FIG. 7B, or the STA 804 of FIG. 8. In some other implementations, the operation 1220 may be performed by an apparatus of a wireless communication device operating as or within a network node. In some instances, the operation 1220 is an example of generating the plurality of PPDU duplicates in block 1102 of the operation 1100 described with reference to FIG. 11. For example, at block 1222, the wireless communication device duplicates the pre-EHT modulated portion of the preamble in each of a plurality of 20 MHz frequency subbands. At block 1224, the wireless communication device duplicates the EHT modulated portion of the preamble in each of a plurality of 40 MHz frequency subbands, 80 MHz frequency subbands, or 160 MHz frequency subbands. At block 1224, the wireless communication device duplicates a data portion of the PPDU in each of the plurality of the 40 MHz frequency subbands, the 80 MHz frequency subbands, or the 160 MHz frequency subbands.

FIG. 13 shows a flowchart illustrating an example operation 1300 for wireless communication that supports RU duplication. In some implementations, the operation 1300 may be performed by an apparatus of a wireless communication device operating as or within a STA, such as one of the STAs 104 of FIG. 1, the STA 704 of FIG. 7B, or the STA 904 of FIG. 9A. In some other implementations, the operation 1300 may be performed by an apparatus of a wireless communication device operating as or within a network node.

At block 1302, the wireless communication device generates a physical layer convergence protocol (PLCP) protocol data unit (PPDU) for transmission based at least in part on the allocated set of duplicated RUs. At block 1304, the wireless communication device outputs the PPDU using the allocated set of duplicated RUs.

In some implementations, a power spectral density (PSD) limit applicable to the transmission is based on a frequency bandwidth spanned by the allocated set of duplicated RUs and the spanned frequency bandwidth is at least twice the frequency bandwidth of a respective duplicated RU. The size of the RUs in the allocated set of RUs may be based at least in part on the applicable PSD limit. In some instances, each RU included in the allocated set of duplicated RUs includes a same number of tones.

FIG. 14 shows a flowchart illustrating an example operation 1400 for wireless communication that supports transmitting one or more PPDUs using tone mapping. In some implementations, the operation 1400 may be performed by an apparatus of a wireless communication device operating as or within a STA, such as one of the STAs 104 of FIG. 1, the STA 704 of FIG. 7B, or the STA 1004 of FIG. 10A. In some other implementations, the operation 1400 may be performed by an apparatus of a wireless communication device operating as or within a network node. At block 1402, the wireless communication device receives a trigger frame allocating a resource unit (RU) to the wireless communication device for uplink (UL) transmissions, the RU including a set of contiguous tones spanning a first frequency bandwidth. At block 1404, the wireless communication device prepares a physical layer convergence protocol (PLCP) protocol data unit (PPDU) for UL transmission based at least in part on the first frequency bandwidth. At block 1406, the wireless communication device maps the set of contiguous tones of the allocated RU to a set of non-contiguous tones distributed across a second frequency bandwidth larger than the first frequency bandwidth. At block 1408, the wireless communication device transmits the PPDU using the second set of tones.

In some implementations, the PPDU is an UL TB PPDU that spans the second frequency bandwidth. In some instances, the PSD limit applicable to the transmission is based on the second frequency bandwidth, and the second frequency bandwidth is at least an order of magnitude larger than the first frequency bandwidth.

In some implementations, the tones of the set of non-contiguous tones are interleaved with tones of a number of other sets of non-contiguous tones, and the tones of each set of the number of other sets of non-contiguous tones are distributed across the second frequency bandwidth. In some instances, the tones of the set of non-contiguous tones occupy every $M^{th}$ tone of a tone plan associated with the second frequency bandwidth, where M=N+1, and N indicates the number of other sets of non-contiguous tones. In some other instances, the tones of the set of non-contiguous tones occupy every $M^{th}$ and $M+1^{th}$ tone of a tone plan associated with the second frequency bandwidth, where M=N+1, and N indicates the number of other sets of non-contiguous tones. Additionally, each set of the number of other sets of non-contiguous tones may be allocated to a different wireless communication device.

FIG. 15A shows a flowchart illustrating an example operation 1500 for wireless communication that supports transmitting one or more PPDUs using tone mapping. In some implementations, the operation 1500 may be performed by an apparatus of a wireless communication device operating as or within a STA, such as one of the STAs 104 of FIG. 1, the STA 704 of FIG. 7B, or the STA 1004 of FIG. 10A. In some other implementations, the operation 1500 may be performed by an apparatus of a wireless communication device operating as or within a network node. In some instances, the operation 1500 is an example of transmitting the PPDU in block 1408 of the operation 1400 described with reference to FIG. 14. For example, at block 1502, the wireless communication device transmits a first portion of the PPDU using a first group of 26 tones of the set of non-contiguous tones. At block 1504, the wireless communication device transmits a second portion of the PPDU using a remaining 14 tones of the set of non-contiguous tones, where the first and second portions of the PPDU are transmitted concurrently. At block 1506, the wireless communication device transmits one or more subsequent PPDUs using the set of non-contiguous tones by repeatedly cycling through the tones of the set of non-contiguous tones.

FIG. 15B shows a flowchart illustrating an example operation 1510 for wireless communication that supports transmitting one or more PPDUs using tone mapping. In some implementations, the operation 1510 may be performed by an apparatus of a wireless communication device operating as or within a STA, such as one of the STAs 104 of FIG. 1, the STA 704 of FIG. 7B, or the STA 1004 of FIG. 10A. In some other implementations, the operation 1510 may be performed by an apparatus of a wireless communication device operating as or within a network node. In some instances, the operation 1510 is an example of transmitting the PPDU in block 1408 of the operation 1400 described with reference to FIG. 14. For example, at block 1512, the wireless communication device transmits a first portion of the PPDU using a first group of 26 tones of the set of non-contiguous tones. At block 1514, the wireless communication device transmits a second portion of the PPDU using a second group of 26 tones of the set of non-contiguous tones. At block 1516, the wireless communication device transmits a third portion of the PPDU using a third group of 26 tones of the set of non-contiguous tones. At block 1518, the wireless communication device transmits a fourth portion of the PPDU using a remaining 2 tones of the set of non-contiguous tones, where the first, second, third, and fourth portions of the PPDU are transmitted concurrently. At block 1520, the wireless communication device transmits one or more subsequent PPDUs using the set of non-contiguous tones by repeatedly cycling through the tones of the set of non-contiguous tones.

Figure 16:
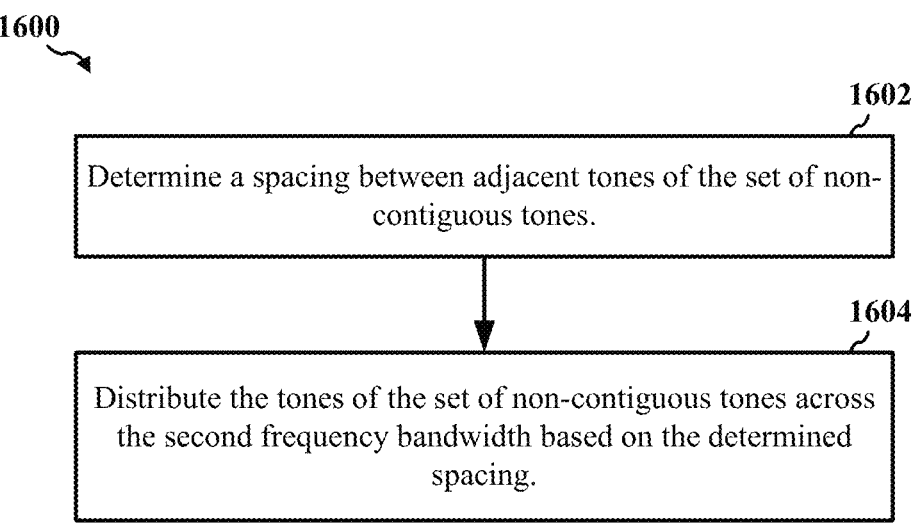
FIG. 16 shows a flowchart illustrating an example operation for wireless communication that supports transmitting one or more PPDUs using tone mapping.

FIG. 16 shows a flowchart illustrating an example operation 1600 for wireless communication that supports transmitting one or more PPDUs using tone mapping. In some implementations, the operation 1600 may be performed by an apparatus of a wireless communication device operating as or within a STA, such as one of the STAs 104 of FIG. 1, the STA 704 of FIG. 7B, or the STA 1004 of FIG. 10A. In some other implementations, the operation 1600 may be performed by an apparatus of a wireless communication device operating as or within a network node. In some instances, the operation 1600 is an example of mapping the set of contiguous tones of the allocated RU in block 1406 of the operation 1400 described with reference to FIG. 14. For example, at block 1602, the wireless communication device determines a spacing between adjacent tones of the set of non-contiguous tones. At block 1604, the wireless communication device distributes the tones of the set of non-contiguous tones across the second frequency bandwidth based on the determined spacing.

In some implementations, the set of contiguous tones of the allocated RU includes 26 tones spanning a 2 MHz frequency subband, includes 52 tones spanning a 4 MHz frequency subband, includes 106 tones spanning a 10 MHz frequency subband, or includes 242 tones spanning a 20 MHz frequency subband. Each tone of the set of non-contiguous tones may be transmitted on a unique 1 MHz frequency subband. In some instances, a spacing between pairs of adjacent tones of the set of non-contiguous tones may include a number M of tones unallocated to the wireless communication device, where M is an integer greater than one.

Figure 17:
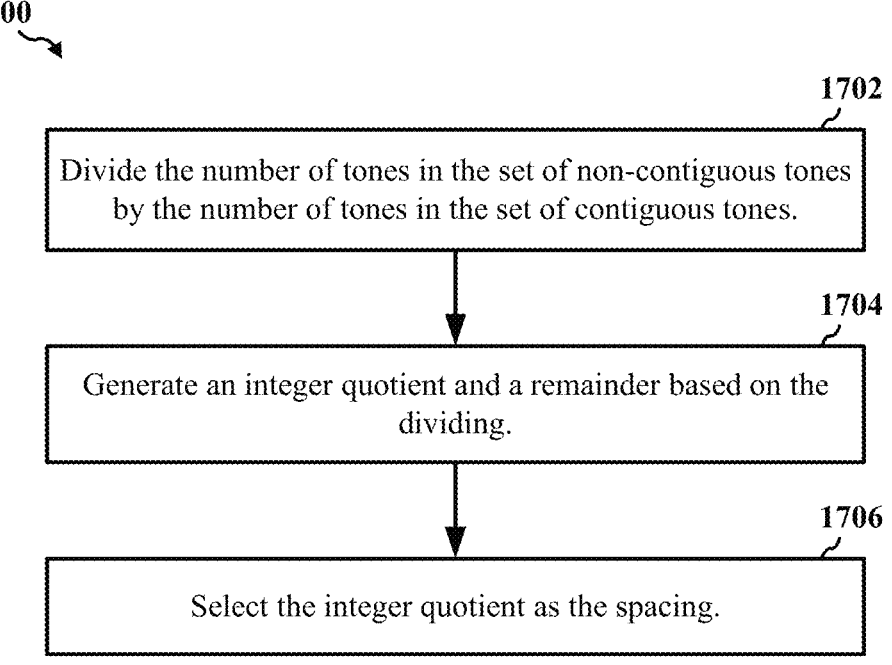
FIG. 17 shows a flowchart illustrating an example operation for wireless communication that supports transmitting one or more PPDUs using tone mapping.

FIG. 17 shows a flowchart illustrating an example operation 1700 for wireless communication that supports transmitting one or more PPDUs using tone mapping. In some implementations, the operation 1700 may be performed by an apparatus of a wireless communication device operating as or within a STA, such as one of the STAs 104 of FIG. 1, the STA 704 of FIG. 7B, or the STA 1004 of FIG. 10A. In some other implementations, the operation 1700 may be performed by an apparatus of a wireless communication device operating as or within a network node. In some instances, the operation 1700 is an example of determining the spacing in block 1602 of the operation 1600 described with reference to FIG. 16. For example, at block 1702, the wireless communication divides the number of tones in the set of non-contiguous tones by the number of tones in the set of contiguous tones. At block 1704, the wireless communication device generates an integer quotient and a remainder based on the dividing. At block 1706, the wireless communication device selects the integer quotient as the spacing.

Figure 18:
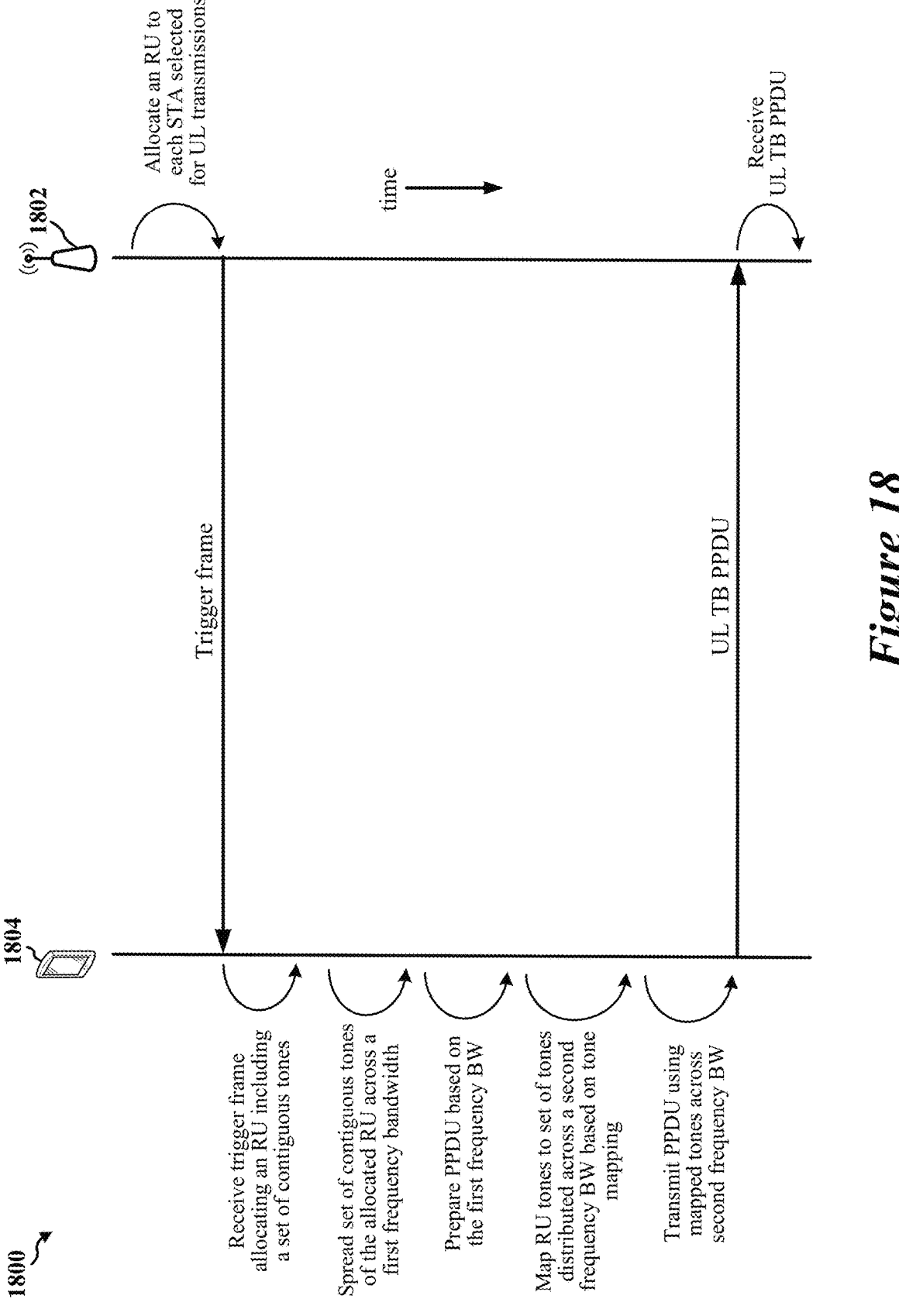
FIG. 18 shows a sequence diagram of an example communication that supports transmitting a PPDU using tone mapping.

FIG. 18 shows a sequence diagram of an example communication 1800 that supports transmitting one or more PPDUs using tone mapping. In some implementations, the communication 1800 may be performed between an AP 1802 and one or more STAs 1804 (only one STA is shown in FIG. 18 for simplicity). The AP 1802 may be an example of the AP 102 of FIG. 1 or the AP 702 of FIG. 7A, and the STA 1804 may be an example of the STA 104 of FIG. 1 or the STA 704 of FIG. 7B. In some other implementations, the communication 1800 may be performed by any suitable wireless communication devices.

The AP 1802 may allocate a RU to each STA of a number of STAs selected for UL transmission. In some implementations, the AP 1802 may transmit a trigger frame to solicit UL transmissions from the STAs. The trigger frame also may allocate an RU to the STA 1804 for UL transmissions. In some aspects, the RU allocated by the trigger frame may include a set of contiguous tones spanning an RU bandwidth. For example, an RU26 may include 26 tones (24 tones usable for UL transmissions and 2 tones usable as pilots) that span a 2 MHz frequency subband, an RU52 may include 52 tones (48 tones usable for UL transmissions and 4 tones usable as pilots) that span a 4 MHz frequency subband, an RU106 may include 106 tones (102 tones usable for UL transmissions and 4 tones usable as pilots) that span a 10 MHz frequency subband, and an RU242 may include 242 tones (234 tones usable for UL transmissions and 8 tones usable as pilots) that span a 20 MHz frequency subband.

The STA 1804 receives the trigger frame, and identifies the tones included in the allocated RU. The STA 1804 prepares a PPDU for transmission based on the first frequency bandwidth associated with the allocated RU, and maps the set of contiguous tones of the allocated RU to a set of non-contiguous tones distributed across a second frequency bandwidth larger than the first frequency bandwidth. The STA 1804 transmits the PPDU using the second set of tones that span the second frequency bandwidth. The AP 1802 receives the PPDU, which in some implementations may be transmitted as an UL TB PPDU.

The STA 1804 prepares a PPDU for transmission based on the first frequency bandwidth associated with the allocated RU, and maps the set of contiguous tones in the allocated RU to a set of non-contiguous tones distributed across a second frequency bandwidth based on a tone mapping scheme. In some implementations, the second frequency bandwidth may be larger than the first frequency bandwidth, and the first frequency bandwidth may be larger than the RU bandwidth. In some instances, the first frequency bandwidth is 20 MHz, and the second frequency bandwidth is one of 40 MHz, 80 MHz, 160 MHz, or 320 MHz. In some other instances, the second frequency bandwidth may be an order of magnitude (or more) larger than the RU bandwidth.

The STA 1804 transmits the PPDU using the second set of tones that span the second frequency bandwidth. The AP 1802 receives the PPDU, which in some implementations may be transmitted as an UL TB PPDU. The PPDU may be an uplink (UL) trigger-based (TB) PPDU that spans the second frequency bandwidth.

In some implementations, the STA 1804 may transmit a first portion of the PPDU using a first group of 26 tones of the set of non-contiguous tones, may transmit a second portion of the PPDU using a remaining 14 tones of the set of non-contiguous tones, where the first and second portions of the PPDU are transmitted concurrently. In some instances, the STA 1804 may transmit one or more subsequent PPDUs using the set of non-contiguous tones by repeatedly cycling through the tones of the set of non-contiguous tones. In some other implementations, the STA 1804 may transmit a first portion of the PPDU using a first group of 26 tones of the set of non-contiguous of tones, may transmit a second portion of the PPDU using a second group of 26 tones of the set of non-contiguous tones, may transmit a third portion of the PPDU using a third group of 26 tones of the set of non-contiguous tones, and may transmit a fourth portion of the PPDU using a remaining 2 tones of the set of non-contiguous tones, where the first, second, third, and fourth portions of the PPDU are transmitted concurrently, and are cyclic copies of each other. In some instances, the STA 1804 may transmit one or more subsequent PPDUs using the set of non-contiguous tones by repeatedly cycling through the tones of the set of non-contiguous tones.

In some other implementations, the set of contiguous tones of the allocated RU may include 26 tones spanning a 2 MHz frequency subband, and the set of non-contiguous tones may include 20 tones spanning a 20 MHz frequency subband. In some instances, the STA 1804 may map the set of contiguous tones to the set of non-contiguous tones by determining a spacing between adjacent tones of the set of non-contiguous tones, and distributing the tones of the set of non-contiguous tones across the second frequency bandwidth based on the determined spacing. The STA 1804 may determine the spacing by dividing the number of tones in the set of non-contiguous tones by the number of tones in the set of contiguous tones in the allocated RU, generating an integer quotient and a remainder based on the dividing, and selecting the integer quotient as the spacing.

The PSD limit applicable to the communication 1800 may be based on the second frequency bandwidth, and the second frequency bandwidth may be at least an order of magnitude larger than the first frequency bandwidth. In some implementations, the applicable PSD limit may be determined by multiplying the PSD limit applicable to transmissions over the first frequency bandwidth by a number N equal to the second frequency bandwidth divided by the first frequency bandwidth. In some implementations, the set of contiguous tones of the allocated RU includes 26 tones spanning a 2 MHz frequency subband, includes 52 tones spanning a 4 MHz frequency subband, includes 106 tones spanning a 10 MHz frequency subband, or includes 242 tones spanning a 20 MHz frequency subband, and each tone of the set of non-contiguous tones is transmitted on a unique 1 MHz frequency subband. In some instances, a spacing between pairs of adjacent tones of the set of non-contiguous tones includes a number M of tones unallocated to the wireless communication device, where M is an integer greater than one. The number M of unallocated tones may be used for UL transmissions from one or more other STAs, concurrently with transmission of the UL TB PPDU from the STA 1804.

In some implementations, the tones of the set of non-contiguous tones are interleaved with tones of one or more other sets of non-contiguous tones across an entirety of the second frequency bandwidth. In some instances, each set of the one or more other sets of non-contiguous tones is allocated to a different wireless communication device.

In some implementations, the tones of the set of non-contiguous tones occupy every $M^{th}$ tone index of a tone plan for the second frequency bandwidth, where M is an integer greater than one. In some other implementations, the tones of the set of contiguous tones are mapped in groups of N tones to corresponding distributed tones of a tone plan associated with the second frequency bandwidth, where N is an integer greater than one.

In some implementations, each tone of a first number of tones in the set of non-contiguous tones occupies a unique 1 MHz frequency subband. In some instances, each tone of a second number of tones in the set of non-contiguous tones shares the unique 1 MHz frequency subband occupied by a corresponding tone of the first number of tones.

Figure 19:
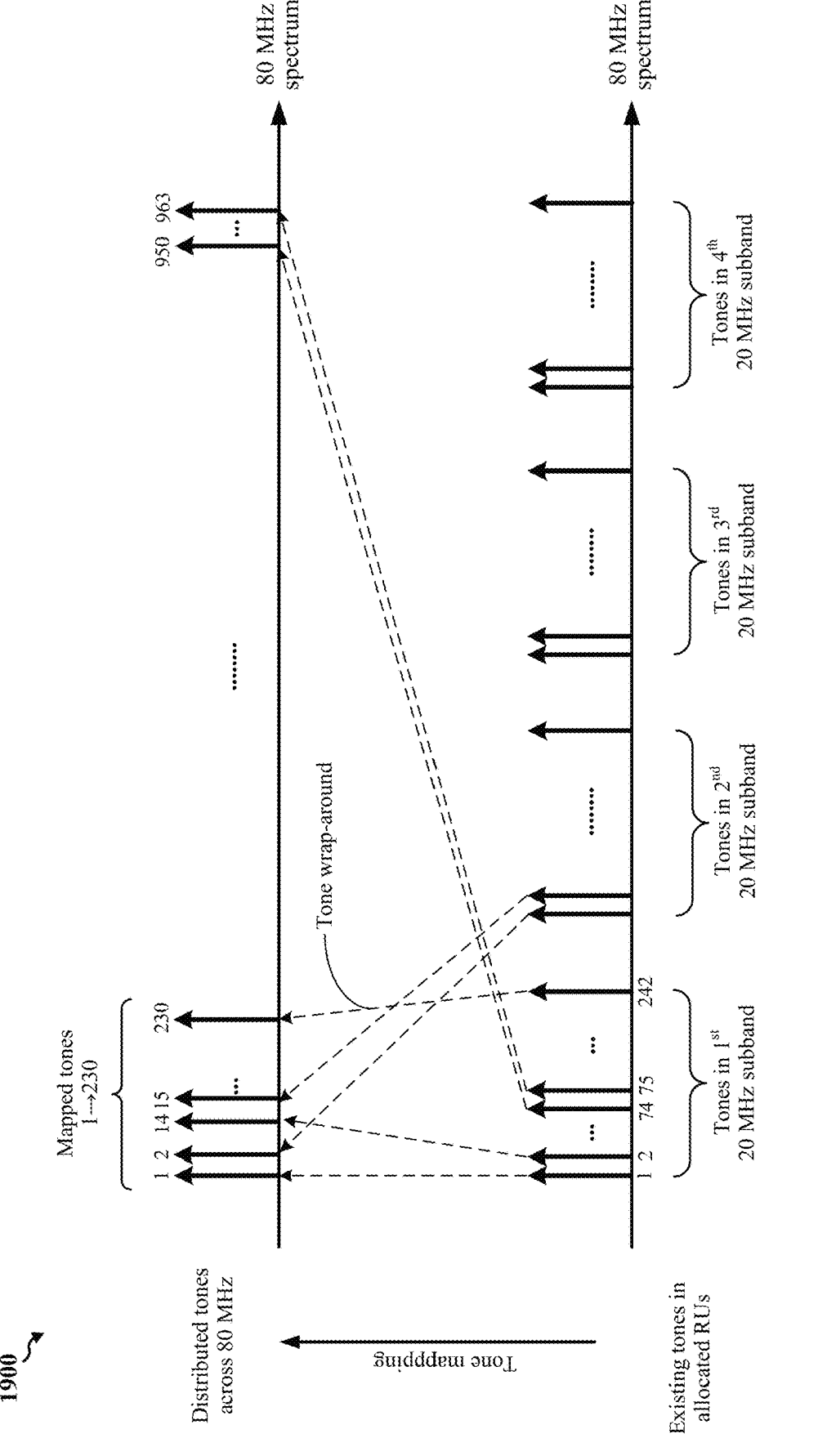
FIG. 19 shows an example mapping of tones.

FIG. 19 shows an example mapping 1900 of tones. As shown, the tones allocated to a user (or STA) by the trigger frame may be mapped to a second set of tones that are distributed across an 80 MHz frequency band. In some instances, the tones included in a respective RU of the allocated RUs (which may be referred to herein as the "existing tones") may be contiguous tones associated with one of the RU26, RU52, RU106, RU242, RU484, or RU996 resource units of a tone plan adopted by specified by one or more of the IEEE 802.11 family of wireless communication protocol standards (such as the IEEE 802.11ax standards). In some other instances, the tones included in a respective RU may be distributed across a 20 MHz frequency segment when the respective RU is one of the RU26, RU52, or RU106 resource units of the tone plan. For example, during a resource allocation stage, each user (or STA) may be allocated a single RU or multi-RU for UL transmissions. When a user is allocated an RU or multi-RU smaller than RU242 (which spans a 20 MHz frequency subband), the user may use the contiguous tones of the allocated RU to transmit UL data, or may spread the contiguous tones of the allocated RU across a 20 MHz frequency subband and transmit UL data using the spread tones.

In some implementations, the STA 1804 may determine a mapped tone index for each tone of the set of non-contiguous tones based on multiplying a tone index of a corresponding tone of the set of contiguous tones by a number M, where M is an integer greater than one. In the example of FIG. 19, M=13, for example, such that adjacent pairs of mapped tones in the second frequency bandwidth are separated by a spacing of 13 tones. In some implementations, the sets of non-contiguous tones mapped from allocated RUs or 20 MHz frequency segments may be distributed across other frequency bands such as, for example, a 20 MHz frequency band, a 40 MHz frequency band, a 160 MHz frequency band, or a 320 MHz frequency band. Also, implementations of the subject matter disclosed herein can be used with allocated RUs of other sizes such as, for example, RU52, RU106, RU242, RU484, or RU996.

FIG. 20 shows a flowchart illustrating an example operation 2000 for wireless communication that supports transmitting one or more PPDUs using tone mapping. In some implementations, the operation 2000 may be performed by an apparatus of a wireless communication device operating as or within a STA, such as one of the STAs 104 of FIG. 1, the STA 704 of FIG. 7B, the STA 804 of FIG. 8, or the STA 1804 of FIG. 18. In some other implementations, the operation 2000 may be performed by an apparatus of a wireless communication device operating as or within a network node.

At block 2002, the wireless communication device receives a trigger frame allocating a resource unit (RU) to the wireless communication device for uplink (UL) transmissions, the allocated RU including a set of contiguous tones spanning an RU bandwidth. At block 2004, the wireless communication device spreads the tones of the set of contiguous tones of the allocated RU across a first frequency bandwidth. At block 2006, the wireless communication device prepares a physical (PHY) layer convergence protocol (PLCP) protocol data unit (PPDU) for UL transmission based at least in part on the first frequency bandwidth. At block 2008, the wireless communication device maps the set of contiguous tones in the allocated RU to a set of non-contiguous tones distributed across a second frequency bandwidth based on a tone mapping scheme. At block 2010, the wireless communication device transmits the PPDU using the mapped set of non-contiguous tones distributed across the second frequency bandwidth.

In some implementations, the second frequency bandwidth may be larger than the first frequency bandwidth, and the first frequency bandwidth may be larger than the RU bandwidth. In some instances, the first frequency bandwidth is 20 MHZ, and the second frequency bandwidth is one of 40 MHZ, 80 MHZ, 160 MHZ, or 320 MHz. In some other instances, the second frequency bandwidth may be an order of magnitude (or more) larger than the RU bandwidth. In some other instances, the second frequency bandwidth may be one or more subbands of a PPDU bandwidth.

The PPDU may be an uplink (UL) trigger-based (TB) PPDU that spans at least the second frequency bandwidth. In some implementations, a power spectral density (PSD) limit applicable to the PPDU transmission may be based at least in part on the second frequency bandwidth. In some other implementations, a power spectral density (PSD) limit applicable to the PPDU transmission is based on a PSD limit corresponding to the first frequency bandwidth times a number N, where N is equal to the second frequency bandwidth divided by the first frequency bandwidth.

In some implementations, the tones of the set of non-contiguous tones are interleaved with tones of one or more other sets of non-contiguous tones across an entirety of the second frequency bandwidth. In some instances, each set of the one or more other sets of non-contiguous tones is allocated to a different wireless communication device.

In some implementations, the set of contiguous tones of the allocated RU includes one of 26 tones spanning a 2 MHz frequency subband, 52 tones spanning a 4 MHz frequency subband, 106 tones spanning a 10 MHz frequency subband, or 242 tones spanning a 20 MHz frequency subband. In some instances, the tones of the set of contiguous tones of the allocated RU are spread across a 20 MHz frequency band, irrespective of the number of tones in the allocated RU.

In some implementations, the tones of the set of non-contiguous tones occupy every $M^{th}$ tone index of a tone plan for the second frequency bandwidth, where M is an integer greater than one. In some other implementations, the tones of the set of contiguous tones are mapped in groups of N tones to corresponding distributed tones of a tone plan associated with the second frequency bandwidth, where N is an integer greater than one.

In some implementations, each tone of a first number of tones in the set of non-contiguous tones occupies a unique 1 MHz frequency subband. In some instances, each tone of a second number of tones in the set of non-contiguous tones shares the unique 1 MHz frequency subband occupied by a corresponding tone of the first number of tones.

FIG. 21A shows a flowchart illustrating an example operation 2100 for wireless communication that supports transmitting one or more PPDUs using tone mapping. In some implementations, the operation 2100 may be performed by an apparatus of a wireless communication device operating as or within a STA, such as one of the STAs 104 of FIG. 1, the STA 704 of FIG. 7B, the STA 804 of FIG. 8, or the STA 1804 of FIG. 18. In some other implementations, the operation 2100 may be performed by an apparatus of a wireless communication device operating as or within a network node. In some instances, the operation 2100 is an example of mapping the set of contiguous tones of the allocated RU to the set of non-contiguous tones in block 2008 of the operation 2000 described with reference to FIG. 20.

For example, at block 2102, the wireless communication device determines a mapped tone index for each tone of the set of non-contiguous tones based on multiplying a tone index of a corresponding tone of the set of contiguous tones by a number M, where M is an integer greater than one. In some other implementations, the mapped tone indices ($IDX_{mapped\_tone\_k,1}$) for a group of M tones in the second frequency bandwidth is $IDX_{mapped\_tone}=\text{mod}(13*(k-1)+1, N_{tone})$, where $IDX_{local\_tone}$ is the tone index of the corresponding tone of the set of contiguous tones, M is an integer greater than one, and $N_{tone}$ is the number of tones in the second frequency bandwidth. In some instances, M=13.

FIG. 21B shows a flowchart illustrating an example operation 2110 for wireless communication that supports transmitting one or more PPDUs using tone mapping. In some implementations, the operation 2110 may be performed by an apparatus of a wireless communication device operating as or within a STA, such as one of the STAs 104 of FIG. 1, the STA 704 of FIG. 7B, the STA 804 of FIG. 8, or the STA 1804 of FIG. 18. In some other implementations, the operation 2110 may be performed by an apparatus of a wireless communication device operating as or within a network node. In some instances, the operation 2110 is an example of mapping the set of contiguous tones in the allocated RU to a set of non-contiguous tones in block 2008 of the operation 2000 described with reference to FIG. 20.

For example, at block 2112, the wireless communication device maps each tone of a number N1 of tones of the allocated RU to a corresponding tone of a first set of N1 tones distributed across an entirety of the second frequency bandwidth, where N1 is an integer greater than one. At block 2114, the wireless communication device maps each tone of a remaining number N2 tones of the allocated RU to a corresponding tone of a second set of N2 tones distributed across a subband of the second frequency bandwidth, where N2 is an integer greater than one.

In some implementations, the first set of N1 tones occupy the first tone and every $P^{th}$ subsequent tone of the second frequency bandwidth, where P is an integer greater than one. Also, the second set of N2 tones may occupy the $I^{th}$ tone and every $P^{th}$ subsequent tone, for N2−1 subsequent tones, of the second frequency bandwidth, where I is an integer greater than one. In some instances, P=13 and I is less than P. In some implementations, the tones of the second set of N2 tones and the tones of the first set of N1 tones located in the subband of the second frequency bandwidth are interleaved relative to one another. In some other implementations, each tone of the first set of N1 tones located outside the subband of the second frequency bandwidth occupies a unique 1

MHz frequency subband. In some instances, each tone of the second set of N2 tones shares a unique 1 MHz frequency subband with a corresponding tone of the first set of N1 tones located in the subband of the second frequency bandwidth.

FIG. 21C shows a flowchart illustrating an example operation 2120 for wireless communication that supports transmitting one or more PPDUs using tone mapping. In some implementations, the operation 2120 may be performed by an apparatus of a wireless communication device operating as or within a STA, such as one of the STAs 104 of FIG. 1, the STA 704 of FIG. 7B, the STA 804 of FIG. 8, or the STA 1804 of FIG. 18. In some other implementations, the operation 2120 may be performed by an apparatus of a wireless communication device operating as or within a network node. In some instances, the operation 2120 is an example of mapping the set of contiguous tones in the allocated RU to a set of non-contiguous tones in block 2008 of the operation 2000 described with reference to FIG. 20.

For example, at block 2122, the wireless communication device maps cach tone of the first 75 tones of the allocated RU106 to a corresponding tone of a first set of 75 tones distributed across an entirety of the second frequency bandwidth. At block 2124, the wireless communication device maps each tone of a remaining 31 tones of the allocated RU106 to a corresponding tone of a second set of 31 tones distributed across a first portion of the second frequency bandwidth.

FIG. 21D shows a flowchart illustrating an example operation 2130 for wireless communication that supports transmitting one or more PPDUs using tone mapping. In some implementations, the operation 2130 may be performed by an apparatus of a wireless communication device operating as or within a STA, such as one of the STAs 104 of FIG. 1, the STA 704 of FIG. 7B, the STA 804 of FIG. 8, or the STA 1804 of FIG. 18. In some other implementations, the operation 2130 may be performed by an apparatus of a wireless communication device operating as or within a network node. In some instances, the operation 2130 may be one example of transmitting the PPDU in block 2010 of the operation of FIG. 10. For example, at block 2132, the wireless communication device transmits all tones of the first set of N1 tones and the second set of N2 tones at a same power level.

FIG. 21E shows a flowchart illustrating an example operation 2140 for wireless communication that supports transmitting one or more PPDUs using tone mapping. In some implementations, the operation 2140 may be performed by an apparatus of a wireless communication device operating as or within a STA, such as one of the STAs 104 of FIG. 1, the STA 704 of FIG. 7B, the STA 804 of FIG. 8, or the STA 1804 of FIG. 18. In some other implementations, the operation 2140 may be performed by an apparatus of a wireless communication device operating as or within a network node. In some instances, the operation 2140 is an example of transmitting the PPDU in block 2010 of the operation 2000 described with reference to FIG. 20.

For example, at block 2142, the wireless communication device transmits each tone of the first set of N1 tones located outside the subband of the second frequency bandwidth at a first power level. At block 2144, the wireless communication device transmits each tone of the second set of N2 tones and each tone of the first set of N1 tones located in the subband of the second frequency bandwidth at a second power level different than the first power level.

FIG. 21F shows a flowchart illustrating an example operation 2150 for wireless communication that supports transmitting one or more PPDUs using tone mapping. In some implementations, the operation 2150 may be performed by an apparatus of a wireless communication device operating as or within a STA, such as one of the STAs 104 of FIG. 1, the STA 704 of FIG. 7B, the STA 804 of FIG. 8, or the STA 1804 of FIG. 18. In some other implementations, the operation 2150 may be performed by an apparatus of a wireless communication device operating as or within a network node. In some instances, the operation 2150 an example of transmitting the PPDU in block 2010 of the operation 2000 described with reference to FIG. 20.

For example, at block 2152, the wireless communication device transmits one or more subsequent PPDUs using the mapped set of non-contiguous tones by repeatedly cycling through the tones of the mapped set of non-contiguous tones across the second frequency bandwidth.

FIG. 22 shows a flowchart illustrating an example operation 2200 for wireless communication that supports transmitting one or more PPDUs using tone mapping. In some implementations, the operation 2200 may be performed by an apparatus of a wireless communication device operating as or within a STA, such as one of the STAs 104 of FIG. 1, the STA 704 of FIG. 7B, the STA 804 of FIG. 8, or the STA 1804 of FIG. 18. In some other implementations, the operation 2200 may be performed by an apparatus of a wireless communication device operating as or within a network node.

At block 2202, the wireless communication device receives a trigger frame allocating a resource unit (RU) to the wireless communication device for uplink (UL) transmissions, the allocated RU including a set of contiguous tones spanning an RU bandwidth. At block 2204, the wireless communication device spreads the set of contiguous tones of the allocated RU across a first frequency bandwidth. At block 2206, the wireless communication device prepares a physical (PHY) layer convergence protocol (PLCP) protocol data unit (PPDU) for UL transmission based at least in part on the first frequency bandwidth. At block 2208, the wireless communication device maps the set of contiguous tones in the allocated RU to one or more first groups of non-contiguous tones distributed across a second frequency bandwidth based on a tone mapping scheme. At block 2210, the wireless communication device transmits the PPDU using the one or more first groups of non-contiguous mapped tones distributed across the second frequency bandwidth. In some instances, cach group of tones spans an 80 MHz frequency band.

In some implementations, the second frequency bandwidth also includes one or more second groups of non-contiguous tones distributed across the second frequency bandwidth and allocated for non-mapped tones of the allocated RU. Each of the first and second groups of non-contiguous tones of the second frequency bandwidth may occupy or span any suitable frequency subband. For example, in implementations for which the first groups of non-contiguous tones are 80 MHz wide and the second groups of non-contiguous tones are also 80 MHz wide, a first number of 80 MHz portions or "chunks" of non-contiguous tones in the second frequency bandwidth may be used for distributed transmissions. and a second number of 80 MHz portions or "chunks" of non-contiguous tones in the second frequency bandwidth may be used for localized transmissions. That is, while some 80 MHz portions of the second frequency bandwidth may be used for distributed transmissions that can increase applicable PSD limits, other portions of the second frequency bandwidth may be reserved for UL transmissions based on frequency resources associated with one or more RUs allocated by the trigger frame. In some instances, the second frequency bandwidth is larger than the first frequency bandwidth, and the first frequency bandwidth is larger than the RU bandwidth.

In some implementations, a power spectral density (PSD) limit applicable to the PPDU transmission is based at least in part on the second frequency bandwidth. In some other implementations, a power spectral density (PSD) limit applicable to the PPDU transmission is based on a PSD limit corresponding to the first frequency bandwidth times a number N, where N is equal to the second frequency bandwidth divided by the first frequency bandwidth.

FIG. 23 shows a flowchart illustrating an example operation 2300 for wireless communication that supports transmitting one or more PPDUs using tone mapping. In some implementations, the operation 2300 may be performed by an apparatus of a wireless communication device operating as or within a STA, such as one of the STAs 104 of FIG. 1, the STA 704 of FIG. 7B, the STA 804 of FIG. 8, or the STA 1804 of FIG. 18. In some other implementations, the operation 2300 may be performed by an apparatus of a wireless communication device operating as or within a network node.

At block 2302, the wireless communication device receives a trigger frame allocating a resource unit (RU) to the wireless communication device for uplink (UL) transmissions, the allocated RU including a set of contiguous tones spanning an RU bandwidth. At block 2304, the wireless communication device spreads the set of contiguous tones of the allocated RU across a first frequency bandwidth. At block 2306, the wireless communication device prepares a physical (PHY) layer convergence protocol (PLCP) protocol data unit (PPDU) for UL transmission based at least in part on the first frequency bandwidth. At block 2308, the wireless communication device maps the set of contiguous tones spread across the first frequency bandwidth to one or more sets of non-contiguous tones based on a tone mapping scheme, each set of the one or more sets of non-contiguous tones distributed across an 80 MHz frequency band. At block 2310, the wireless communication device maps each set of non-contiguous tones from a corresponding 80 MHz frequency band to one of a 160 MHz frequency band or a 320 MHz frequency band based on the tone mapping scheme. At block 2312, the wireless communication device transmits the PPDU using the mapped set of non-contiguous tones distributed across the second frequency bandwidth.

Figure 24:
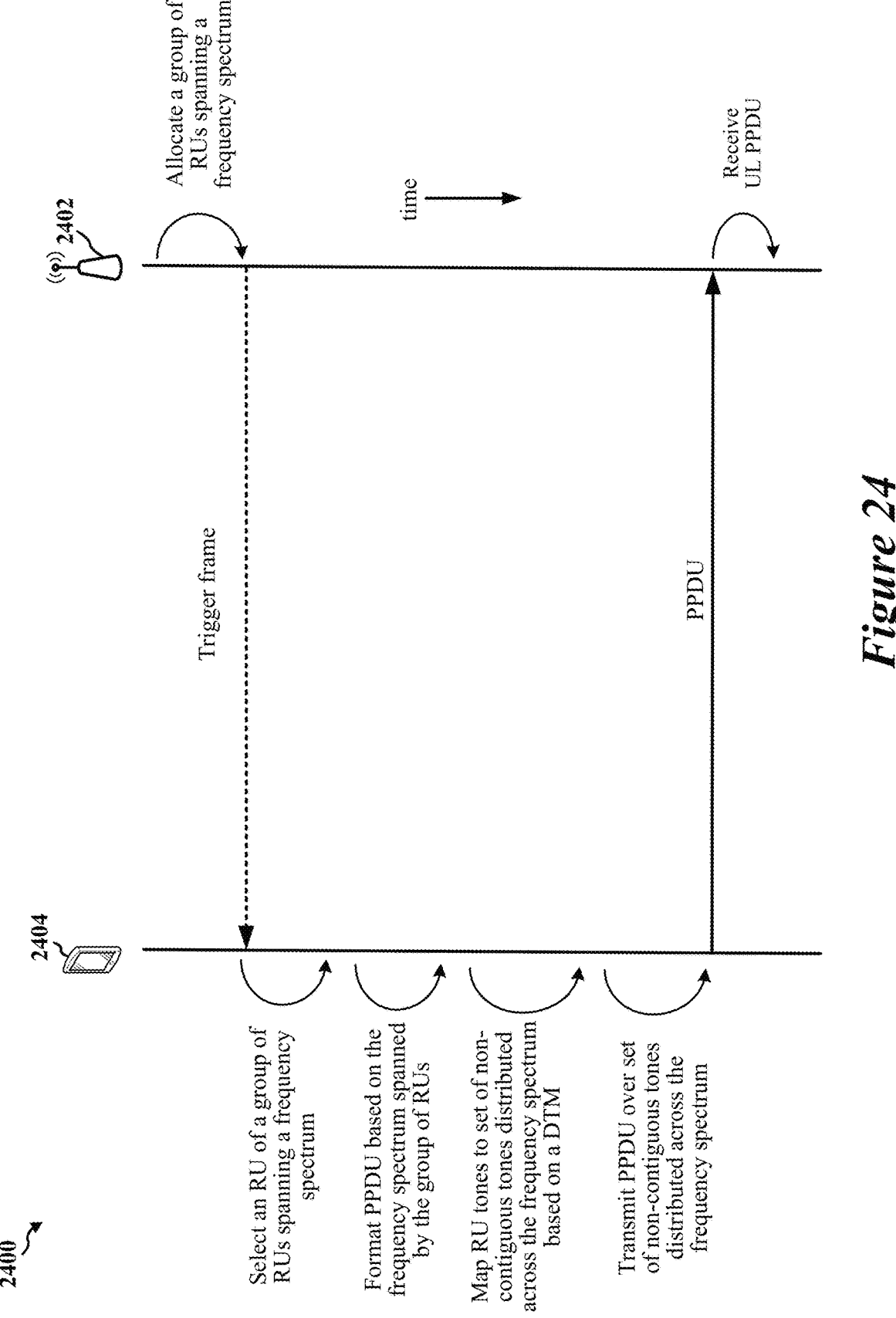
FIG. 24 shows a sequence diagram of an example communication that supports transmitting one or more PPDUs using tone mapping based on a tone mapping distance (DTM).

FIG. 24 shows a sequence diagram of an example communication 2400 that supports transmitting one or more PPDUs using tone mapping based on a DTM. In some implementations, the communication 2400 may be performed between an AP 2402 and one or more STAs 2404 (only one STA is shown in FIG. 24 for simplicity). The AP 2402 may be an example of the AP 102 of FIG. 1 or the AP 702 of FIG. 7A, and the STA 2404 may be an example of the STA 104 of FIG. 1 or the STA 704 of FIG. 7B. In some other implementations, the communication 2400 may be performed by any suitable wireless communication devices.

In some implementations, the STA 2404 may select, identify, or otherwise obtain an RU of a group of RUs spanning a frequency spectrum for UL or DL transmissions. In some other implementations, the AP 2402 may allocate the RU to the STA 2404 in a trigger frame. The selected RU includes a set of contiguous tones spanning a bandwidth of the selected RU. For example, an RU26 may include 26 tones (24 tones usable for UL transmissions and 2 tones usable as pilots) that span a 2 MHZ frequency subband, an RU52 may include 52 tones (48 tones usable for UL transmissions and 4 tones usable as pilots) that span a 4 MHz frequency subband, an RU106 may include 106 tones (102 tones usable for UL transmissions and 4 tones usable as pilots) that span a 10 MHz frequency subband, and an RU242 may include 242 tones (234 tones usable for UL transmissions and 8 tones usable as pilots) that span a 20 MHz frequency subband.

The STA 2404 formats or prepares a PPDU for transmission based on the frequency spectrum spanned by the group of RUs, and maps the set of contiguous tones of the selected RU to a first set of non-contiguous tones distributed across the frequency spectrum. In some instances, the set of contiguous tones of the selected RU may be mapped to the first set of non-contiguous tones based on a DTM applicable to each RU of the group of RUs. The STA 2404 transmits the PPDU over the first set of non-contiguous tones distributed across the frequency spectrum. The AP 2402 receives the PPDU. In some instances, the PPDU transmission may be an UL transmission, for example, solicited by a trigger frame. In some other instances, the PPDU transmission may be a DL transmission.

In some implementations, each tone of the first set of non-contiguous tones occupies a unique 1 MHz frequency subband. In some instances, mapping the set of contiguous tones of the selected RU includes mapping pilot tones of the selected RU to the first set of non-contiguous tones based on the DTM. The DTM can be configured for mapping the set of contiguous tones of each RU of the group of RUs to a corresponding set of non-contiguous tones distributed across the frequency spectrum. In some instances, the DTM indicates a distance or spacing between adjacent tones of each set of non-contiguous tones. In some other instances, the tones of the sets of non-contiguous tones may be interleaved with one another across an entirety of the frequency spectrum. In some instances, each tone of the sets of non-contiguous tones occupies a unique 1 MHz frequency subband. In some other instances, each set of non-contiguous tones may be allocated to a different wireless communication device. In some instances, the DTM may be 13. In some other instances, the DTM can be other suitable values.

In some implementations, a power spectral density (PSD) limit applicable to the PPDU transmission may be based on the frequency spectrum. In some other implementations, the frequency spectrum spans an 80 MHz frequency band, and the selected RU spans a frequency band less than or equal to approximately 10 MHz. In some instances, the set of contiguous tones includes one of 26 tones spanning a 2 MHZ frequency subband, 52 tones spanning a 4 MHz frequency subband, or 106 tones spanning a 10 MHz frequency subband. In some other instances, the tones of the set of contiguous tones of the selected RU are mapped in groups of N tones to the set of non-contiguous tones distributed across the frequency spectrum, where N is an integer greater than one.

In some implementations, the PPDU may be one of a high-efficiency (HE) format or an extremely high throughput (EHT) format. In some instances, the set of non-contiguous tones excludes tones associated with punctured frequency subbands. In some other instances, the group of RUs may include one or more of RU26, RU52, RU106, RU242, RU484, or RU996 resource units.

Figure 25:
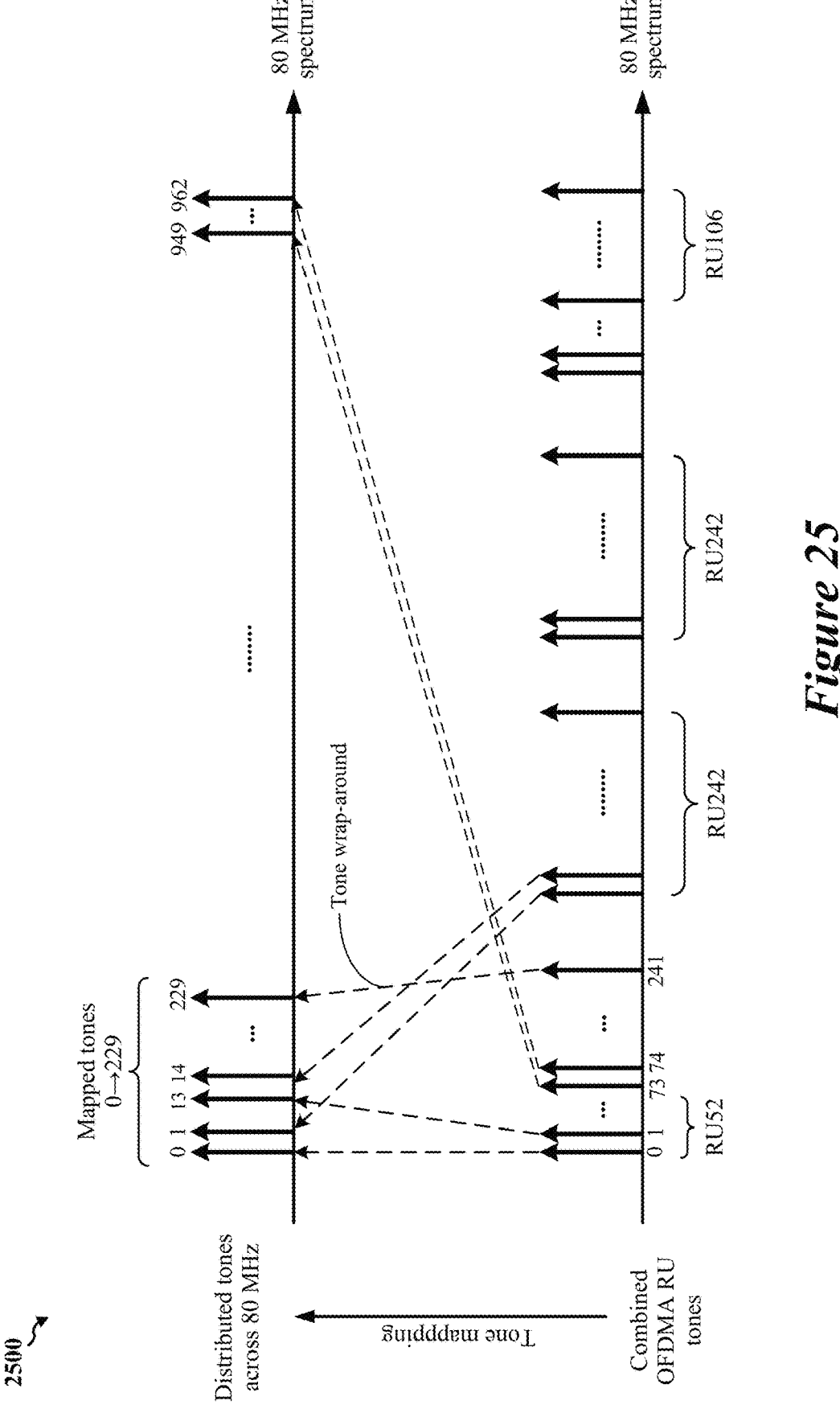
FIG. 25 shows an example mapping of tones.

FIG. 25 shows an example mapping 2500 of tones. As shown, the example mapping 2500 includes a group of RUs that collectively span a frequency spectrum. In the example of FIG. 25, the group of RUs includes a number of RU52s, two RU242s, and an RU106 that collectively span an 80 MHz frequency spectrum (indicated along the horizontal axis). In some instances, the tones included in a respective RU of the selected RUs (which may be referred to herein as the "existing tones") may be contiguous tones associated with one of the RU26, RU52, RU106, RU242, RU484, or RU996 resource units of a tone plan adopted by one or more of the IEEE 802.11 family of wireless communication protocol standards (such as the IEEE 802.11ax or the IEEE 802.11be standards). Each of one or more wireless communication devices may be allocated one or more of the RUs, and may map the contiguous tones of each of the respective RUs to a set of non-contiguous tones distributed across the frequency spectrum based on a DTM applicable to an entirety of the frequency spectrum. In the example of FIG. 25, the DTM=13, for example, such that the tones of the set of non-contiguous tones are spaced 13 tones apart.

FIG. 26 shows a flowchart illustrating an example operation 2600 for wireless communication. In some implementations, the operation 2600 may be performed by an apparatus of a wireless communication device operating as or within a STA, such as one of the STAs 104 of FIG. 1, the STA 704 of FIG. 7B, or the STA 1004 of FIG. 10A. In some other implementations, the operation 2600 may be performed by an apparatus of a wireless communication device operating as or within a network node. At block 2602, the wireless communication device selects, identifies, or otherwise obtains an RU of a group of RUs spanning a frequency spectrum, where the selected RU includes a set of contiguous tones spanning a bandwidth of the selected RU. At block 2604, the wireless communication device formats a PPDU for transmission based on the first frequency spectrum spanned by the group of RUs. At block 2606, the wireless communication device maps the set of contiguous tones of the selected RU to a first set of non-contiguous tones distributed across the first frequency spectrum based on a tone mapping distance (DTM) applicable to each RU of the group of RUs. At block 2608, the wireless communication transmits the PPDU over the first set of non-contiguous tones distributed across the first frequency spectrum.

In some implementations, each tone of the first set of non-contiguous tones occupies a unique 1 MHz frequency subband. In some implementations, mapping the set of contiguous tones of the selected RU includes mapping pilot tones of the selected RU to the first set of non-contiguous tones based on the DTM.

In some implementations, the DTM may be configured for mapping the set of contiguous tones of each RU of the group of RUs to a corresponding set of non-contiguous tones distributed across the first frequency spectrum. In some instances, the DTM indicates a distance or spacing between adjacent tones of each set of non-contiguous tones. In some other instances, the tones of the sets of non-contiguous tones may be interleaved with one another across an entirety of the first frequency spectrum. In some instances, each tone of the sets of non-contiguous tones occupies a unique 1 MHz frequency subband. In some other instances, each set of non-contiguous tones is allocated to a different wireless communication device.

In some implementations, a power spectral density (PSD) limit applicable to the PPDU transmission is based on the first frequency spectrum. In some other implementations, the first frequency spectrum spans an 80 MHz frequency band, and the selected RU spans a frequency band less than or equal to approximately 10 MHz. In some instances, the set of contiguous tones includes one of 26 tones spanning a 2 MHZ frequency subband, 52 tones spanning a 4 MHz frequency subband, or 106 tones spanning a 10 MHz frequency subband. In some other instances, the tones of the set of contiguous tones of the selected RU are mapped in groups of N tones to the set of non-contiguous tones distributed across the first frequency spectrum, where N is an integer greater than one.

In some implementations, the PPDU may be one of a high-efficiency (HE) format or an extremely high throughput (EHT) format. In some instances, the set of non-contiguous tones excludes tones associated with punctured frequency subbands. In some other instances, the group of RUs includes one or more of RU26, RU52, RU106, RU242, RU484, or RU996 resource units.

FIG. 27A shows a flowchart illustrating an example operation 2700 for wireless communication. In some implementations, the operation 2700 may be performed by an apparatus of a wireless communication device operating as or within a STA, such as one of the STAs 104 of FIG. 1, the STA 704 of FIG. 7B, or the STA 1004 of FIG. 10A. In some other implementations, the operation 2700 may be performed by an apparatus of a wireless communication device operating as or within a network node. In some instances, the example operation 2700 of FIG. 27A may be one implementation for mapping the set of contiguous tones in block 2604 of the operation 2600 of FIG. 26. At block 2702, the wireless communication device obtains or selects a mapped tone index for each tone of the set of non-contiguous tones from a multiplication of a respective tone of the selected RU and the DTM.

FIG. 27B shows a flowchart illustrating an example operation 2710 for wireless communication. In some implementations, the operation 2710 may be performed by an apparatus of a wireless communication device operating as or within a STA, such as one of the STAs 104 of FIG. 1, the STA 704 of FIG. 7B, or the STA 1004 of FIG. 10A. In some other implementations, the operation 2710 may be performed by an apparatus of a wireless communication device operating as or within a network node. In some instances, the operation 2710 may be performed before transmitting the PPDU in block 2608 of the operation 2600 described with reference to FIG. 26. At block 2712, prior to transmitting the PPDU, the wireless communication device distributes the set of non-contiguous tones across a second frequency spectrum that is wider than the first frequency spectrum.

In some implementations, the tones of the distributed set of non-contiguous tones may be interleaved with the tones of one or more other distributed sets of non-contiguous tones that span an entirety of the second frequency spectrum.

FIG. 28 shows a flowchart illustrating an example operation 2800 for wireless communication that supports transmitting a PPDU using tone mapping and PPDU duplicates. In some implementations, the operation 2800 may be performed by an apparatus of a wireless communication device operating as or within a STA, such as one of the STAs 104 of FIG. 1, the STA 704 of FIG. 7B, or the STA 1004 of FIG. 10A. In some other implementations, the operation 2800 may be performed by an apparatus of a wireless communication device operating as or within a network node.

At block 2802, the wireless communication device selects, identifies, or otherwise obtains an RU for transmission of PPDUs over a wireless medium. In some instances, the selected RU may be part of a group of RUs that collectively span a first frequency spectrum, where each RU in the group of RUs may include a set of contiguous tones spanning a bandwidth of the respective RU. At block 2804, the wireless communication device formats a physical (PHY) layer convergence protocol (PLCP) protocol data unit (PPDU) for transmission associated with the first frequency spectrum. At block 2806, the wireless communication device maps the set of contiguous tones of the selected RU to a set of non-contiguous tones distributed across the first frequency spectrum using a tone mapping distance (DTM) applicable to each RU of the group of RUs. At block 2808, the wireless communication device generates a plurality of PPDU duplicates based on duplication of the PPDU, where each PPDU duplicate is formatted for transmission across the first frequency spectrum. At block 2810, the wireless communication device transmits each PPDU duplicate of the plurality of PPDU duplicates on a corresponding frequency subband of a second frequency spectrum that is wider than the first frequency spectrum.

In some implementations, each PPDU duplicate of the plurality of PPDU duplicates is generated by duplicating an entirety of the PPDU except for any universal signal field (U-SIG). In some instances, the first frequency spectrum is 80 MHz wide, the second frequency spectrum is 160 MHz wide, duplicating the PPDU generates two PPDU duplicates, and the two PPDU duplicates are transmitted on different 80 MHZ frequency bands of a 160 MHz wireless channel.

In some implementations, the first frequency spectrum is 80 MHz wide, the second frequency spectrum is 320 MHz wide, duplicating the PPDU generates four PPDU duplicates, and the four PPDU duplicates are transmitted on different 80 MHZ frequency bands of a 320 MHz wireless channel. In some instances, a number N of the PPDU duplicates generated by duplicating the PPDU is based at least in part on a PSD limit applicable to the second frequency spectrum, where N is an integer greater than one. In some implementations, the PPDU is one of a high-efficiency (HE) format or an extremely high throughput (EHT) format. In some instances, the set of non-contiguous tones includes pilot tones and data tones corresponding to the PPDU.

In some implementations, the DTM may be configured for mapping the set of contiguous tones of each RU of the group of RUs to a corresponding set of non-contiguous tones distributed across the first frequency spectrum. In some instances, the DTM indicates a distance or spacing between adjacent tones of each set of non-contiguous tones. In some other instances, the tones of the sets of non-contiguous tones may be interleaved with one another across an entirety of the first frequency spectrum. In some instances, each tone of the mapped non-contiguous tones distributed across the first frequency spectrum occupies a unique 1 MHz frequency subband. In some other instances, each set of the sets of mapped non-contiguous tones may be allocated to a different wireless communication device. The DTM can be any suitable value. In some instances, the DTM may be 13.

In some implementations, a power spectral density (PSD) limit applicable to the PPDU transmission may be based on the second frequency spectrum. In some instances, the PPDU may be one of a high-efficiency (HE) format or an extremely high throughput (EHT) format. In some other instances, the set of non-contiguous tones excludes tones associated with punctured frequency subbands.

FIG. 29 shows a flowchart illustrating an example operation 2900 for wireless communication that supports transmission of one or more PPDUs using tone mapping based on a DTM. In some implementations, the operation 2900 may be performed by an apparatus of a wireless communication device operating as or within a STA, such as one of the STAs 104 of FIG. 1, the STA 704 of FIG. 7B, or the STA 1004 of FIG. 10A. In some other implementations, the operation 2900 may be performed by an apparatus of a wireless communication device operating as or within a network node.

At block 2902, the wireless communication device selects, identifies, or otherwise obtains a resource unit (RU) for transmitting a physical (PHY) layer convergence protocol (PLCP) protocol data unit (PPDU) over a wireless medium. The selected RU may be a portion of a tone plan for a frequency spectrum. In some instances, the selected RU may include a set of contiguous tones spanning a bandwidth of the selected RU. At block 2904, the wireless communication device maps the set of contiguous tones of the selected RU to a set of non-contiguous tones distributed across the frequency spectrum using a tone mapping distance (DTM). The DTM may be applicable to an entirety of the frequency spectrum. At block 2906, the wireless communication device transmits the PPDU over the set of non-contiguous tones distributed across the frequency spectrum. In some implementations, the PPDU may be a downlink (DL) orthogonal frequency division multiple access (OFDMA) transmission or a multi-user (MU) multiple-input multiple-output (MIMO) transmission. In some instances, the PPDU may be a single-user (SU) PPDU. In some other instances, PPDU may be a trigger-based (TB) PPDU, and the RU may be identified by a trigger frame received by the wireless communication device.

In some implementations, the frequency spectrum may be associated with the number of non-punctured tones in the tone plan. In some instances, mapping the set of contiguous tones of the selected RU includes mapping pilot tones of the selected RU to the set of non-contiguous tones based on the DTM.

In some implementations, the DTM may be configured for mapping contiguous tones of each RU in the tone plan to a corresponding set of non-contiguous and non-punctured tones distributed across the frequency spectrum. In some instances, the DTM may indicate a distance or spacing between adjacent tones of each set of non-contiguous and non-punctured tones. In some other instances, the tones of the sets of non-contiguous and non-punctured tones may be interleaved with one another across an entirety of the frequency spectrum. In some instances, each tone of the set of non-contiguous tones may occupy a unique 1 MHz frequency subband. In some aspects, the DTM may be 13.

In some implementations, a PSD limit applicable to the PPDU transmission may be based on, associated with, or indicated by the frequency spectrum spanned by the group of RUs corresponding to the tone plan. In some instances, the frequency spectrum spans an 80 MHz frequency band, and the selected RU spans a frequency band less than or equal to approximately 10 MHz. In some other instances, the tones of the set of contiguous tones may be mapped in groups of N tones to the set of non-contiguous tones distributed across the frequency spectrum, where N is an integer greater than one. In some implementations, the set of non-contiguous tones excludes tones associated with punctured frequency subbands. In some implementations, the group of RUs includes one or more of RU26, RU52, RU106, RU242, RU484, or RU996 resource units.

In some implementations, the mapping includes obtaining a mapped tone index for each tone of the set of non-contiguous tones based on or associated with multiplication of a logical tone index of a respective tone of the selected RU and the DTM.

FIG. 30 shows a flowchart illustrating an example operation 3000 for wireless communication that supports transmission of a PPDU using tone mapping based on a DTM and PPDU duplicates. In some implementations, the operation 3000 may be performed by an apparatus of a wireless communication device operating as or within a STA, such as one of the STAs 104 of FIG. 1, the STA 704 of FIG. 7B, or the STA 1004 of FIG. 10A. In some other implementations, the operation 3000 may be performed by an apparatus of a wireless communication device operating as or within a network node.

At block 3002, the wireless communication device selects, identifies, or otherwise obtains an RU of a group of RUs that collectively span a first frequency spectrum, where each RU of the group of RUs may include a set of contiguous tones spanning a bandwidth of the respective RU. At block 3004, the wireless communication device spreads the set of contiguous tones of the selected RU across a first frequency bandwidth that is wider than the bandwidth of the selected RU. At block 3006, the wireless communication device formats a SU PPDU for transmission based on the first frequency bandwidth. At block 3008, the wireless communication device maps the set of contiguous tones of the selected RU to a set of non-contiguous tones distributed across an entirety of the first frequency spectrum based on a DTM applicable to each RU of the group of RUs. At block 3010, the wireless communication device generates a plurality of SU PPDU duplicates based on duplication of the SU PPDU. At block 3012, the wireless communication device transmits each of the SU PPDU duplicates on a corresponding frequency subband of a second frequency spectrum that is wider than the first frequency spectrum.

In some implementations, mapping the set of contiguous tones of the selected RU includes mapping pilot tones of the selected RU to the set of non-contiguous tones using the DTM. In some implementations, the DTM is configured for mapping the set of contiguous tones of each RU of the group of RUs to a corresponding set of non-contiguous tones distributed across the second frequency spectrum. In some instances, the DTM indicates a distance or spacing between adjacent tones of each set of non-contiguous tones. In some other instances, the tones of the sets of non-contiguous tones may be interleaved with one another across an entirety of the second frequency spectrum. In some instances, each tone of the sets of non-contiguous tones occupies a unique 1 MHz frequency subband. In some other instances, the DTM may be 13.

In some implementations, a power spectral density (PSD) limit applicable to the PPDU transmission may be based on the third frequency spectrum. In some instances, the tones of the set of contiguous tones are mapped in groups of N tones to the set of non-contiguous tones distributed across the second frequency spectrum, where N is an integer greater than one. In some implementations, the first frequency spectrum is a 20 MHz channel, the second frequency spectrum is an 80 MHz channel, and the third frequency spectrum is a 160 MHz channel or a 320 MHz channel.

In some implementations, the set of non-contiguous tones excludes tones associated with punctured frequency subbands. In some instances, the group of RUs includes one or more of RU26, RU52, RU106, or RU242 resource units. The transmission may be an uplink (UL) transmission or a downlink (DL) transmission.

FIG. 31 shows a flowchart illustrating an example operation 3100 for wireless communication that supports transmission of one or more PPDUs using tone mapping based on parsing. In some implementations, the operation 3100 may be performed by an apparatus of a wireless communication device operating as or within a STA, such as one of the STAs 104 of FIG. 1, the STA 704 of FIG. 7B, or the STA 1004 of FIG. 10A. In some other implementations, the operation

3100 may be performed by an apparatus of a wireless communication device operating as or within a network node.

At block 3102, the wireless communication device selects, identifies, or otherwise obtains an RU of a group of RUs that collectively span a frequency spectrum. In some instances, the selected RU includes a plurality of contiguous tones spanning a bandwidth of the selected RU. At block 3104, the wireless communication device formats or prepares a PPDU for wireless transmission based on or associated with a first frequency bandwidth that is wider than the bandwidth of the selected RU. At block 3106, the wireless communication device parses the plurality of contiguous tones of the selected RU to one or more sets of non-contiguous tones based on or associated with a tone mapping number, where each set of non-contiguous tones spans a unique frequency segment of a second frequency bandwidth that is wider than the first frequency bandwidth. At block 3108, the wireless communication device schedules a transmission of the PPDU over the one or more sets of non-contiguous tones.

In some implementations, parsing the plurality of contiguous tones of the selected RU is performed by a proportional round robin (PRR) parser. In some instances, parsing the plurality of contiguous tones of the selected RU may be based on or associated with the number of non-punctured tones in each of the unique frequency segments of the second frequency bandwidth.

In some implementations, the wireless communication device spreads the tones of each set of non-contiguous tones across an entirety of the frequency spectrum. In some instances, the tone spreading may be based on a tone mapping distance (DTM) applicable to an entirety of the frequency spectrum. In some other instances, the DTM may indicate a distance or spacing between adjacent tones of each set of non-contiguous tones. In some instances, the DTM may be 13. In some implementations, a power spectral density (PSD) limit applicable to the PPDU transmission may be based on, associated with, or indicated by the frequency spectrum. In some instances, the PPDU transmission may be an UL transmission. In some other instances, the PPDU transmission may be a DL transmission.

Figure 32:
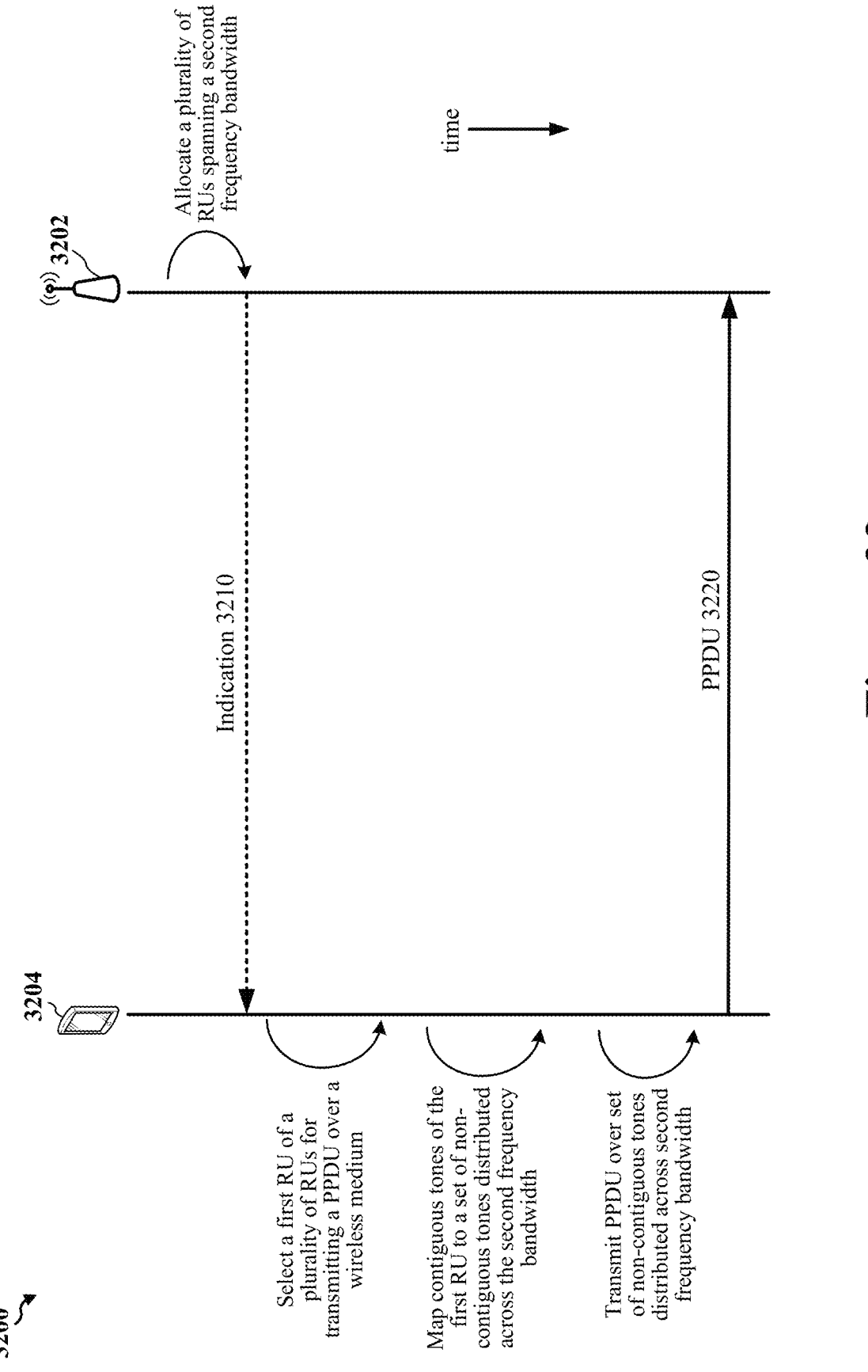
FIG. 32 shows a sequence diagram of an example communication that supports tone mapping based on a tone mapping vector and a tone mapping offset.

FIG. 32 shows an example sequence diagram 3200 of wireless communications that supports tone mapping based on a tone mapping vector and a tone mapping offset. In some implementations, the operations described with reference to the sequence diagram 3200 may be performed between an AP 3202 and one or more STAs 3204 (only one STA is shown in FIG. 32 for simplicity). The AP 3202 may be an example of the AP 102 of FIG. 1 or the AP 702 of FIG. 7A, and the STA 3204 may be an example of the STA 104 of FIG. 1 or the STA 704 of FIG. 7B. In some other implementations, the operations described with reference to the sequence diagram 3200 may be performed by other suitable wireless communication devices.

The example sequence diagram 3200 is described with reference to resource units (RUs) defined or specified by an orthogonal frequency division multiple access (OFDMA) tone plan for an 80 MHz bandwidth. In some implementations, one or more of the 80 MHz tone plans of the OFDMA tone map 520 of FIG. 5C may be used in the example sequence diagram 3200. As discussed, the tone map 520 includes six tone plans. The first tone plan 521 includes thirty-six 26-tone RUs (RU26s) spanning an 80 MHz bandwidth, the second tone plan 522 includes eighteen 52-tone RUs (RU52s) spanning the 80 MHz bandwidth, the third tone plan 523 includes eight 106-tone RUs (RU106s) spanning the 80 MHz bandwidth, the fourth tone plan 524 includes four 242-tone RUs (RU242s) spanning the 80 MHz bandwidth, the fifth tone plan 525 includes two 484-tone RUs (RU484s) spanning the 80 MHz bandwidth, and the sixth tone plan 526 includes one 996-tone RU (RU996) spanning the 80 MHz bandwidth.

Each RU26 includes 24 data subcarriers and 2 pilot subcarriers, and occupies a 2 MHz frequency band. Each RU52 includes 48 data subcarriers and 4 pilot subcarriers, and occupies a 4 MHz frequency band. Each RU106 includes 102 data subcarriers and 4 pilot subcarriers, and occupies an 8 MHz frequency band. Each RU242 includes 234 data subcarriers and 8 pilot subcarriers, and occupies a 20 MHZ frequency band. Each RU484 includes 468 data subcarriers and 16 pilot subcarriers, and occupies a 40 MHz frequency band. The RU996 includes 980 data subcarriers and 16 pilot subcarriers, and occupies an 80 MHz frequency band. Each RU of the plurality of RUs in a respective tone plan may be identified by a corresponding RU index, where the RU occupying the lowest frequencies is assigned the lowest RU index, and the RU occupying the highest frequencies is assigned the highest RU index.

In some implementations, the AP may allocate a plurality of RUs of a tone plan to one or more wireless communication devices (such as the STA 3204) for wireless transmissions. In some other implementations, the STA 3204 may select a first RU of the plurality of RUs for wireless transmissions. Each RU of the plurality of RUs includes a unique set of contiguous tones that occupies a first frequency bandwidth, and the plurality of RUs span a second frequency bandwidth that is greater than the first frequency bandwidth. In some implementations, the first frequency bandwidth may be the frequency band occupied by the contiguous tones of one or more RUs allocated to the STA 3204, and the second frequency bandwidth may be one of a 20 MHZ bandwidth, a 40 MHz bandwidth, or an 80 MHz bandwidth. For the example of FIG. 32, a group of nine RU26s spanning a 20 MHz bandwidth is allocated for wireless transmissions, and a first RU26 of the group of nine RU26s is allocated to the STA 3204.

The AP 3202 transmits an indication 3210 of the RU allocations for wireless transmissions. In some implementations, the indication 3210 may be a trigger frame that allocates one or more RUs to each of a number of STAs identified by the trigger frame. In some instances, the trigger frame may solicit UL transmissions from the one or more identified STAs. In some other implementations, the indication 3210 may allocate all RUs of a respective frequency bandwidth (such as an entirety of the second frequency bandwidth) to the STA 3204 for SU transmissions from the STA 3204. In some other implementations, the indication 3210 may allocate one or more punctured RUs to the STA 3204. In some instances, a signaling field of the one or more punctured RUs may indicate the puncturing.

The STA 3204 receives the indication 3210, and selects, identifies, or otherwise obtains the first RU based on information contained in the indication 3210. The STA 3204 may format or prepare one or more PPDUs 3220 for wireless transmission over the tones of the first RU based on the second frequency bandwidth.

The STA 3204 maps the set of contiguous tones of the first RU to a set of non-contiguous tones distributed across the second frequency bandwidth based on a tone mapping vector and a tone mapping offset associated with the first RU. In some instances, the STA 3204 may map both the data tones and the pilot tones of the first RU to the set of non-contiguous tones based on the tone mapping vector and the tone mapping offset.

In some implementations, an RU26, RU52, RU106, or RU242 may be selected as a base group from which the tone mapping offset is referenced. For the example of FIG. 32, the RU26 is selected as the base group. The tone mapping vector indicates a starting tone index, an ending tone index, and a tone spacing for the selected base group. In some instances, the tone mapping vector may be expressed as [Start:Spacing:End], where Start indicates the starting tone index when mapping the selected base group to a set of non-contiguous tones, Spacing indicates the tone spacing of the mapped set of non-contiguous tones, and End indicates the ending tone index when mapping the selected base group to the set of non-contiguous tones. As a non-limiting example, the tone mapping vector for an RU26 base group for a 20 MHZ bandwidth may be [0:9:225], the tone mapping vector for an RU26 base group for a 40 MHz bandwidth may be [0:18:450], the tone mapping vector for an RU26 base group for an 80 MHz bandwidth may be [0:36:900], the tone mapping vector for an RU26 base group for a 160 MHz bandwidth may be [0:72:1800], and the tone mapping vector for an RU26 base group for a 320 MHz bandwidth may be [0:144:3600]. In some instances, the RU26 tone mapping vectors for the 20 MHz, 40 MHZ, 80 MHZ, 160 MHz, and 320 MHz bandwidths may be expressed as a matrix $D_{T\_base}$:

$$
D_{T\_base} = \begin{cases}
[0:9:225], & 20 \text{ MHz} \\
[0:18:450], & 40 \text{ MHz} \\
[0:36:900], & 80 \text{ MHz} \\
[0:72:1800], & 160 \text{ MHz} \\
[0:144:3600], & 320 \text{ MHz}
\end{cases}
$$

The STA 3204 may use the tone mapping vector and the tone mapping offset for the 20 MHz bandwidth to map the contiguous tones of the first RU to a set of non-contiguous tones distributed across the 20 MHz bandwidth. Other wireless communication devices also may use the tone mapping vector and corresponding tone mapping offsets for the 20 MHz bandwidth to map the contiguous tones of one or more allocated RUs to one or more other sets of non-contiguous tones distributed across the 20 MHz bandwidth. Specifically, the STA 3204 may use the tone mapping vector and the tone mapping offset to identify the tone index of each tone in the set of non-contiguous tones distributed across the second frequency bandwidth. In some instances, the tone index of a respective tone in the set of non-contiguous tones may be expressed as $D_T = D_{T\_base} + D_{T\_offset}$.

The tone spacing indicates the spacing or distance between pairs of adjacent tones in the set of non-contiguous tones distributed across the second frequency bandwidth. That is, the tone spacing may indicate how many tones between each pair of adjacent tones in the set of non-contiguous tones are allocated to other wireless communication devices. In some instances, the tone spacing may be the same for each set of non-contiguous tones distributed across the second frequency bandwidth.

After the STA 3204 maps the first RU to the set of non-contiguous tones, the STA 3204 may transmit the one or more PPDUs over the tones of the set of non-contiguous tones distributed across the second frequency bandwidth. In this way, the PSD limit applicable to the transmission of the one or more PPDUs may be based on the second frequency bandwidth, rather than the first frequency bandwidth, which may allow the STA 3204 to transmit the one or more PPDUs using higher transmit power levels.

The AP 3202 receives the one or more PPDUs 3220 over the set of non-contiguous tones distributed across the second frequency bandwidth. In some instances, the PPDU 3220 may be an HE TB PPDU or an EHT TB PPDU. In some other instances, the PPDU 3220 may be a DL PPDU received by the STA 3204 or other suitable wireless communication device. Additionally, the one or more PPDUs 3220 may be SU PPDUs or MU PPDUs.

In some implementations, the tone mapping offsets may be based on bit-reversed orderings of the binary representations of the logical RU indices of a group of RUs to be mapped to one or more sets of non-contiguous tones distributed across the second frequency bandwidth. The bit-reversed orderings may be used to evenly distribute the tones mapped from the group of RUs across the second frequency bandwidth.

FIG. 33 shows an example table 3300 of tone mapping offsets. The table 3300 may be used for mapping the contiguous tones of eight RU26s, four RU52s, two RU106s, or one RU242 to one or more sets of non-contiguous tones distributed across a 20 MHz bandwidth using RU26 as the selected base group. As shown, the 3-bits of the binary representations (i.e., Binary index) of the logical RU indices of eight RU26s are reversed to generate corresponding bit-reversed binary RU indices (i.e., Bit-reversed binary index). The decimal representations of the bit-reversed binary RU indices may indicate interleaved RU indices for the eight RU26s (i.e., Interleaved RU Index). The interleaved RU indices may indicate an order in which the tone mapping offsets of the eight RU26s are sequentially mapped to tones in the offset range in the second frequency bandwidth.

The tone mapping offsets may indicate the tone index of the first mapped tone in each set of non-contiguous tones distributed across the second frequency bandwidth. As discussed, when the 242 tones in each 20 MHz tone map 520 are grouped into nine RU26s, there are 8 leftover tones. In some implementations, the first four tones 1→4 and the last four tones 239→242 in a respective 20 MHz frequency bandwidth may be reserved for mapping the 8 leftover tones of the respective 20 MHZ bandwidth. As such, the set of nine tone mapping offsets applicable to the nine RU26s within the respective 20 MHz bandwidth may begin with an offset=5, rather than an offset=1, so that the tones of the nine RU26s are not mapped to the first four tones (or the last four tones) distributed across the 20 MHz bandwidth. In some instances, the set of nine tone mapping offsets (i.e., the offset range) may include values 5→13.

Although cach 20 MHz tone plan can support nine RU26s, only eight of the RU26s are used to construct larger RUs. That is, eight RU26s may be used to form four RU52s, two RU106s, or one RU242. As shown in FIG. 5C, RU5, RU14, RU23, and RU32 are the middle RU26s in their respective 20 MHz segments of the 80 MHz tone plans, and are not used in the RU52 or RU106 tone plans. As such, in some implementations, the middle RU26 (or the fifth RU26) in the first 20 MHz may be assigned to a tone mapping offset=9, which represents the middle value of the set of tone mapping offsets 5→13. In some instances, the fifth RU26 and the corresponding offset value=9 may be excluded from the table 3300.

For example, the binary representation of the logical RU index 0=000, and the corresponding bit-reversed binary RU index=000, which gives an interleaved RU index=0. As such, the RU26 having a logical RU index=0 may be the first RU26 mapped to a corresponding set of non-contiguous tones, and the first tone of the RU26 having a logical RU index=0 may be mapped to the $5^{th}$ tone distributed across the second frequency bandwidth. For another example, the binary representation of the logical RU index 1=001, and the corresponding bit-reversed binary RU index=100, which gives an interleaved RU index=4. As such, the RU26 having a logical RU index=4 may be the fifth RU26 mapped to a corresponding set of non-contiguous tones, and the first tone of the RU26 having a logical RU index=4 may be mapped to the $6^{th}$ tone distributed across the second frequency bandwidth. For another example, the binary representation of the logical RU index 2=010, and the corresponding bit-reversed binary RU index=010, which gives an interleaved RU index=2. As such, the RU26 having a logical RU index=2 may be the third RU26 mapped to a corresponding set of non-contiguous tones, and the first tone of the RU26 having a logical RU index=2 may be mapped to the $7^{th}$ tone distributed across the second frequency bandwidth.

FIG. 34 shows another example table 3400 of tone mapping offsets. The table 3400 may be used for mapping the contiguous tones of sixteen RU26s, eight RU52s, four RU106s, two RU242s, or one RU484 to one or more sets of non-contiguous tones distributed across a 40 MHz bandwidth using RU26 as the selected base group. As shown, the 4-bits of the binary representations (i.e., Binary index) of the logical RU indices of sixteen RU26s are reversed to generate corresponding bit-reversed binary RU indices (i.e., Bit-reversed binary index). The decimal representations of the bit-reversed binary RU indices may indicate interleaved RU indices for the sixteen RU26s (i.e., Interleaved RU Index). The interleaved RU indices may indicate an order in which the tone mapping offsets of the sixteen RU26s are sequentially mapped to tones in the offset range in the second frequency bandwidth. The tone mapping offsets may indicate the tone index of the first mapped tone in each set of non-contiguous tones distributed across the second frequency bandwidth.

For example, the binary representation of the logical RU index 0=0000, and the corresponding bit-reversed binary RU index=0000, which gives an interleaved RU index=0. As such, the RU26 having a logical RU index=0 may be the first RU26 mapped to a corresponding set of non-contiguous tones, and the first tone of the RU26 having a logical RU index=0 may be mapped to the $9^{th}$ tone distributed across the second frequency bandwidth. For another example, the binary representation of the logical RU index 1=0001, and the corresponding bit-reversed binary RU index=1000, which gives an interleaved RU index=8. As such, the RU26 having a logical RU index=8 may be the ninth RU26 mapped to a corresponding set of non-contiguous tones, and the first tone of the RU26 having a logical RU index=8 may be mapped to the $10^{th}$ tone distributed across the second frequency bandwidth. For another example, the binary representation of the logical RU index 2=0010, and the corresponding bit-reversed binary RU index=0100, which gives an interleaved RU index=4. As such, the RU26 having a logical RU index=4 may be the fifth RU26 mapped to a corresponding set of non-contiguous tones, and the first tone of the RU26 having a logical RU index=4 may be mapped to the $11^{th}$ tone distributed across the second frequency bandwidth.

In some other implementations, one or more other tables of tone mapping offsets may be used for mapping the contiguous tones of greater numbers of RU26s to one or more sets of non-contiguous tones distributed across the second frequency bandwidth using an RU26 as the selected base group. For example, tables of tone mapping offsets may be determined and used for mapping sixteen RU52s or eight RU106s based on thirty-two RU26s, and tables of tone mapping offsets may be determined and used when RUs other than the RU26 are selected as the base group.

Figure 35:
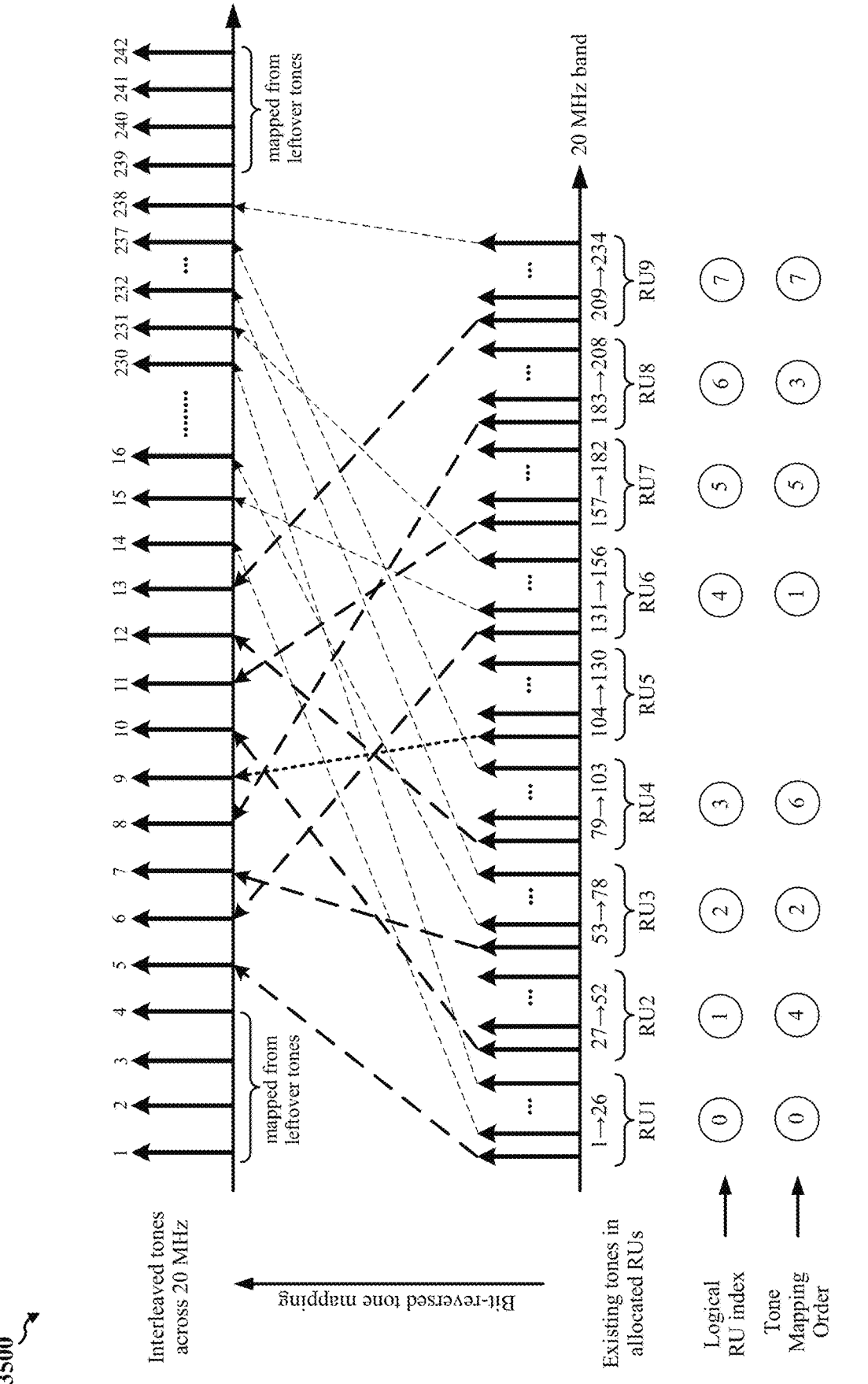
FIG. 35 shows an example tone mapping.

FIG. 35 shows an example tone mapping 3500. The example tone mapping 3500 depicts one implementation of mapping the contiguous tones of a plurality of RU26s that span a 20 MHz bandwidth to corresponding sets of non-contiguous tones distributed across the 20 MHz bandwidth. Specifically, the plurality of RU26s includes nine RU26s having respective indices $RU_1$-$RU_9$, with each RU26 including 26 tones and spanning a 2 MHz bandwidth. For example, $RU_1$ includes tones 1→26, $RU_2$ includes tones 27→52, $RU_3$ includes tones 53→78, and so on, where $RU_9$ includes tones 209→234. The nine RU26s occupy 234 tones, thereby leaving 242−234=8 leftover tones in the 20 MHz bandwidth.

In some implementations, the first four RU26s having indices $RU_1$-$RU_4$ are assigned logical RU indices 0→3, respectively, and the last four RU26s having indices $RU_6$-$RU_9$ are assigned logical RU indices 4→7, respectively. The middle RU26 having index $RU_5$ is not used to form larger RUs (such as RU52s, RU106s, RU242s, or RU484s), and not assigned a logical RU index. The binary representations of the logical RU indices 0→7 may be bit-reversed and converted to decimal numbers to generate interleaved RU indices for the eight RU26s having indices $RU_1$-$RU_4$ and $RU_6$-$RU_9$, as described with reference to FIG. 33.

In some implementations, the 20 MHz tone mapping vector [0:9:225] described above may be used with a set of tone mapping offsets to identify the locations of tones distributed across the 20 MHz bandwidth that are to be mapped from the sets of contiguous tones corresponding to $RU_1$-$RU_4$ and $RU_6$-$RU_9$. In some instances, the set of tone mapping offsets 5→8 and 10→13 described above with reference to FIG. 33 may be applied to the 20 MHz tone mapping vector [0:9:225] to identify the locations of the mapped tones, and the interleaved RU indices 0, 4, 2, 6, 1, 5, 3, and 7 corresponding to $RU_1$-$RU_4$ and $RU_6$-$RU_9$, respectively, may be used to determine the order in which the tone mapping offsets of $RU_1$-$RU_4$ and $RU_6$-$RU_9$ are sequentially mapped to the identified offset range in the 20 MHz bandwidth.

As shown, $RU_1$ has the lowest interleaved RU index=0, and has a tone mapping offset=5. Thus, the first tone of $RU_1$ is mapped to tone 5 in a first set of non-contiguous tones distributed across the 20 MHz bandwidth. $RU_6$ has the next lowest interleaved RU index=1, and has a tone mapping offset=6. Thus, the first tone of $RU_6$ is mapped to tone 6 in a second set of non-contiguous tones distributed across the 20 MHz bandwidth. $RU_3$ has the next lowest interleaved RU index=2, and has a tone mapping offset=7. Thus, the first tone of $RU_3$ is mapped to tone 7 in a third set of non-contiguous tones distributed across the 20 MHz bandwidth. RUs has the next lowest interleaved RU index=3, and has a tone mapping offset=8. Thus, the first tone of $RU_8$ is mapped to tone 8 in a fourth set of non-contiguous tones distributed across the 20 MHz bandwidth. $RU_2$ has the next lowest interleaved RU index=4, and has a tone mapping offset=10. Thus, the first tone of $RU_2$ is mapped to tone 10 in a fifth set of non-contiguous tones distributed across the 20 MHz bandwidth. $RU_7$ has the next lowest interleaved RU index=5, and has a tone mapping offset=11. Thus, the first tone of $RU_7$ is mapped to tone 11 in a sixth set of non-contiguous tones distributed across the 20 MHz bandwidth.

$RU_4$ has the next lowest interleaved RU index=6, and has a tone mapping offset=12. Thus, the first tone of $RU_4$ is mapped to tone 12 in a seventh set of non-contiguous tones distributed across the 20 MHz bandwidth. $RU_9$ has the next lowest interleaved RU index=7, and has a tone mapping offset=13. Thus, the first tone of $RU_9$ is mapped to tone 13 in an eighth set of non-contiguous tones distributed across the 20 MHz bandwidth. In this way, after the first tone of $RU_1$ is mapped, the first tone in each subsequent RU26 may be mapped to a selected middle tone of the tone offsets available for mapping. In some instances, selection of the middle tone may be based on which of the available tone offsets is located at or near the middle or end of a group of available tone offsets.

The second tones of $RU_1$-$RU_4$ and $RU_6$-$RU_9$ are sequentially mapped to the next tone locations distributed across the 20 MHz bandwidth based on the tone spacing=9 and the order indicated by the interleaved RU indices. For example, the second tone of $RU_1$ is mapped to tone 14 in the first set of non-contiguous tones. The second tone of $RU_6$ is mapped to tone 15 in the second set of non-contiguous tones. The second tone of $RU_3$ is mapped to tone 16 in the third set of non-contiguous tones. The second tone of $RU_8$ is mapped to tone 17 in the fourth set of non-contiguous tones. The second tone of $RU_2$ is mapped to tone 19 in the fifth set of non-contiguous tones. The second tone of $RU_7$ is mapped to tone 20 in the sixth set of non-contiguous tones. The second tone of $RU_4$ is mapped to tone 21 in the seventh set of non-contiguous tones. The second tone of $RU_9$ is mapped to tone 22 in the eighth set of non-contiguous tones distributed across the 20 MHz bandwidth.

In some implementations, the leftover tones may be mapped to tones distributed across the 20 MHz bandwidth separately from the tones of the RU26s. In some instances, the leftover tones may be mapped to tones 1, 2, 3, 4, 239, 240, 241, and 242 of the tones distributed across the 20 MHz bandwidth.

In some other implementations, the plurality of RUs may include eight RU52s or four RU106s based on sixteen RU26s of an OFDMA tone plan, and the sixteen RU26s identified by RU indices 0, 8, 4, 12, 2, 10, 6, 14, 1, 9, 5, 13, 3, 11, 7, and 15 may include tone mapping offsets between 9-16 and 18-25, respectively. In some instances, the tone mapping offsets for the middle 26-tone RUs of the OFDMA tone plan may be 17 and 26.

In some other implementations, the plurality of RUs may include eight RU52s or four RU106s based on sixteen RU26s of an OFDMA tone plan, and the sixteen RU26s identified by RU indices 0, 8, 4, 12, 2, 10, 6, 14, 1, 9, 5, 13, 3, 11, 7, and 15 may include tone mapping offsets between 9-16 and 18-25, respectively. In some instances, the tone mapping offsets for the middle 26-tone RUs of the OFDMA tone plan may be 17 and 26. In the alternative, the sixteen RU26s identified by RU indices of 0, 8, 4, 12, 2, 10, 6, 14, 1, 9, 5, 13, 3, 11, 7, and 15 may include tone mapping offsets between 9-12, 14-21, and 23-26, respectively. In some instances, the tone mapping offsets for the two middle 26-tone RUs of the OFDMA tone plan may be 13 and 22.

In some other implementations, the plurality of RUs may include sixteen RU52s or eight RU106s based on thirty-two RU26s of an OFDMA tone plan, and the thirty-two RU26s identified by RU indices of 0, 16, 8, 24, 4, 20, 12, 28, 2, 18, 10, 26, 6, 22, 14, 30, 1, 17, 9, 25, 5, 21, 13, 29, 3, 19, 11, 27, 7, 23, 15, 31 may include tone mapping offsets between 31-38, 40-47, 49-56, and 58-65, respectively. In some instances, the tone mapping offsets for the four middle 26-tone RUs of the OFDMA tone plan may be 39, 48, 57, and 66.

In some other implementations, the plurality of RUs may include sixteen RU52s or eight RU106s based on thirty-two RU26s of an OFDMA tone plan, and the thirty-two RU26s identified by RU indices of 0, 16, 8, 24, 4, 20, 12, 28, 2, 18, 10, 26, 6, 22, 14, 30, 1, 17, 9, 25, 5, 21, 13, 29, 3, 19, 11, 27, 7, 23, 15, 31 may include tone mapping offsets between 31-34, 36-43, 45-52, 54-61, and 63-66, respectively. In some instances, the tone mapping offsets for the four middle 26-tone RUs of the OFDMA tone plan may be 35, 44, 53, and 62.

In some other implementations, the plurality of RUs includes sixteen RU52s or eight RU106s based on thirty-two RU26s of an orthogonal frequency division multiple access (OFDMA) tone plan, and the thirty-two RU26s identified by RU indices of 0, 16, 8, 24, 4, 20, 12, 28, 2, 18, 10, 26, 6, 22, 14, 30, 1, 17, 9, 25, 5, 21, 13, 29, 3, 19, 11, 27, 7, 23, 15, 31 may include tone mapping offsets between 31-34, 36-43, 45-52, 54-61, and 63-66, respectively. In some instances, tone mapping offsets for the four middle 26-tone RUs of the OFDMA tone plan may be 35, 44, 53, and 62.

In some implementations, when the RU26 is selected as the base group and the first RU is an RU52, the tones of the RU52 are distributed across the second frequency bandwidth based on the distribution of two RU26s across the second frequency bandwidth, where $RU52_1=RU26_1+RU26_2$ and $RU52_2=RU26_3+RU26_4$. That is, when mapping the set of contiguous tones of the RU52 to a set of non-contiguous tones distributed across the second frequency bandwidth, a first group of the tones of the RU52 are mapped to the set of non-contiguous tones distributed across the second frequency bandwidth based on the tone mapping vector and the tone mapping offset associated with a first RU26, and a second group of the tones of the RU52 are mapped to the set of non-contiguous tones distributed across the second frequency bandwidth based on the tone mapping vector and the tone mapping offset associated with a second RU26.

In some other implementations, when the RU26 is selected as the base group and the first RU is an RU106, the tones of the RU106 are distributed across the second frequency bandwidth based on the distribution of four RU26s across the second frequency bandwidth, where $RU106_1=RU26_1+RU26_2+RU26_3+RU26_4+2$ leftover tones. That is, when mapping the set of contiguous tones of the RU106 to a set of non-contiguous tones distributed across the second frequency bandwidth, a first group of the tones of the RU106 are mapped to the set of non-contiguous tones distributed across the second frequency bandwidth based on the tone mapping vector and the tone mapping offset associated with a first RU26, a second group of the tones of the RU106 are mapped to the set of non-contiguous tones distributed across the second frequency bandwidth based on the tone mapping vector and the tone mapping offset associated with a second RU26, a third group of the tones of the RU106 are mapped to the set of non-contiguous tones distributed across the second frequency bandwidth based on the tone mapping vector and the tone mapping offset associated with a third RU26, and a fourth group of the tones of the RU106 are mapped to the set of non-contiguous tones distributed across the second frequency bandwidth based on the tone mapping vector and the tone mapping offset associated with a fourth RU26.

FIG. 36 shows a flowchart illustrating an example operation 3600 for wireless communication that supports transmission of one or more PPDUs using tone mapping based on a tone mapping vector and a tone mapping offset. In some implementations, the operation 3600 may be performed by an apparatus of a wireless communication device operating as or within a STA, such as one of the STAs 104 of FIG. 1, the STA 704 of FIG. 7B, or the STA 3204 of FIG. 32. At block 3602, the wireless communication device selects, identifies, or otherwise obtains a first resource unit (RU) of a plurality of RUs for transmitting one or more PPDUs over a wireless medium. The first RU may include a set of contiguous tones occupying a first frequency bandwidth, and the plurality of RUs may collectively span a second frequency bandwidth that is greater than the first frequency bandwidth. At block 3604, the wireless communication device maps the set of contiguous tones of the first RU to a set of non-contiguous tones distributed across the second frequency bandwidth using a tone mapping vector and a tone mapping offset associated with the first RU. At block 3606, the wireless communication transmits the PPDU over the set of non-contiguous tones distributed across the second frequency bandwidth.

In some implementations, the first frequency bandwidth may be equal to the frequency bandwidth of an RU, and the second frequency bandwidth may be one of 20 MHz, 40 MHz, or 80 MHz. In some instances, a power spectral density (PSD) limit applicable to the PPDU transmission may be based on the second frequency bandwidth.

In some implementations, an allocation of the first RU to the wireless communication device may be received in a trigger frame. In some instances, the trigger frame also may allocate one or more of the other RUs of the plurality of RUs that collectively span the second frequency bandwidth to other wireless communication devices. In some instances, the PPDU may be a high-efficiency (HE) or extremely high throughput (EHT) trigger-based (TB) PPDU. In some other instances, the PPDU may be a single-user (SU) PPDU. In some other instances, the PPDU may be a multi-user (MU) PPDU. In some other instances, the PPDU may be a downlink (DL) PPDU.

In some implementations, mapping the set of contiguous tones of the first RU includes mapping pilot tones and data tones of the first RU to the set of non-contiguous tones distributed across the second frequency bandwidth. In some instances, the tones of the set of non-contiguous tones may be interleaved with the tones of one or more other sets of non-contiguous tones distributed across the second frequency bandwidth.

In some implementations, each RU of the plurality of RUs may include a unique set of contiguous tones occupying a different portion of the second frequency bandwidth. As a non-limiting example, in some instances, the plurality of RUs may be a group of RUs specified by the tone map 520 of FIG. 5C. For example, the first 20 MHz segment of the tone map 520 may include one RU242, two RU106s, four RU52s, or nine RU26s. Note that although the first 20 MHz segment of the tone map 520 includes nine RU26s, the frequency sub-band occupied by the fifth RU26 may not be used for allocations of RU52s or RU106s. For example, a group of eight RU26s in a 20 MHz segment may be used to form four RU52s, two RU106s, or one RU242.

In some implementations, the tone mapping vector may be based on the first frequency bandwidth relative to the second frequency bandwidth. The tone mapping vector may indicate a starting tone index, an ending tone index, and a tone spacing of the set of non-contiguous tones mapped from the contiguous tones of the first RU. The tone spacing may be equal to a quotient of the number of tones available for wireless transmissions across the second frequency bandwidth divided by the number of contiguous tones of the first RU. In some implementations, the tone spacing for a selected base group may be based at least in part on a width of the second frequency bandwidth. As a non-limiting example, in some instances for which the selected base group is the RU26 resource unit, the tone spacing may be 9 when the second frequency bandwidth is 20 MHz, the tone spacing may be 18 when the second frequency bandwidth is 40 MHz, the tone spacing may be 36 when the second frequency bandwidth is 80 MHz, the tone spacing may be 72 when the second frequency bandwidth is 160 MHz, and the tone spacing may be 144 when the second frequency bandwidth is 320 MHZ.

In some implementations, the tone mapping offset associated with the first RU may be based at least in part on a bit-reversed ordering of an RU index of the first RU. In some instances, an ordering of the tones of the unique sets of non-contiguous tones distributed across the second frequency bandwidth may be based at least in part on the tone mapping offsets associated with the plurality of RUs distributed across the second frequency bandwidth.

FIG. 37 shows a flowchart illustrating an example operation 3700 for wireless communication that supports transmission of one or more PPDUs using tone mapping based on a tone mapping vector and a tone mapping offset. In some implementations, the operation 3700 may be performed by an apparatus of a wireless communication device operating as or within a STA, such as one of the STAs 104 of FIG. 1, the STA 704 of FIG. 7B, or the STA 3204 of FIG. 32. In some instances, the example operation 3700 of FIG. 37 may be performed prior to mapping the set of contiguous tones in block 3604 of the operation 3600 of FIG. 36. At block 3702, the wireless communication device receives a selection of one of an RU26, an RU52, an RU106, an RU242, or an RU484 of an OFDMA tone plan as a base group from which the tone mapping offsets are referenced. In some implementations, the selection may be received from an AP such as one of the APs 102 of FIG. 1, the AP 702 of FIG. 7A, or the AP 3202 of FIG. 32. In some other implementations, the selection may made by the wireless communication device.

FIG. 38 shows a flowchart illustrating an example operation 3800 for wireless communication that supports transmission of one or more PPDUs using tone mapping based on a tone mapping vector and a tone mapping offset. In some implementations, the operation 3800 may be performed by an apparatus of a wireless communication device operating as or within a STA, such as one of the STAs 104 of FIG. 1, the STA 704 of FIG. 7B, or the STA 3204 of FIG. 32. In some instances, the example operation 3800 of FIG. 38 may be one example of mapping the set of contiguous tones in block 3604 of the operation 3600 of FIG. 36. At block 3802, the wireless communication device maps each unique set of contiguous tones to a corresponding set of non-contiguous tones distributed across the second frequency bandwidth based on the tone mapping vector and the tone mapping offset associated with a respective RU of the plurality of RUs.

In some implementations, an ordering of the tones of the sets of non-contiguous tones distributed across the second frequency bandwidth may be based at least in part on the tone mapping offsets associated with the plurality of RUs that collectively span the second frequency bandwidth. In some instances, the ordering of the tones of the sets of non-contiguous tones distributed across the second frequency bandwidth may be different than an ordering of the tones of the unique sets of contiguous tones corresponding to the plurality of RUs that collectively span the second frequency bandwidth.

In some implementations, the PPDU may be transmitted over the set of non-contiguous tones distributed across the second frequency bandwidth. In some instances, the first frequency bandwidth may be equal to the frequency bandwidth of an RU, and the second frequency bandwidth may be one of 20 MHZ, 40 MHz, or 80 MHz. As such, the PSD limit applicable to the transmission of the PPDU may be based on or associated with the second frequency bandwidth.

In some implementations, the tones of the sets of non-contiguous tones distributed across the second frequency bandwidth may be interleaved with one another. In some instances, each set of non-contiguous tones distributed across the second frequency bandwidth may be allocated to a different wireless communication device.

FIG. 39 shows a flowchart illustrating an example operation 3900 for wireless communication that supports transmission of one or more PPDUs using tone mapping based on a tone mapping vector and a tone mapping offset. In some implementations, the operation 3900 may be performed by an apparatus of a wireless communication device operating as or within a STA, such as one of the STAs 104 of FIG. 1, the STA 704 of FIG. 7B, or the STA 3204 of FIG. 32. In some instances, the example operation 3900 of FIG. 39 may be performed after mapping cach unique set contiguous tones in block 3802 of the operation 3800 of FIG. 38. At block 3902, the wireless communication device maps each set of non-contiguous tones distributed across the second frequency bandwidth to a corresponding set of non-contiguous tones distributed across a third frequency bandwidth that is greater than the second frequency bandwidth. In some instances, the PPDU may be transmitted over the set of non-contiguous tones distributed across the third frequency bandwidth. As such, the PSD limit applicable to the transmission of the PPDU may be based on or associated with the third frequency bandwidth. In some implementations, the first frequency bandwidth may be equal to the frequency bandwidth of an RU, the second frequency bandwidth may be one of 20 MHz, 40 MHz, or 80 MHz, and the third frequency bandwidth may be one of 160 MHz or 320 MHz. The tones of the sets of non-contiguous tones distributed across the third frequency bandwidth may be interleaved with one another. In some instances, cach set of non-contiguous tones distributed across the third frequency bandwidth may be allocated to a different wireless communication device.

FIG. 40 shows a flowchart illustrating an example operation 4000 for wireless communication that supports transmission of one or more PPDUs using tone mapping based on a tone mapping vector and a tone mapping offset. In some implementations, the operation 4000 may be performed by an apparatus of a wireless communication device operating as or within a STA, such as one of the STAs 104 of FIG. 1, the STA 704 of FIG. 7B, or the STA 3204 of FIG. 32. In some instances, the example operation 4000 of FIG. 40 may be performed after mapping the set of contiguous tones of the first RU in block 3604 of the operation 3600 of FIG. 36. At block 4002, the wireless communication device identifies leftover tones in the second frequency bandwidth. At block 4004, the wireless communication device maps the identified leftover tones to the set of non-contiguous tones distributed across the second frequency bandwidth. In some implementations, the number of identified leftover tones is equal to the modulo of the number of contiguous tones in the one of the RU52, the RU106, the RU242, or the RU484 and the number of contiguous tones in the RU26.

FIG. 41A shows a flowchart illustrating an example operation 4100 for wireless communication that supports transmission of one or more PPDUs using tone mapping based on a tone mapping vector and a tone mapping offset. In some implementations, the operation 4100 may be performed by an apparatus of a wireless communication device operating as or within a STA, such as one of the STAs 104 of FIG. 1, the STA 704 of FIG. 7B, or the STA 3204 of FIG. 32. In some instances, the example operation 4100 of FIG. 41A may be performed in conjunction with mapping the sets of contiguous tones to corresponding sets of non-contiguous tones in block 3802 of the operation 3800 of FIG. 38. At block 4102, when the plurality of RUs includes four RU52s or two RU106s based on eight RU26s of an OFDMA tone plan, the wireless communication device may sequentially assign tone mapping offsets of 5, 6, 7, 8, 10, 11, 12, and 13 to the eight RU26s identified by RU indices 0, 4, 2, 6, 1, 5, 3, and 7, respectively. In some instances, the tone mapping offset for the center 26-tone RU of the OFDMA tone plan may be equal to 9.

FIG. 41B shows a flowchart illustrating an example operation 4110 for wireless communication that supports transmission of one or more PPDUs using tone mapping based on a tone mapping vector and a tone mapping offset. In some implementations, the operation 4110 may be performed by an apparatus of a wireless communication device operating as or within a STA, such as one of the STAs 104 of FIG. 1, the STA 704 of FIG. 7B, or the STA 3204 of FIG. 32. In some instances, the example operation 4110 of FIG. 41B may be performed in conjunction with mapping the sets of contiguous tones to corresponding sets of non-contiguous tones in block 3802 of the operation 3800 of FIG. 38. At block 4112, when the plurality of RUs includes eight RU52s or four RU106s based on sixteen RU26s of an OFDMA tone plan, the wireless communication device may sequentially assign tone mapping offsets of 9, 10, 11, 12, 13, 14, 15, 16, 18, 19, 20, 21, 22, 23, 24, and 25 to the sixteen RU26s identified by RU indices 0, 8, 4, 12, 2, 10, 6, 14, 1, 9, 5, 13, 3, 11, 7, and 15, respectively. In some instances, the tone mapping offsets for the two middle 26-tone RUs of the OFDMA tone plan may be 17 and 26.

FIG. 41C shows a flowchart illustrating an example operation 4120 for wireless communication that supports transmission of one or more PPDUs using tone mapping based on a tone mapping vector and a tone mapping offset. In some implementations, the operation 4120 may be performed by an apparatus of a wireless communication device operating as or within a STA, such as one of the STAs 104 of FIG. 1, the STA 704 of FIG. 7B, or the STA 3204 of FIG. 32. In some instances, the example operation 4120 of FIG. 41C may be performed in conjunction with mapping the sets of contiguous tones to corresponding sets of non-contiguous tones in block 3802 of the operation 3800 of FIG. 38. At block 4122, when the plurality of RUs includes eight RU52s or four RU106s based on sixteen RU26s of an OFDMA tone plan, the wireless communication device may sequentially assign tone mapping offset values between 9-12, 14-21, and 23-26 to the sixteen RU26s identified by RU indices of 0, 8, 4, 12, 2, 10, 6, 14, 1, 9, 5, 13, 3, 11, 7, and 15, respectively. In some instances, the tone mapping offsets for the two middle 26-tone RUs of the OFDMA tone plan may be 13 and 22.

FIG. 41D shows a flowchart illustrating an example operation 4130 for wireless communication that supports transmission of one or more PPDUs using tone mapping based on a tone mapping vector and a tone mapping offset. In some implementations, the operation 4130 may be performed by an apparatus of a wireless communication device operating as or within a STA, such as one of the STAs 104 of FIG. 1, the STA 704 of FIG. 7B, or the STA 3204 of FIG. 32. In some instances, the example operation 4130 of FIG. 41D may be performed in conjunction with mapping the sets of contiguous tones to corresponding sets of non-contiguous tones in block 3802 of the operation 3800 of FIG. 38. At block 4132, when the plurality of RUs includes sixteen RU52s or eight RU106s based on thirty-two RU26s of an OFDMA tone plan, the wireless communication device may sequentially assign tone mapping offsets of 31-38, 41-47, 49-56, and 58-65 to the thirty-two RU26s identified by RU indices of 0, 16, 8, 24, 4, 20, 12, 28, 2, 18, 10, 26, 6, 22, 14, 30, 1, 17, 9, 25, 5, 21, 13, 29, 3, 19, 11, 27, 7, 23, 15, and 31, respectively. In some instances, the tone mapping offsets for the four middle 26-tone RUs of the OFDMA tone plan may be 39, 48, 57, and 66.

FIG. 41E shows a flowchart illustrating an example operation 4140 for wireless communication that supports transmission of one or more PPDUs using tone mapping based on a tone mapping vector and a tone mapping offset. In some implementations, the operation 4140 may be performed by an apparatus of a wireless communication device operating as or within a STA, such as one of the STAs 104 of FIG. 1, the STA 704 of FIG. 7B, or the STA 3204 of FIG. 32. In some instances, the example operation 4140 of FIG. 41E may be performed in conjunction with mapping the sets of contiguous tones to corresponding sets of non-contiguous tones in block 3802 of the operation 3800 of FIG. 38. At block 4142, when the plurality of RUs includes sixteen RU52s or eight RU106s based on thirty-two RU26s of an OFDMA tone plan, the wireless communication device may sequentially assign tone mapping offsets of 31-34, 36-43, 45-52, 54-61, and 63-66 to the thirty-two RU26s identified by RU indices of 0, 16, 8, 24, 4, 20, 12, 28, 2, 18, 10, 26, 6, 22, 14, 30, 1, 17, 9, 25, 5, 21, 13, 29, 3, 19, 11, 27, 7, 23, 15, and 31, respectively. In some instances, the tone mapping offsets for the four middle 26-tone RUs of the OFDMA tone plan may be 35, 44, 53, and 62.

Implementation examples are described in the following numbered clauses:

1. A method for wireless communication by an apparatus of a wireless communication device, including:
   selecting a first resource unit (RU) of a plurality of RUs for transmitting a physical (PHY) layer convergence protocol (PLCP) protocol data unit (PPDU) over a wireless medium, the first RU including a set of contiguous tones occupying a first frequency bandwidth, the plurality of RUs collectively spanning a second frequency bandwidth greater than the first frequency bandwidth;
   mapping the set of contiguous tones of the first RU to a set of non-contiguous tones distributed across the second frequency bandwidth using a tone mapping vector and a tone mapping offset associated with the first RU; and
   transmitting the PPDU over the set of non-contiguous tones distributed across the second frequency bandwidth.

2. The method of clause 1, where mapping the set of contiguous tones includes mapping pilot tones and data tones of the first RU to the set of non-contiguous tones distributed across the second frequency bandwidth.

3. The method of any one or more of clauses 1-2, where the tones of the set of non-contiguous tones are interleaved with the tones of one or more other sets of non-contiguous tones distributed across the second frequency bandwidth.

4. The method of any one or more of clauses 1-3, where the tone mapping offset associated with the first RU includes a bit-reversed ordering of an RU index of the first RU.

5. The method of clause 4, where the tone mapping offset associated with the first RU is further associated with the first frequency bandwidth and the second frequency bandwidth.

6. The method of any one or more of clauses 1-5, where the tone mapping vector indicates a starting tone index, an ending tone index, and a tone spacing of the set of non-contiguous tones.

7. The method of any one or more of clauses 1-6, where each set of non-contiguous tones associated with a respective RU size has the same tone spacing.

8. The method of clause 6, where an ordering of the tones of the sets of non-contiguous tones distributed across the second frequency bandwidth is associated with the tone mapping offsets of the plurality of RUs that collectively span the second frequency bandwidth.

9. The method of clause 6, where an ordering of the tones of the sets of non-contiguous tones distributed across the second frequency bandwidth is different than an ordering of the tones of the unique sets of contiguous tones corresponding to the plurality of RUs.

10. The method of any one or more of clauses 1-9, where the plurality of RUs includes four RU52s or two RU106s based on eight RU26s of an orthogonal frequency division multiple access (OFDMA) tone plan, and mapping the unique sets of contiguous tones includes:

sequentially assigning tone mapping offsets of 5, 6, 7, 8, 10, 11, 12, and 13 to the eight RU26s identified by RU indices 0, 4, 2, 6, 1, 5, 3, and 7, respectively; and assigning a tone mapping offset of 9 to the center 26-tone RU of the OFDMA tone plan.

11. The method of any one or more of clauses 1-9, where the plurality of RUs includes eight RU52s or four RU106s based on sixteen RU26s of an orthogonal frequency division multiple access (OFDMA) tone plan, and mapping the unique sets of contiguous tones includes:

sequentially assigning tone mapping offsets of 9, 10, 11, 12, 13, 14, 15, 16, 18, 19, 20, 21, 22, 23, 24, and 25 to the sixteen RU26s identified by RU indices 0, 8, 4, 12, 2, 10, 6, 14, 1, 9, 5, 13, 3, 11, 7, and 15, respectively; and assigning tone mapping offsets of 17 and 26 to the middle 26-tone RUs of the OFDMA tone plan.

12. The method of any one or more of clauses 1-9, where the plurality of RUs includes eight RU52s or four RU106s based on sixteen RU26s of an orthogonal frequency division multiple access (OFDMA) tone plan, and mapping the unique sets of contiguous tones includes:

sequentially assigning tone mapping offset values between 9-12, 14-21, and 23-26 to the sixteen RU26s identified by RU indices of 0, 8, 4, 12, 2, 10, 6, 14, 1, 9, 5, 13, 3, 11, 7, and 15, respectively; and assigning tone mapping offsets of 13 and 22 to the two middle 26-tone RUs of the OFDMA tone plan.

13. The method of any one or more of clauses 1-9, where the plurality of RUs includes sixteen RU52s or eight RU106s based on thirty-two RU26s of an orthogonal frequency division multiple access (OFDMA) tone plan, and mapping the unique sets of contiguous tones includes:

sequentially assigning tone mapping offsets of 31-38, 40-47, 49-56, and 58-65 to the thirty-two RU26s identified by RU indices of 0, 16, 8, 24, 4, 20, 12, 28, 2, 18, 10, 26, 6, 22, 14, 30, 1, 17, 9, 25, 5, 21, 13, 29, 3, 19, 11, 27, 7, 23, 15, and 31, respectively; and assigning tone mapping offsets of 39, 48, 57, and 66 to the four middle 26-tone RUs of the OFDMA tone plan.

14. The method of any one or more of clauses 1-9, where the plurality of RUs includes sixteen RU52s or eight RU106s based on thirty-two RU26s of an orthogonal frequency division multiple access (OFDMA) tone plan, and mapping the unique sets of contiguous tones includes:

sequentially assigning tone mapping offsets of 31-34, 36-43, 45-52, 54-61, and 63-66 to the thirty-two RU26s identified by RU indices of 0, 16, 8, 24, 4, 20, 12, 28, 2, 18, 10, 26, 6, 22, 14, 30, 1, 17, 9, 25, 5, 21, 13, 29, 3, 19, 11, 27, 7, 23, 15, and 31, respectively; and assigning tone mapping offsets of 35, 44, 53, and 62 to the four middle 26-tone RUs of the OFDMA tone plan.

15. The method of clause 1, further including:

receiving an RU26, an RU52, an RU106, an RU242, or an RU484 of an orthogonal frequency division multiple access (OFDMA) tone plan as a base group from which the tone mapping offsets are referenced.

16. The method of clause 15, where the base group is the RU26, the first frequency bandwidth is 2 MHz, and where:

the tone mapping distance is 9 when the second frequency bandwidth is 20 MHz;

the tone mapping distance is 18 when the second frequency bandwidth is 40 MHz;

the tone mapping distance is 36 when the second frequency bandwidth is 80 MHz;

the tone mapping distance is 72 when the second frequency bandwidth is 160 MHz; and the tone mapping distance is 144 when the second frequency bandwidth is 320 MHz.

17. The method of clause 15, where the base group is the RU26, the first RU is an RU52, and mapping the set of contiguous tones includes:

mapping a first group of the tones of the RU52 to a set of non-contiguous tones distributed across the second frequency bandwidth using the tone mapping vector and the tone mapping offset associated with a first RU26; and mapping a second group of the tones of the RU52 to the set of non-contiguous tones distributed across the second frequency bandwidth using the tone mapping vector and the tone mapping offset associated with a second RU26.

18. The method of clause 15, where the base group is the RU26, the first RU is an RU106, and mapping the set of contiguous tones includes:

mapping a first group of the tones of the RU106 to a set of non-contiguous tones distributed across the second frequency bandwidth using on the tone mapping vector and the tone mapping offset associated with a first RU26;

mapping a second group of the tones of the RU106 to the set of non-contiguous tones distributed across the second frequency bandwidth using on the tone mapping vector and the tone mapping offset associated with a second RU26;

mapping a third group of the tones of the RU106 to the set of non-contiguous tones distributed across the second frequency bandwidth using on the tone mapping vector and the tone mapping offset associated with a third RU26; and mapping a fourth group of the tones of the RU106 to the set of non-contiguous tones distributed across the second frequency bandwidth using on the tone mapping vector and the tone mapping offset associated with a fourth RU26.

19. The method of any one or more of clauses 1-18, further including:

mapping each set of non-contiguous tones distributed across the second frequency bandwidth to a corresponding set of non-contiguous tones distributed across a third frequency bandwidth greater than the second frequency bandwidth.

20. The method of any one or more of clauses 1-19, further including:

identifying selecting a number of leftover tones in the second frequency bandwidth; and mapping the identified leftover tones to the set of non-contiguous tones distributed across the second frequency bandwidth.

21. The method of clause 20, where the number of identified leftover tones includes a modulo of the number of contiguous tones in the one of the RU52, the RU106, the RU242, or the RU484 and the number of contiguous tones in the RU26.

22. The method of any one or more of clauses 1-21, where the PPDU includes an uplink (UL) transmission or a downlink (DL) transmission.

23. A wireless communication device, including:

a processing system configured to:

select a first resource unit (RU) of a plurality of RUs for transmitting a physical (PHY) layer convergence protocol (PLCP) protocol data unit (PPDU) over a wireless medium, the first RU including a set of contiguous tones occupying a first frequency bandwidth, the plurality of RUs collectively spanning a second frequency bandwidth greater than the first frequency bandwidth; and map the set of contiguous tones of the first RU to a set of non-contiguous tones distributed across the second frequency bandwidth using a tone mapping vector and a tone mapping offset associated with the first RU; and an interface configured to:

output the PPDU for transmission over the set of non-contiguous tones distributed across the second frequency bandwidth.

24. The wireless communication device of clause 23, where mapping the set of contiguous tones includes mapping pilot tones and data tones of the first RU to the set of non-contiguous tones distributed across the second frequency bandwidth.

25. The wireless communication device of any one or more of clauses 23-24, where the tones of the set of non-contiguous tones are interleaved with the tones of one or more other sets of non-contiguous tones distributed across the second frequency bandwidth.

26. The wireless communication device of any one or more of clauses 23-25, where the tone mapping offset associated with the first RU includes a bit-reversed ordering of an RU index of the first RU.

27. The wireless communication device of any one or more of clauses 23-26, where the tone mapping vector indicates a starting tone index, an ending tone index, and a tone spacing of the set of non-contiguous tones.

28. The wireless communication device of clause 27, where each set of non-contiguous tones associated with a respective RU size has the same tone spacing.

29. The wireless communication device of any one or more of clauses 23-28, where an ordering of the tones of the sets of non-contiguous tones distributed across the second frequency bandwidth is associated with the tone mapping offsets of the plurality of RUs that collectively span the second frequency bandwidth.

30. The wireless communication device of any one or more of clauses 23-29, where the processing circuit is further configured to:

identify a number of leftover tones in the second frequency bandwidth; and map the identified leftover tones to the set of non-contiguous tones distributed across the second frequency bandwidth.

31. The method of any one or more of clauses 1-30, where the first frequency bandwidth includes a bandwidth of one of an RU26, an RU52, an RU106, or an RU242, and the second frequency bandwidth is one of a 20 MHz bandwidth, a 40 MHz bandwidth, or an 80 MHz bandwidth.

32. The method of clause 6, where the tone spacing includes a quotient of the number of tones available for transmissions across the second frequency bandwidth divided by the number of contiguous tones of the first RU.

33. The method of clause 1, where each RU of the plurality of RUs spanning the second frequency bandwidth includes a unique set of contiguous tones occupying a different portion of the second frequency bandwidth.

34. The method of clause 19, where the third frequency bandwidth is one of a 160 MHz bandwidth or a 320 MHz bandwidth.

35. The method of clause 19, where the tones of the sets of non-contiguous tones distributed across the third frequency bandwidth are interleaved with one another.

36. The method of any one or more of clauses 1-35, where the first RU is allocated to the wireless communication device in a trigger frame.

37. The method of clause 36, where the trigger frame allocates one or more of the other RUs of the plurality of RUs to one or more other wireless communication devices.

38. The method of any one or more of clauses 1-37, where the PPDU includes a high-efficiency (HE) or extremely high throughput (EHT) trigger-based (TB) PPDU.

39. The method of any one or more of clauses 1-38, where the PPDU includes a single-user (SU) PPDU.

40. The method of any one or more of clauses 1-38, where the PPDU includes a multi-user (MU) PPDU.

41. The method of any one or more of clauses 1-40, where a power spectral density (PSD) limit applicable to the PPDU transmission is based on the second frequency bandwidth.

42. The method of any one or more of clauses 1-41, where the first RU includes a plurality of RUs.

43. The method of any one or more of clauses 1-42, where the plurality of RUs includes one or more of RU26s, RU52s, RU106s, RU242s, or an RU484.

As used herein, a phrase referring to "at least one of" or "one or more of" a list of items refers to any combination of those items, including single members. For example, "at least one of: a, b, or c" is intended to cover the possibilities of: a only, b only, c only, a combination of a and b, a combination of a and c, a combination of b and c, and a combination of a and b and c.

The various illustrative components, logic, logical blocks, modules, circuits, operations and algorithm processes described in connection with the implementations disclosed herein may be implemented as electronic hardware, firmware, software, or combinations of hardware, firmware or software, including the structures disclosed in this specification and the structural equivalents thereof. The interchangeability of hardware, firmware and software has been described generally, in terms of functionality, and illustrated in the various illustrative components, blocks, modules, circuits and processes described above. Whether such functionality is implemented in hardware, firmware or software depends upon the particular application and design constraints imposed on the overall system.

Various modifications to the implementations described in this disclosure may be readily apparent to persons having ordinary skill in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

Additionally, various features that are described in this specification in the context of separate implementations also can be implemented in combination in a single implementation. Conversely, various features that are described in the context of a single implementation also can be implemented in multiple implementations separately or in any suitable subcombination. As such, although features may be described above as acting in particular combinations, and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flowchart or flow diagram. However, other operations that are not depicted can be incorporated in the example processes that are schematically illustrated. For example, one or more additional operations can be performed before, after, simultaneously, or between any of the illustrated operations. In some circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

What is claimed is:

1. A wireless communication device, comprising:
one or more memories storing processor-executable code; and
one or more processors coupled with the one or more memories and individually or collectively operable to execute the code to cause the wireless communication device to:

select a first resource unit (RU) of a plurality of RUs for transmitting a data unit over a wireless medium, the first RU including a first set of tones occupying a first frequency bandwidth;
map the first set of tones of the first RU to a second set of tones evenly distributed across a second frequency bandwidth; and
transmit the data unit over the second set of tones evenly distributed across the second frequency bandwidth.

2. The wireless communication device of claim 1, wherein the first set of tones includes pilot tones and data tones of the first RU that are mapped to the second set of tones evenly distributed across the second frequency bandwidth.

3. The wireless communication device of claim 1, wherein tones of the second set of tones are interleaved with tones of one or more other sets of tones distributed across the second frequency bandwidth.

4. The wireless communication device of claim 1, wherein a tone mapping offset associated with the first RU is a bit-reversed ordering of an RU index of the first RU.

5. The wireless communication device of claim 4, wherein the tone mapping offset associated with the first RU is further associated with the first frequency bandwidth and the second frequency bandwidth.

6. The wireless communication device of claim 1, wherein a tone mapping vector indicates a starting tone index, an ending tone index, or a tone spacing.

7. The wireless communication device of claim 6, wherein each set of tones associated with a respective RU size has a same tone spacing.

8. The wireless communication device of claim 6, wherein the tone mapping vector indicates the tone spacing, and wherein the tone spacing comprises a quotient of a number of tones available for transmissions across the second frequency bandwidth divided by a number of contiguous tones of the first RU.

9. The wireless communication device of claim 1, wherein an ordering of tones of the second set of tones evenly distributed across the second frequency bandwidth is associated with tone mapping offsets of the plurality of RUs that collectively span the second frequency bandwidth.

10. The wireless communication device of claim 1, wherein an ordering of tones of the second set of tones evenly distributed across the second frequency bandwidth is different than an ordering of tones of unique sets of contiguous tones corresponding to the plurality of RUs.

11. The wireless communication device of claim 1, wherein each RU of the plurality of RUs spanning the second frequency bandwidth includes a unique set of contiguous tones occupying a different portion of the second frequency bandwidth.

12. The wireless communication device of claim 1, wherein the first RU is allocated to the wireless communication device in a trigger frame.

13. The wireless communication device of claim 12, wherein the trigger frame allocates one or more other RUs of the plurality of RUs to one or more other wireless communication devices.

14. The wireless communication device of claim 1, wherein the one or more processors are individually or collectively further operable to execute the code to cause the wireless communication device to:

map the second set of tones evenly distributed across the second frequency bandwidth to a third set of non-contiguous tones distributed across a third frequency bandwidth greater than the second frequency bandwidth.

15. The wireless communication device of claim 14, wherein tones of the third set of non-contiguous tones distributed across the third frequency bandwidth are interleaved with a fourth set of tones.

16. The wireless communication device of claim 1, wherein the one or more processors are individually or collectively further operable to execute the code to cause the wireless communication device to:

identify a number of leftover tones in the second frequency bandwidth; and map the identified leftover tones to the second set of tones evenly distributed across the second frequency bandwidth.

17. The wireless communication device of claim 1, wherein the data unit comprises an uplink (UL) transmission or a downlink (DL) transmission.

18. The wireless communication device of claim 1, wherein the data unit comprises a high-efficiency (HE) or extremely high throughput (EHT) trigger-based (TB) physical (PHY) layer convergence protocol (PLCP) protocol data unit (PPDU).

19. The wireless communication device of claim 1, wherein a power spectral density (PSD) limit applicable to transmission of the data unit is based on the second frequency bandwidth.

20. The wireless communication device of claim 1, wherein the first RU comprises a plurality of RUs.

21. The wireless communication device of claim 1, wherein the plurality of RUs includes one or more of RU26s, RU52s, RU106s, RU242s, or an RU 484.

22. A method for wireless communication by a wireless communication device, comprising:

selecting a first resource unit (RU) of a plurality of RUs for transmitting a data unit over a wireless medium, the first RU including a first set of tones occupying a first frequency bandwidth;

mapping the first set of tones of the first RU to a second set of tones evenly distributed across a second frequency bandwidth; and transmitting the data unit over the second set of tones evenly distributed across the second frequency bandwidth.

23. The method of claim 22, wherein mapping the first set of tones includes mapping pilot tones and data tones of the first RU to the second set of tones evenly distributed across the second frequency bandwidth.

24. The method of claim 22, wherein tones of the second set of tones are interleaved with tones of one or more other sets of tones distributed across the second frequency bandwidth.

25. The method of claim 22, wherein a tone mapping offset associated with the first RU is a bit-reversed ordering of an RU index of the first RU.

26. The method of claim 25, wherein the tone mapping offset associated with the first RU is further associated with the first frequency bandwidth and the second frequency bandwidth.

27. The method of claim 22, wherein a tone mapping vector indicates a starting tone index, an ending tone index, or a tone spacing.

28. The method of claim 27, wherein each set of tones associated with a respective RU size has a same tone spacing.

29. A wireless communication device for wireless communication, comprising:

means for selecting a first resource unit (RU) of a plurality of RUs for transmitting a data unit over a wireless medium, the first RU including a first set of tones occupying a first frequency bandwidth;

means for mapping the first set of tones of the first RU to a second set of tones evenly distributed across a second frequency bandwidth; and means for transmitting the data unit over the second set of tones evenly distributed across the second frequency bandwidth.

30. A non-transitory computer-readable medium storing code for wireless communication, the code comprising instructions executable by one or more processors to:

select a first resource unit (RU) of a plurality of RUs for transmitting a data unit over a wireless medium, the first RU including a first set of tones occupying a first frequency bandwidth;

map the first set of tones of the first RU to a second set of tones evenly distributed across a second frequency bandwidth; and transmit the data unit over the second set of tones evenly distributed across the second frequency bandwidth.

* * * * *